US007765480B2

(12) United States Patent
Hasegawa et al.

(10) Patent No.: US 7,765,480 B2
(45) Date of Patent: Jul. 27, 2010

(54) IMAGE PROCESSING APPARATUS, IMAGE PROCESSING METHOD, AND A COMPUTER-READABLE STORAGE MEDIUM CONTAINING A COMPUTER PROGRAM FOR IMAGE PROCESSING RECORDED THEREON

(75) Inventors: Minoru Hasegawa, Chiba (JP); Toshinori Takaki, Tokyo (JP); Norihiko Sakata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 515 days.

(21) Appl. No.: 11/682,565

(22) Filed: Mar. 6, 2007

(65) Prior Publication Data

US 2007/0157102 A1    Jul. 5, 2007

Related U.S. Application Data

(60) Continuation of application No. 09/962,274, filed on Sep. 26, 2001, which is a division of application No. 09/266,909, filed on Mar. 12, 1999, now Pat. No. 6,333,752.

(30) Foreign Application Priority Data

| Mar. 13, 1998 | (JP) | ................................. 10-080530 |
| Mar. 13, 1998 | (JP) | ................................. 10-080531 |
| Mar. 13, 1998 | (JP) | ................................. 10-080532 |
| Feb. 23, 1999 | (JP) | ................................. 11-045346 |

(51) Int. Cl.
   *G06F 3/00*        (2006.01)
(52) U.S. Cl. ....................................... 715/730; 715/731
(58) Field of Classification Search .................. 715/730
   See application file for complete search history.

(56) References Cited

U.S. PATENT DOCUMENTS

| 5,526,020 | A |   | 6/1996 | Campanelli et al. |
| 5,574,846 | A |   | 11/1996 | Yoshimura et al. |
| 5,630,131 | A | * | 5/1997 | Palevich et al. ............. 717/108 |

(Continued)

OTHER PUBLICATIONS

Patent Abstracts of Japan, JP 11-032227 (09-188214), Feb. 2, 1999.

(Continued)

*Primary Examiner*—Ting Lee
*Assistant Examiner*—Ashraf Zahr
(74) *Attorney, Agent, or Firm*—Oblon, Spivak, McClelland, Maier & Neustadt, L.L.P.

(57) ABSTRACT

An image processing apparatus according to the present invention comprises a reference image extracting section for extracting a reference image as an object for display; a parameter managing section for managing a plurality of parameters and their values for the extracted reference image; a parameter setting section for selecting any two arbitrary parameters and setting the selected parameters as scales for the vertical axis and horizontal axis; a peripheral image preparing section for preparing peripheral images each obtained by changing the values of the two parameters selected for the reference image by a specified amount; and an image display controller for providing display controls by correlating parameter values of peripheral images to those for the vertical axis and horizontal axis of the reference image so that the reference image is displayed at a specified position of a screen and also peripheral images thereof are displayed surrounding the reference image in n layers.

24 Claims, 47 Drawing Sheets

U.S. PATENT DOCUMENTS

| | | | |
|---|---|---|---|
| 5,666,503 | A | 9/1997 | Campanelli et al. |
| 5,930,803 | A | 7/1999 | Becker et al. |
| 5,960,448 | A * | 9/1999 | Reichek et al. ............. 715/236 |
| 6,008,807 | A * | 12/1999 | Bretschneider et al. ..... 715/732 |
| 6,028,603 | A * | 2/2000 | Wang et al. ................. 715/776 |
| 6,031,529 | A * | 2/2000 | Migos et al. ................ 715/783 |
| 6,032,596 | A | 3/2000 | Hayakawa |
| 6,091,408 | A * | 7/2000 | Treibitz et al. ............. 715/753 |
| 6,202,061 | B1 * | 3/2001 | Khosla et al. .................. 707/3 |
| 6,229,544 | B1 * | 5/2001 | Cragun ....................... 345/418 |
| 6,453,459 | B1 * | 9/2002 | Brodersen et al. ........... 717/100 |
| 6,570,587 | B1 * | 5/2003 | Efrat et al. .................. 715/723 |
| 6,590,584 | B1 | 7/2003 | Yamaura et al. |
| 6,678,698 | B2 | 1/2004 | Fredell et al. |
| 6,701,011 | B1 | 3/2004 | Nakajima |

OTHER PUBLICATIONS

Using Adobe Photoshop 5 pp. 35-36; Author: Giordan, Daniel; Moniz Steve. Publication: Indianapolis, Ind. Que, 1998.

Photoshop 5 in wings; upgrade to pack history palette, extended actions. (Adobe Photoshop 5.0) (Product Development) MacWeek, Feb 16, 1998, by Kelly Ryer, Matthew Rothenberg.

"Photoshop Tools and Toolbars", http://home.okstate.edu/homepages.nsf/toc/photoshop_tools_and_toolbars.html.

"Adobe Photoshop 5.0 Classroom in a Book" Sep. 1998.

Microsoft Word 97 At A Glance (cover page, copyright page and pp. 11, 25, and 45).

Ryer, Kelly. "Photoshop 5 in wings; upgrade to pack history palette, extended actions." Feb. 16, 1998.

* cited by examiner

IMAGE PROCESSING APPARATUS, IMAGE PROCESSING METHOD, AND A COMPUTER-READABLE STORAGE MEDIUM CONTAINING A COMPUTER PROGRAM FOR IMAGE PROCESSING RECORDED THEREON

CROSS-REFERENCE TO RELATED APPLICATIONS

This application is a Continuation of and claims the benefit or priority under 35 U.S.C. §120 from U.S. Ser. No. 09/962,274, filed Sep. 26, 2001, which is a Divisional of U.S. Pat. No. 6,333,752, issued Dec. 25, 2001, and claims the benefit of priority under 35 U.S.C. §119 from Japanese Patent Application Nos. 10-080530, filed Mar. 13, 1998; 10-080531, filed Mar. 13, 1998; 10-080532, filed Mar. 13, 1998 and 11-045346, filed Feb. 23, 1999, respectively, the entire contents of which are hereby incorporated by reference.

BACKGROUND OF THE INVENTION

1. Field of the Invention
2. Description of the Related Art stored in a state where the original image has been rotated by a specified angle, or a portion of the original image is separated and stored.

As specific examples in which an original image is rotated by a specified angle, there is a case where, when a picture as an original image, especially a photograph showing a human face is originally inclined, the original image is rotated to correct the inclination in order to use the photo for adhering on an ID card or the like. Further, although the original image is not inclined, the image is intentionally rotated to realize a higher designing effect in order to use the original image on a leaflet or a pamphlet, and in this case the image is stored in the rotated state.

As specific examples in which a portion of an original image is separated in a specified form, there is a case where only a portion corresponding to a human face is separated to use the photograph for adhering on an ID card or the like. Further, there is a case where a section showing a human face is separated in a shape of heart mark for a decorative purpose such as publishing it on a pamphlet for a wedding party or the like, and in that case the image is stored in the separated state.

As the technology for retrieving a file of stored images, conventionally there is the technology for displaying a plurality of contracted images for retrieval obtained by contracting the original images, namely the thumb-nails are displayed on the screen and retrieving a file with the help of the contracted images as a key for retrieval.

When an edited and processed image is stored, generally the image is stored with a rectangular area including the image. During this, the blank section is previously colored with a specified color and then is stored together with the edited and processed image. To synthesize the stored images, it is required to execute the processing for marking the blank section transparent, and this clearing processing is executed by making the colored section transparent according to a color used for coloring the blank section for storing as a key.

In the first type of conventional technology described above, however, each time the parameter values are changed an image displayed on a screen changes so that comparison of the images before and after the change can not be made concurrently and a degree of change of the image can not be grasped immediately. Therefore, it is required to restore the original image before change many times for comparison.

Persons experienced in this kind of job for editing and processing an image can easily carry out this work, but the work is rather disadvantageously difficult for beginners.

Further, in the first type of conventional technology as described above, when there are a plurality of parameters, the parameter values are required to be changed one by one, and when it is desired to obtain desired parameter values by finely adjusting a change rate of each of two or more discrete parameter values, it is required to check the image each time, and this work is easy for experienced persons, but is difficult for those who are not experienced.

In the second type of conventional technology described above, a contracted image for retrieval is prepared by referring to the size of the original image, so that, even in case of an edited and processed image, a contracted image is prepared with the same magnification as that for the original image. Therefore, for instance, when a rectangular image is rotated, a portion of the image goes out of the frame of the contracted image and the entire image rotated as described above can not be displayed, which makes it impossible to fully grasp the rotated state of the image.

Further, in the second conventional technology, when a portion of an original image is separated in a specified form like in a case where only a section corresponding to a face is separated from a photograph showing the whole body, the separated section is contracted with the same contraction ratio, so that the separated image is shown with a small size in the contracted image, and in some situations the contents of an original image can not fully be grasped from the contracted image.

Further, in the second type of conventional technology, a color as an object for making transparent can not be changed, and when there is the same color as that to be made transparent in may places, not only the blank section, but also sections having the same color as that to be made transparent are disadvantageously made transparent.

SUMMARY OF THE INVENTION

It is an object of the present invention to provide an apparatus and a method for easily and efficiently editing and processing an image and making it possible even for beginners to easily obtain a contracted image with an optimal magnification for each edited and processed image when contracted images for retrieval are prepared by using images obtained by editing and processing the original images by easily and efficiently changing desired parameter values of a plurality of images and also by changing a color as an object for the processing for making transparent when a blank section is colored with the color as an object for making transparent when an edited and processed image is stored, and also to a computer-readable storage medium containing a computer program for image processing recorded thereon.

With the present invention, a reference image is displayed at a specified position on a screen and a peripheral image is displayed around this reference image in n layers by correlating parameters of the peripheral image to scales of the vertical axis and horizontal axis. Thus, parameters of the reference image can be changed by visually checking the peripheral image. More specifically, a peripheral image is located adjacent to the reference image in correlation to scales of the vertical axis and horizontal axis. Thus, an operator can easily recognize synthesis of amount of change of two parameters and change of an image according to the synthesized parameters. Thus, the operator can quickly and efficiently change a plurality of parameters for the reference image.

With the present invention, it is inhibited that the same parameter is selected as a parameter for both the vertical and horizontal axes simultaneously, so that it is possible to prevent an operator from setting the same parameter for both the vertical axis and horizontal axis by mistake.

With the present invention, one out of a plurality of peripheral images is specified and the specified peripheral image is extracted as a reference image, so that operator can change two different parameters by simply specifying an image having the most desired parameters from a plurality of displayed peripheral images. Further an operator can easily and efficiently select an image closest to finally selected two parameters only by successively specifying images close to a desired image, which makes it possible for the operator to more visually and intuitively change a plurality of parameter values simultaneously.

With the present invention, information concerning parameter values of parameters for the vertical axis and horizontal axis is displayed at a specified position within or adjacent to a reference and/or a peripheral image. Therefore, parameter values can visually be checked and changed, and more specifically the amount of change can easily be recognized when parameter values are changed by extracting a peripheral image as the reference image.

With the present invention, a contracted image with an appropriate size is displayed, so that an operator can easily and efficiently retrieve a desired image data file visually checking the contracted image.

With the present invention, a rotated image as a whole is displayed as a contracted image, so that a degree of rotation of the original image can simultaneously be checked by referring to the contracted image.

With the present invention, an image separated from a contracted image is displayed with the biggest size, so that contents of the contracted image can clearly be identified and also how the image is separated can visually be checked.

With the present invention, blank sections are colored and the colored section is made transparent, so that a section to be made transparent can easily be identified through a simple operation of coloring, which in turn makes it easier to synthesize the images.

With the present innovation, a color used for coloring the blank sections and which is to be made transparent is arbitrarily specified, so that it is possible to prevent a section not to be made transparent from being made transparent, which makes it easier to synthesize the images.

With the present invention, when a color to be made transparent is set, the color is set by referring to and according to colors used in the image, so that it is possible to prevent a section not to be made transparent from being made transparent without specifying any specific color, which makes it easier to synthesize the images.

With the present invention, a color which is used least in an image is set as a color to be made transparent, so that the possibility of clearing a section not to be made transparent is suppressed to the minimum level and images can easily be synthesized.

With the present invention, a history of editing and processing of an edited and processed image is displayed, so that an operator can easily understand how the image has been edited and processed.

With the present invention, information concerning an original image of an edited and processed image is displayed, so that the original image can easily be identified.

With the present invention, first to third dedicated displaying areas are provided as fixed areas, and positions and sizes of the areas can not be changed, so that always a screen having the same configuration is displayed, and the operator can perceive the areas as one screen. Therefore, operator is not required to remember a complicated operational sequence, and can intuitively use the image processing apparatus.

With the present invention, even if the operator does not accurately remembers a file name, he can quickly and easily select a desired image data file according to a thumbnail image as a key.

With the present invention, a reference image is displayed at a specified position on a screen, and a peripheral image is displayed around this reference image in n layers by correlating parameters of the peripheral image to scales of the vertical axis and horizontal axis. Thus, parameters of the reference image can be changed by visually checking the peripheral images. More specifically, a peripheral image is located adjacent to the reference image in correlation to scales of the vertical axis and horizontal axis. Thus, synthesis of the amount of change of two parameters and change of an image according to the synthesized parameter values can intuitively be recognized by an operator so that the operator can quickly and effectively, change a plurality of parameter values for the reference image.

With the present invention, it is inhibited that the same parameter is selected as a parameter for both the vertical axis and horizontal axis simultaneously, so that it is possible to prevent an operator from setting the same parameter for both the vertical axis and horizontal axis simultaneously by mistake.

With the present invention, one out of a plurality of peripheral images is specified and the specified peripheral image is extracted as a reference image, so that an operator can change the values of two different parameters through a simple operation of only specifying an image having the most desired parameters from a plurality of peripheral images being displayed on a screen. Further, the operator can easily and efficiently select an image closest to finally selected two parameters only by successively specifying images close to a desired image, and furthermore can visually and intuitively change a plurality of parameter values.

With the present invention, information concerning parameter values of parameters for the vertical axis and horizontal axis is displayed at a specified position within or adjacent to a reference image and/or a peripheral image. Therefore, the information can be referred to when changing the parameter values, and more specifically the amount of change can easily be recognized when changing the parameter values by extracting a peripheral image as a reference image.

With the present invention, a contracted image with an appropriate size is displayed, so that a desired image data file can easily and efficiently be retrieved by referring the contracted image.

With the present invention, a rotated image as a whole is displayed as a contracted image, so that rotation status of the image can be confirmed in the contracted image.

With the preset invention, an image separated from a contracted image is displayed with the biggest size, so that contents of an image can clearly be confirmed in the contracted image and how the image was separated can also be identified.

With the present invention, blank sections are colored and the colored sections are made transparent, so that a section to be made transparent can be identified through a simple operation of coloring and also images can easily be synthesized.

With the present invention, a color used for coloring the blank sections and which is to be made transparent is arbitrarily specified, so that it is possible to prevent a section not to be made transparent from being made transparent, which in turn makes it easier to synthesize the images.

With the present invention, when setting a color to be made transparent, the color is set by referring to colors used in an image, so that it is possible to prevent a section not to be made transparent from being made transparent without specifying any specific color, which in turn makes it easier to synthesize the images.

With the present invention, a color which is used least in an image is set as a color to be made transparent, so that images can be synthesized with a minimum possibility of making a section transparent which is not to be made transparent.

With the present invention, a history of editing and processing of an edited and processed image is displayed, so that an operator can easily understand how the image was edited and processed.

With the present invention, information concerning an original image of an edited and processed image is displayed, so that the original image can easily be identified.

With the present invention, first to third dedicated displaying areas are provided as fixed areas, and a position and a size of each of the areas can not be changed, so that always a screen having the same configuration is displayed and the operator can grasp these areas as one screen. Therefore, the operator is not required to remember a complicated operational sequence and can intuitively use the image processing apparatus without being embarrassed during operations.

With the present invention, eve if the operator does not accurately remembers a file name, the operator can quickly and easily select a desired image data file according to a thumbnail image (contracted image) as a key.

Other objects and features of this invention will become apparent from the following description with reference to the accompanying drawings.

DETAILED DESCRIPTION OF THE PREFERRED EMBODIMENTS

Detailed description is made for preferred embodiments of the image processing apparatus, image processing method and computer-readable storage medium with a program for containing a computer program for image processing recorded thereon each according to the present invention with attached drawings.

Figure 1:
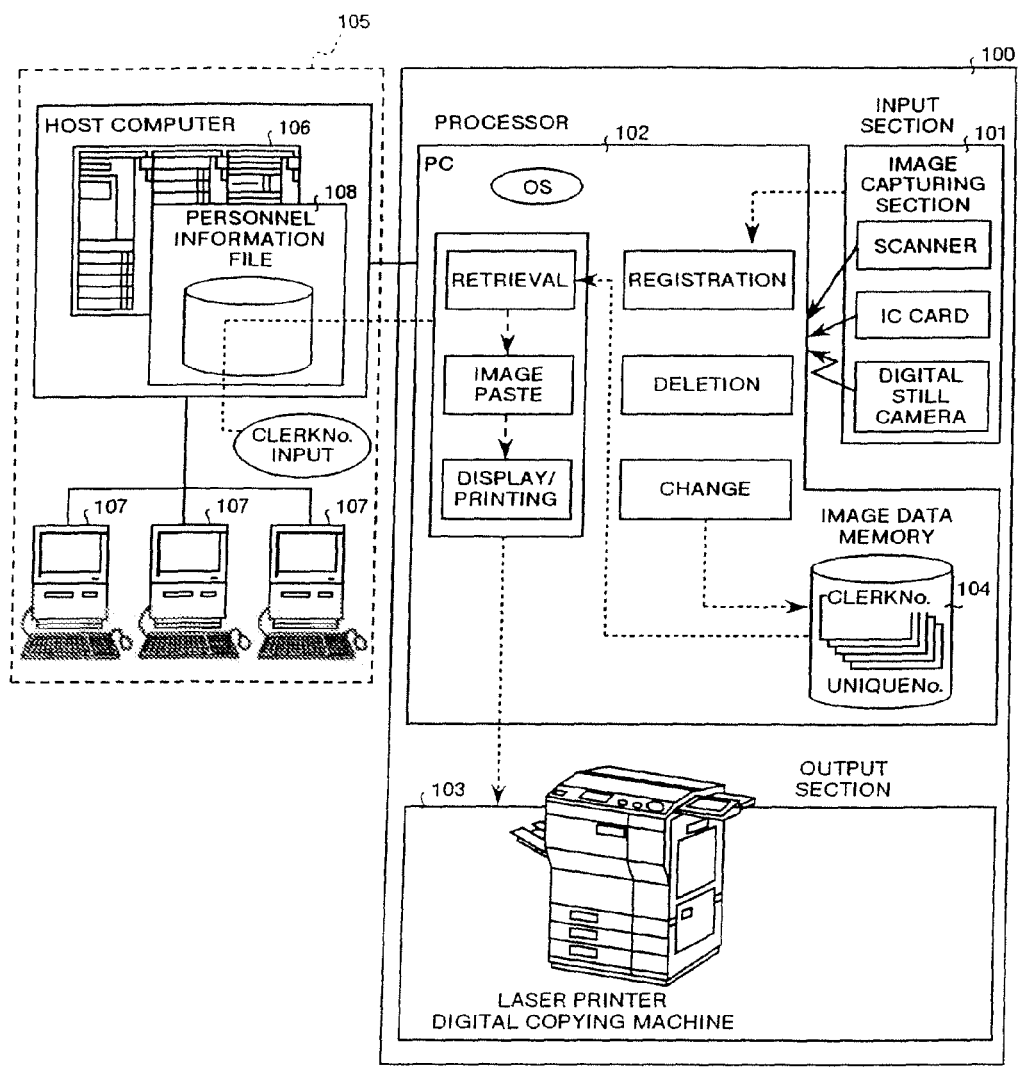
FIG. 1 is an explanatory view functionally showing an image and document preparing system including an image processing apparatus according to Embodiment 1 of the present invention.

At first description is made for configuration of a system for preparing a document with an image (hereinafter referred to as image and document preparing system) including an image processing apparatus according to Embodiment 1 of the present invention. FIG. 1 is an explanatory view functionally showing configuration of the image and document preparing system including the image processing apparatus according to Embodiment 1 of the present invention as a whole. This image and document preparing system comprises, as functionally shown in FIG. 1, an image processing apparatus 100 in turn comprising an input section 101, a processor 102, and an output section 103; and a host computer system connected to the image processing apparatus 100 through a network such as a LAN.

The input section 101 executes processing for capturing an image, and includes, for instance, a scanner, an IC card, digital still camera, a photo CD reader or the like. The inputting section captures an image, converts the captured image into a one having a specified file format, and transmits the image to the processor 102.

The processor 102 executes processing such as registration, deletion, and change of the image captured by the input section 101, and executes the processing with the help of, for instance, a personal computer (PC). A image data memory 104 incorporated or externally attached to the processor 102 stores the image data processed in the processor 102 in, for instance, a hard disk, a floppy disk, a rewritable CD-ROM, MOD, DVD or the like.

Further, the processor 102 provides display controls for retrieving the image data stored in the image data memory 104, paste the retrieved image data to other document, and displaying the document on a display, and also providing printing controls for printing the document in the output section 103.

The output section 103 prints out image data and a document including the image data put under control for printing by the processing section 102. For instance, a laser printer or a digital copying machine capable of printing monochrome images or full-colored images is included in the output section 103. Further, a printer capable of printing a name card or printing a card such as an ID card and then laminating the card is also included in the output section 103.

The host computer system 105 is connected to a PC as the processor 102 through a network such as a LAN, and comprises a host computer 106, and a plurality of terminal devices 107 connected to the host computer 106 through a network. Stored in the host computer is, for instance, a personnel information file 108 concerning personnel affairs, and the personnel information file can be accessed from each any of the terminal device 107.

Further, information stored in the processor 102 can be linked to information stored in the personnel information file 108, and image data stored in the image data memory 104 in the processor 102 can be retrieved through the personnel information file 108 by inputting personnel information such as a clerk No. or the like from the terminal devices 107.

Examples of applications of the image and document preparing system includes, for instance, a name card preparing system for preparing a name card with a photograph of the owner's face printed thereon, a post card preparing system for preparing post cards such as information cards each including photographs of products or faces of staff, an ID card preparing system for preparing an ID card with the owner's face printed thereon, a leaflet preparing system for preparing leaflets such as documents for business planning, pamphlets for advertisement, or catalogs, and a card preparing system for preparing cards each with a photograph printed thereon.

Further the examples of application thereof includes a personnel affairs information system for preparing and managing photographs or personnel histories of employees, a register with employees' faces printed thereon such as their financial statements, address, maps; a used car retrieving system for retrieving information for used cars with photographs of owners' faces printed thereon respectively; a purchase information planning system for managing purchase information, a system dedicated for construction systems with process management information and a ledger for works synthesized therein; a system for preparing views each showing an anticipated completed construction work combined with a three-dimensional CAD system.

It is needless to say that these systems can also be used for preparing and managing documents including color photographs or color images.

Figure 2:
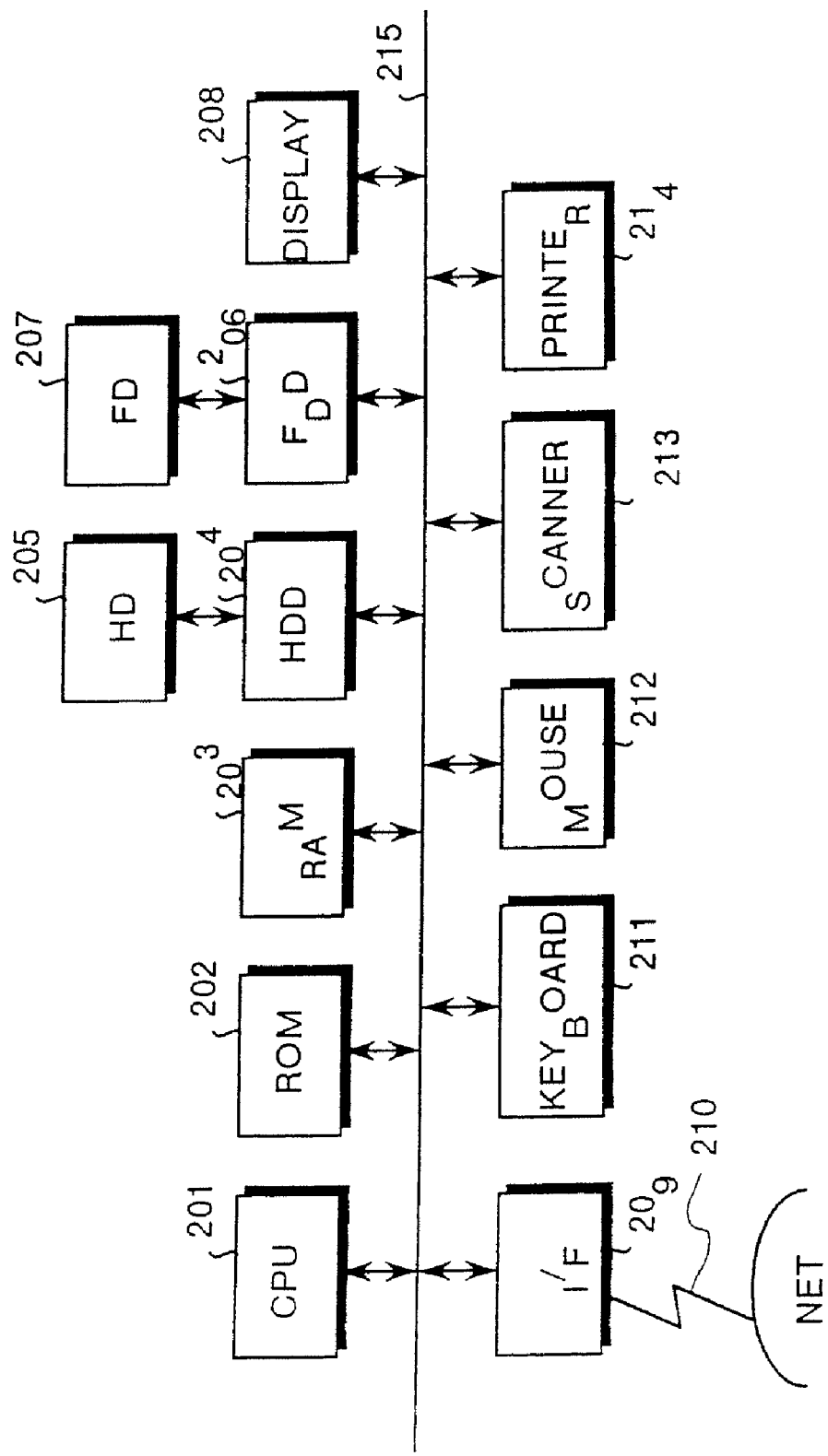
FIG. 2 is a block diagram showing hardware configuration of the image processing apparatus according to Embodiment 1.

Hardware configuration of the image processing apparatus 100 is described. FIG. 2 is a block diagram showing hardware configuration of the image processing apparatus according to Embodiment 1 of the present invention. In FIG. 2, designated at the reference numeral 201 is a CPU controlling the entire system, at 202 a ROM with a boot program or the like stored thereon, at 203 a RAM used as a work area for the CPU, at 204 a HDD (Hard Disk Drive) for controlling data read/write to and from a HD (hard Disk) 205 under controls by the CPU 201, and at 205 a HD for storing data written thereon according to controls by the HDD 204.

Further, designated at the reference numeral 206 is a FDD (Floppy Disk Drive) for controlling data read/write to and from a FD (Floppy Disk) according to controls by the CPU 201, at 207 a FD freely set or removed for storing data written under controls by the FDD 206, and at 208 a display for displaying documents each including images or the like and other functional information thereon.

Further, designated at the reference numeral 209 is a an interface (I/F) connected via a communication line 210 to a network NET and functioning as an internal interface with the network NET, at 211 a keyboard having keys for entering characters, numbers, various types of instructions or the like, at 212 a mouse for moving a cursor and also for executing such functions as selection of a range, at 213 a scanner for optically reading an image, at 214 a printer for printing the documents or the like, and at 215 a bus for connected the components described above to each other.

Figure 3:
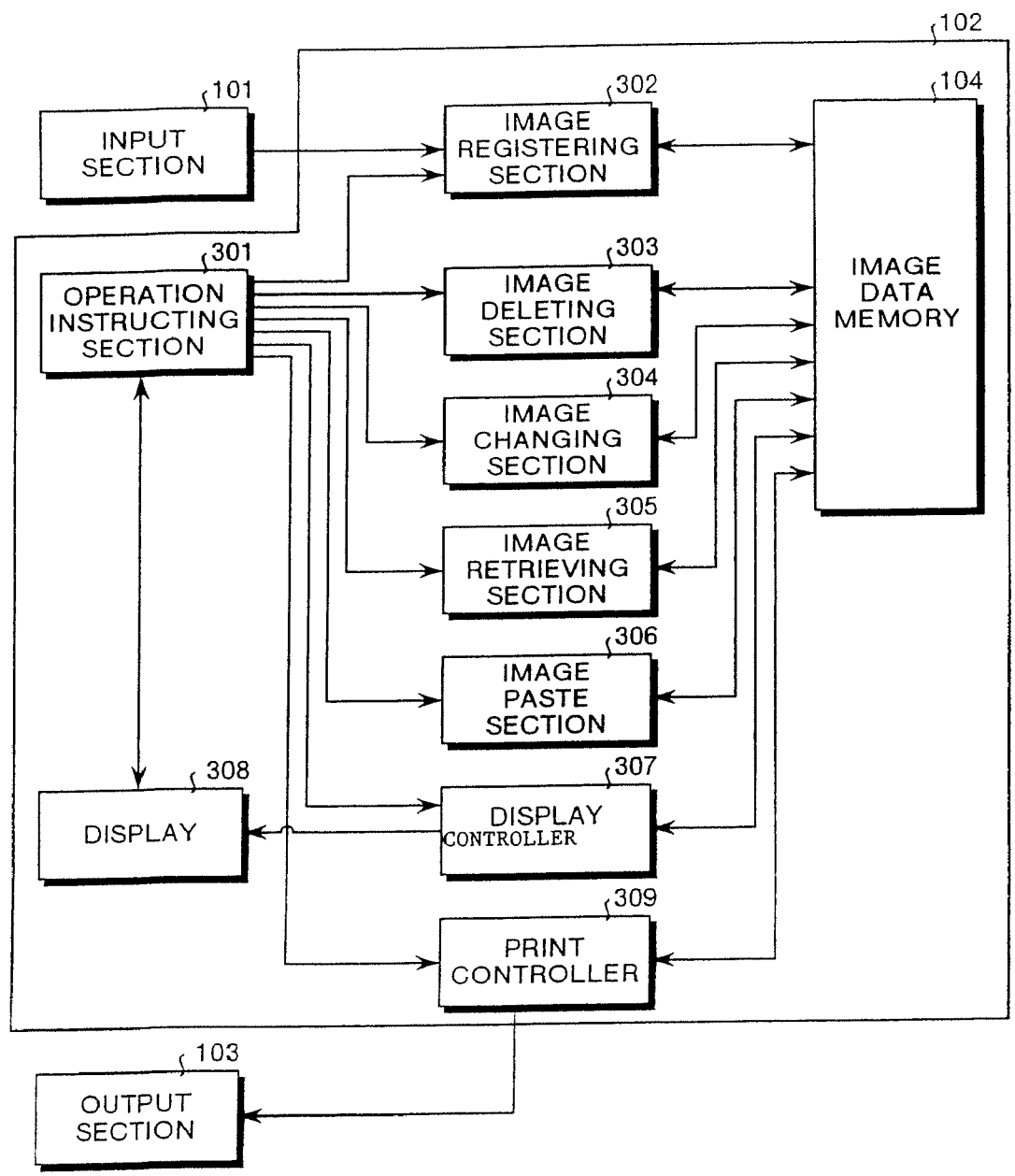
FIG. 3 is a block diagram functionally showing configuration of the image processing apparatus according to Embodiment 1.

FIG. 3 is a block diagram functionally showing configuration of the image processing apparatus 100 according to Embodiment 1 of the present innovation. In FIG. 3, the processor 102 comprises, in addition to the image data memory 104, an operation instructing section 301, an image registering section 302, an image deleting section 303, an image changing section 304, an image retrieving section 30, an image paste section 306, a display controller 307, a display 308, a print controller 309.

The operation instructing section 301 gives instructions to the image registering section 302, the image deleting section 303, the image changing section 304, the image retrieving section 305, the image paste section 306, the display controller 307, and the print controller 309 according to the contents of the display on the display 308. The operation instructing section 301 includes, for instance, the keyboard 211 or a pointing device such as the mouse 212.

The image registering section 302 registers image data sent from the input section 101 as an image data file by adding a specified data such as a file name thereto, and stores the image data in the image data memory 104.

The image deleting section 303 deletes image data already stored in the image data memory 104 according to an instruction for deletion from the operation instructing section 301.

The image changing section 304 changes image data in a image data file already stored in the image data memory 104 according to an instruction for changing from the operation instructing section 301, and stores the changed image data in the image data memory 104 again.

The image retrieving section 305 retrieves a desired image data file from image data files already stored in the image data memory 104 according to an instruction for retrieval from the operation instructing section 301.

The image paste section 306 pastes image data already stored in the image data memory 104 on a document according to an instruction for paste from the operation instructing section 301.

The display controller 307 provides controls so that an image of a image data file already stored in the image data memory 104 or a contracted image of the image is displayed on a screen of the display 308. Detailed description of controls by the display controller is made later.

The print controller 309 sends print data such as image data or a document with images paste thereon to the output section 103 according to an instruction for printing from the operation instructing section 301. Also the print controller 309 controls operations of the output section such as setting a number of copies to be printed according to an instruction from the operation instructing section 301.

The image registering section 302, image deleting section 303, image changing section 304, image retrieving section 306, image paste section 306, display controller 307, and print controller 309 realize the respective functions when the CPU 201 or other related section executes various types of commands according to instructions described in programs such as operating systems or application programs recorded in a storage medium such as the hard disk, or floppy disk 207.

The display 308 displays a document including images and characters or the like under controls by the display controller 307. The display 308 is, for instance, the display 208, and the display 208 includes a CRT, a liquid crystal display or the like.

Figure 4:
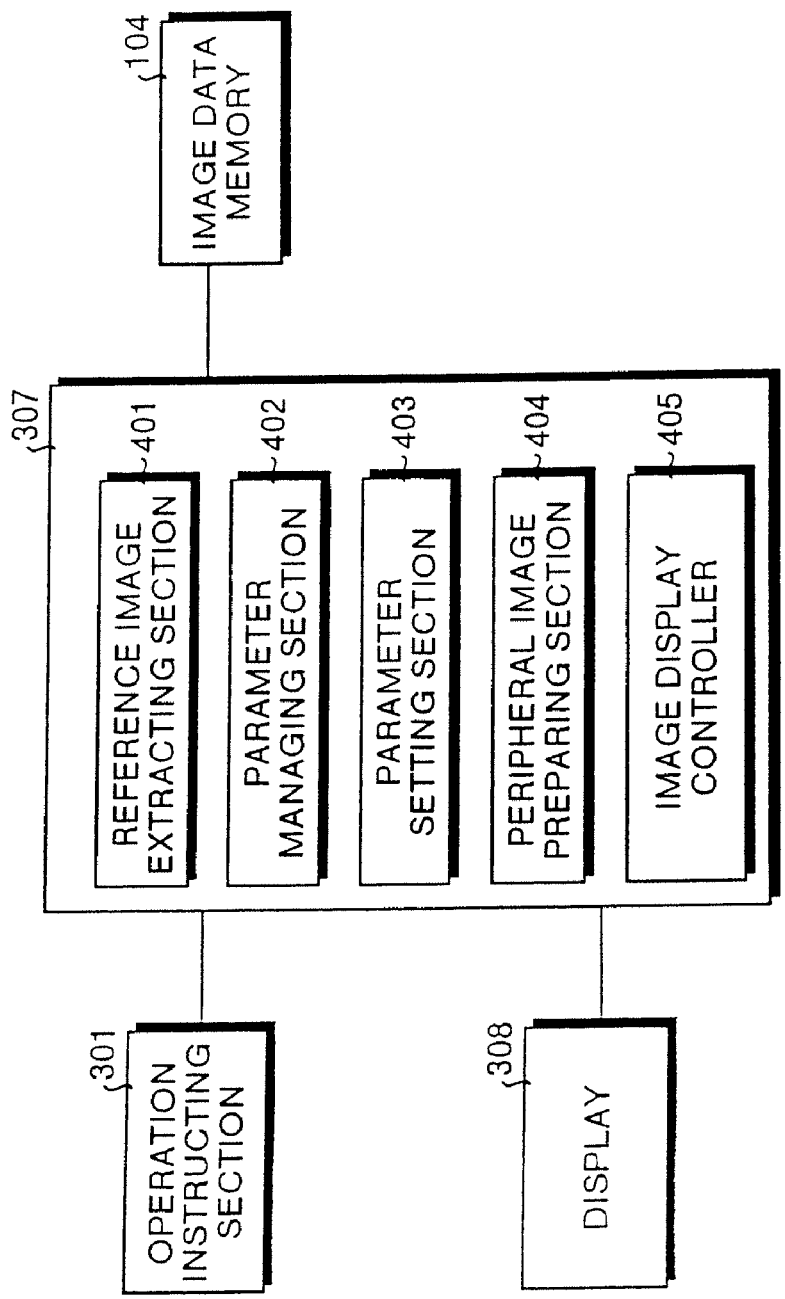
FIG. 4 is a block diagram functionally showing configuration of a display controller and a peripheral section thereof in the image processing apparatus according to Embodiment 1.

More detailed description is made for configuration of the display controller 307. FIG. 4 is a block diagram functionally showing configuration of the display controller and the peripheral section in the image processing apparatus according to Embodiment 1. As shown in FIG. 4, the display controller 307 comprises a reference image extracting section 401, a parameter managing section 402, a parameter setting section 403, a peripheral image preparing section 404, and an image display controller 405.

The reference image extracting section 401 is a section for extracting an image as a reference for editing and processing (reference image). More specifically, the reference image extracting section 401 can extract an image having the same size as the image displayed on the display 308 or a contracted image by clicking the mouse 212 or the like in the operating instructing section 301, or by specifying the image file name with the mouse 212 or from the keyboard 211 to read out the image from the image data memory 104.

The parameter managing section 402 is a section for managing a plurality of parameters for a reference image. The parameters include, in addition to parameters indicating brightness, chroma, and hue of an image, a parameter indicating contrast, a parameter indicating illuminant, those indicating the three element colors of red (R), green (G), and blue (B), and all other elements that define an image.

The parameter managing section 402 also manages parameter values of the plurality of parameters. Namely, the parameter managing section 402 stores a value of each parameter for a reference value as a reference parameter value.

The parameter setting section 403 selects arbitrary two parameters of the plurality of parameters managed by the parameter managing section 402 according to an instruction signal from the operation instructing section 301. Detailed description for an operation for selection executed by the operation instructing section 301 is made later.

The parameter setting section 403 also sets the selected two parameters as scales for the vertical axis and horizontal axis according to an instruction signal from the operation instructing section 301. For instance, the parameter setting section 403 sets a hue parameter as a scale for the vertical axis, and a brightness parameter as a scale for the horizontal axis. Also detailed description for the operations for setting scales for the vertical axis and horizontal axis are described later.

The peripheral image preparing section 404 is a section for preparing an image obtained by changing parameter values of the two parameter values selected by the parameter setting section 403 by specified rate against the reference image (peripheral image). For instance, when a hue parameter is set as a scale for the vertical axis and a chroma parameter as a scale for the horizontal axis, the peripheral image preparing section 404 prepares an image by increasing or reducing the hue parameter value for the reference image by a specified amount (for instance, by 10 levels).

Further, the peripheral image preparing section 404 processes a chroma parameter similarly. Further, the peripheral image preparing section 404 prepares an image obtained by increasing the two parameter values each by a specified amount, or an image obtained by reducing the two parameter values each by a specified amount, or other images in which any one of the parameter values is increased or reduced discretely.

The image display controller 40 is a section for providing controls over display so that a reference screen is displayed at a specified position of a display screen of the display 308. The specified position is previously specified at a place where the reference screen and the peripheral screen can easily be identified, but an operator may specify the position on a display screen of the display 308 through the operation instructing section 301.

More specifically, it is desirable to provide the specified position at the center of the screen, but the position may be moved with the mouse 212 or other appropriate tool by dragging the position to a position where the peripheral image is does not get hidden.

The image display controller 405 provides controls over display so that the peripheral images are distributed around the reference image in n layers in response to scales for the vertical axis and horizontal axis set with the parameter values of the peripheral image.

More specifically, for instance, when a parameter for hue is set as a scale for the vertical axis and a parameter for brightness is set as a scale for the horizontal scale, display controls are provided so that a peripheral, image obtained by increasing a parameter value for hue of the reference image by a specified amount is located above the reference image, and a peripheral image obtained by reducing a parameter value for hue by a specified amount is located below the reference image. Similarly, display controls are provided so that a peripheral image obtained by increasing a parameter value for brightness by a specified rate is located at the right side from the reference image and a peripheral image obtained by reducing the parameter value by a specified rate is located at the right side from the reference image.

Further, a peripheral images are distributed around the reference image to surround the reference image in n layers, and consequently, when the peripheral image comprises only one layer, nine images (including the reference value) are distributed in the from of a 3×3 matrix. When the peripheral images comprise two layers, twenty-five images are distributed in the from of a 5×5 matrix. The number of images can be changed according to the resolution of the screen or according to the contents or purpose of displaying the images. Detailed description is made for display controls for a peripheral image.

The peripheral image preparing section 404 and image display controller 405 realizes the respective functions when the CPU 201 or other related section executes commands according to instructions described in programs such as an operating system or application programs recorded in a storage medium such as the ROM 202, RAM 203, hard disk 205, or floppy disk 207.

Figure 5:
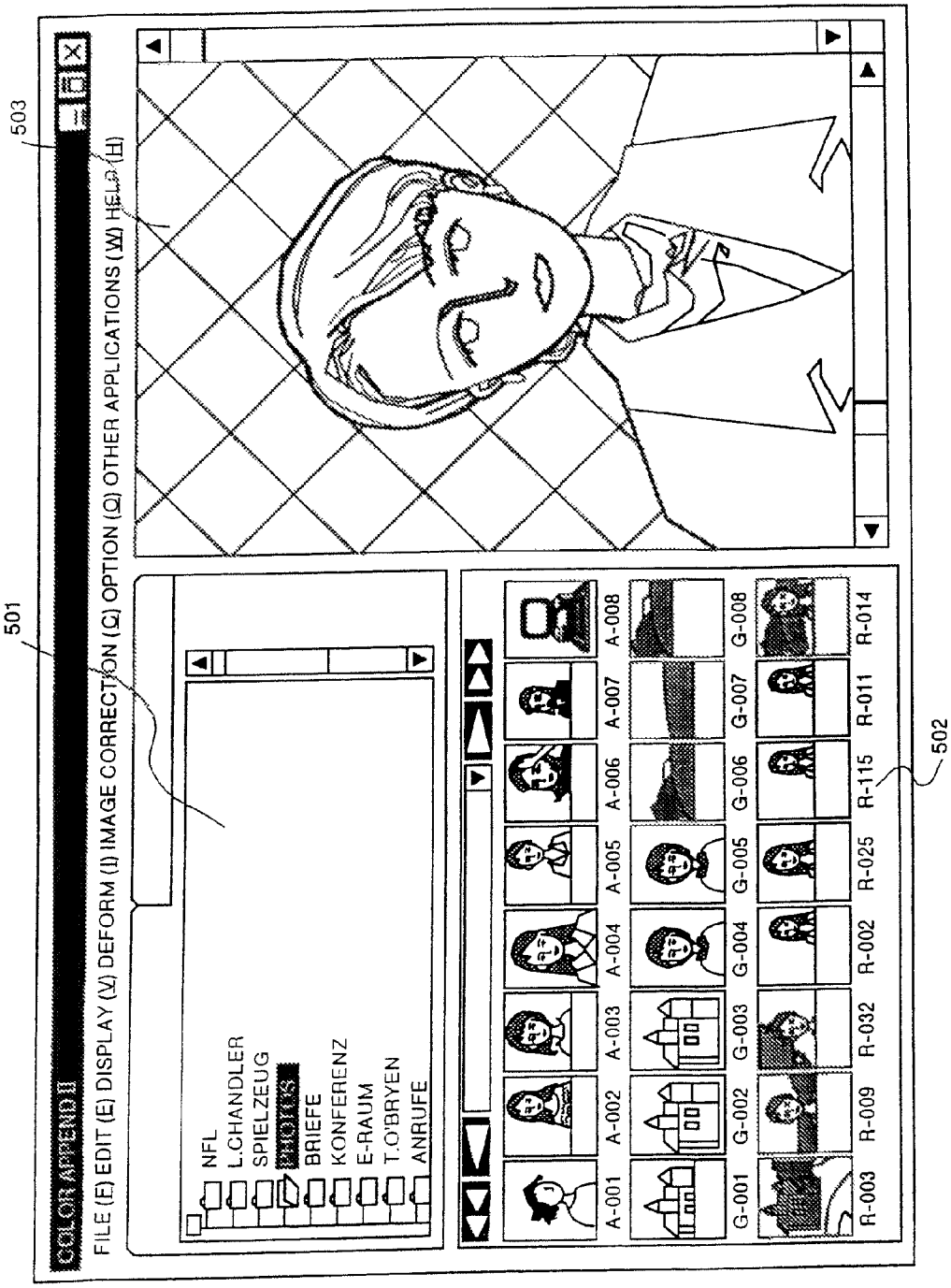
FIG. 5 is an explanatory view showing one example of a screen displayed on a display of the image processing apparatus according to Embodiment 1.

Next description is made for contents of operations of the image processing apparatus as well as for contents of displays on a display screen with reference to specific examples of displays. FIG. 5 shows one example of a screen displayed on the display 308 of the image processing apparatus 100 according to Embodiment 1 of the present invention. The screen shown in FIG. 5 is a basic screen of the image processing apparatus according to Embodiment 1. As shown in FIG. 5, the screen comprises a file name displaying area 502 occupying an upper side of the substantially left half of the screen, a contracted image displaying area 502 occupying an area below the file name displaying area 501, and a selected image displaying area 503 occupying substantially right half of the screen.

These areas are not displayed with a multiwindow, but are displayed in fixed areas respectively, and positions and sizes of these areas can not be changed. Thus, a screen having the same configuration is always displayed, so that the operator can identify these areas as one screen. The operator is not embarrassed during operation because he need not remember a complicated operational sequence and can easily operate the image processing apparatus and also can efficiently edit and process the images.

In the file name displaying area 501, file names stored in the image data memory 104, namely in the hard disk 205 or floppy disk 207 are displayed hierarchically. Operator can select a desired image data file by retrieving and specifying the desired image data file from among the image data files displayed in the file name displaying area 501.

In the contracted image displaying area 502 a plurality of contracted images are displayed. The contracted image is generally called as thumbnail, and the thumbnail is obtained by contacting actual image data with a specified magnification so that the operator can immediately identify to which file the image data file corresponds to by checking the contracted image. File name of an image data file for the thumbnail is displayed under each thumbnail.

In place of displaying file names in the file name displaying area 501 folders containing the files may be displayed in the file name displaying area 501 as shown in FIG. 5. The operator can select a desired image by specifying a folder in the file name displaying area 501 and clicking a desired thumbnail itself with the mouse 212 or the like displayed in the contracted displaying area 502.

In this case, even if the operator does not remember a correct file name, he can quickly and easily select a desired image data file using the thumbnail images as the key.

By previously adding a specified key word such as "person", "landscape", "for business use", or "for personal use" to each image data file, the operator can easily rearrange and display the thumbnails according to the key word. Therefore, even if a number of registered data files increases, the operator can quickly retrieve a desired image data file by rearranging the data files according to the key word.

In the example displayed in FIG. 5, eight thumbnails are displayed in three rows, but an arrangement of displayed thumbnails or a number of displayed thumbnails can be changed according to a resolution of the display, contents of a displayed image or a difference in the retrieving method.

The selected image displaying area 503 is an area for displaying an image based on image data file selected from a file name in the file name displaying area 501 or an image data file selected according to a thumbnail in the contracted image displaying area 502. As a form of display, a standard display for displaying an image with a standard size and a size-changed display for displaying an image with a size desired by the operator are conceivable.

The size may be specified by inputting a percentage of magnification, and when 100% is inputted, an image is displayed with the original size, and when any numerical values smaller than 100% is inputted the image is displayed in a reduced size, and when a numerical value larger than 100% is entered the image is displayed in an enlarged size.

In the selected image displaying area 503, by specifying a command from a preset menu, or by double-clicking the image itself, the image currently being displayed can be displayed on the entire screen so that the file name displaying area 501 and contracted image displaying area 502 hide below the image. With this operation, the work for editing and processing of the image can be executed efficiently. This operation is especially effective when a large image is to be edited and processed.

When the processing for editing and processing an image is completed, by specifying a command from a preset menu, or by double-clicking the image itself again, again the image can be displayed in the original selected image displaying area, and the file name displaying area 501 and contracted image displaying area 502 are displayed again.

Figure 6:
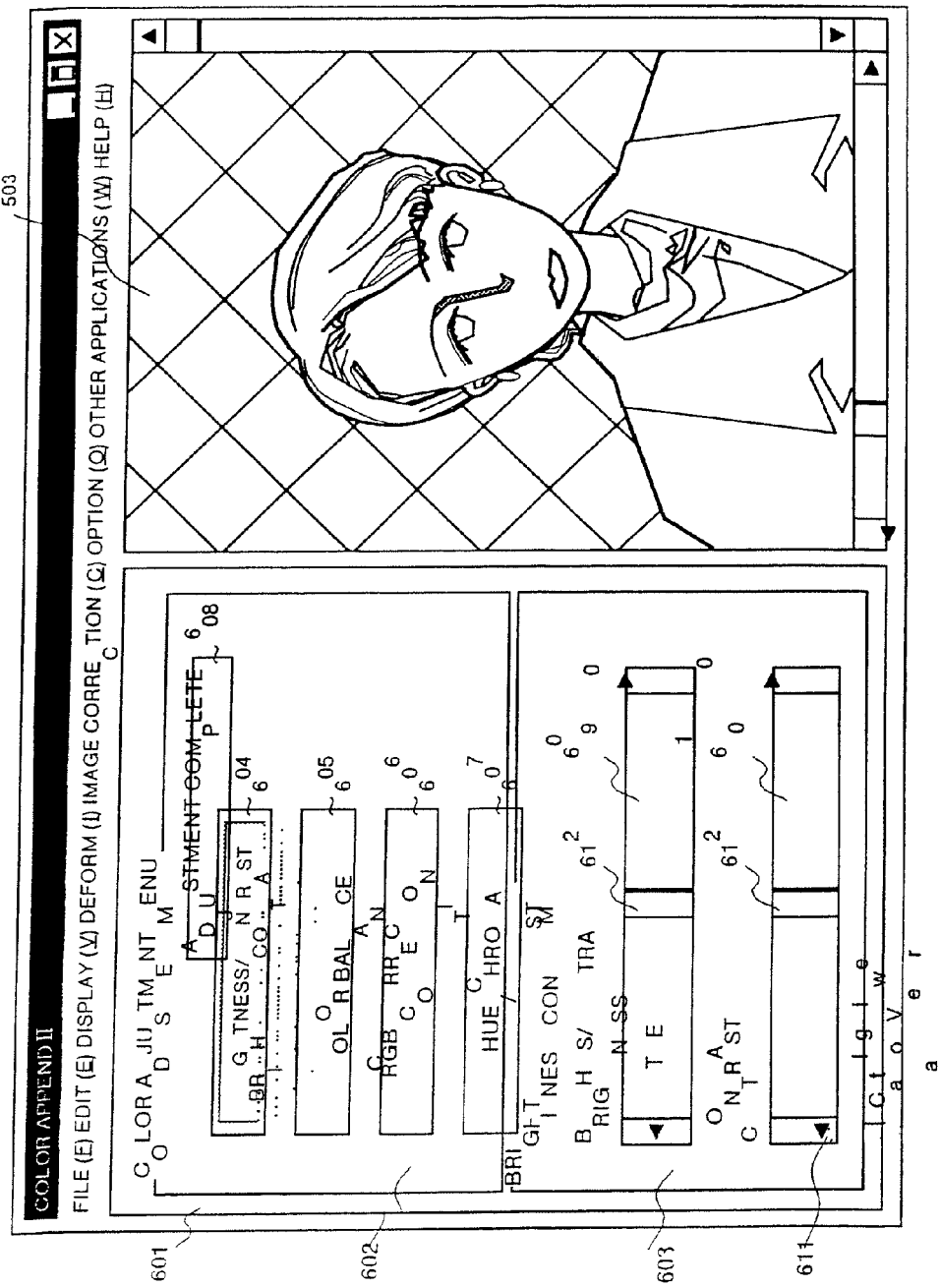
FIG. 6 is an explanatory view showing another example of a screen displayed on the display of the image processing apparatus according to Embodiment 1.
Figure 7:
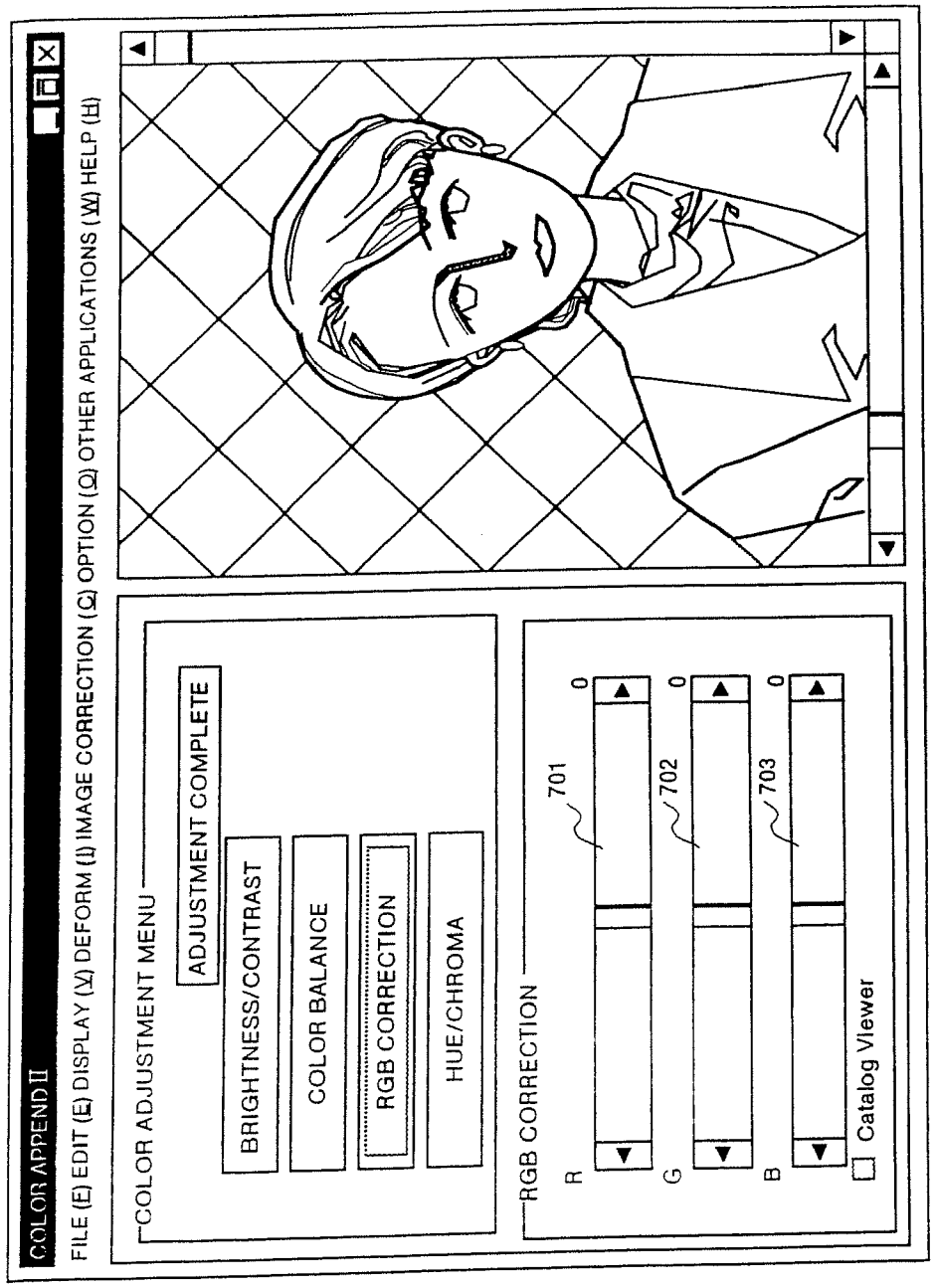
FIG. 7 is an explanatory view showing another example of a screen displayed on the display of the image processing apparatus according to Embodiment 1.
Figure 8:
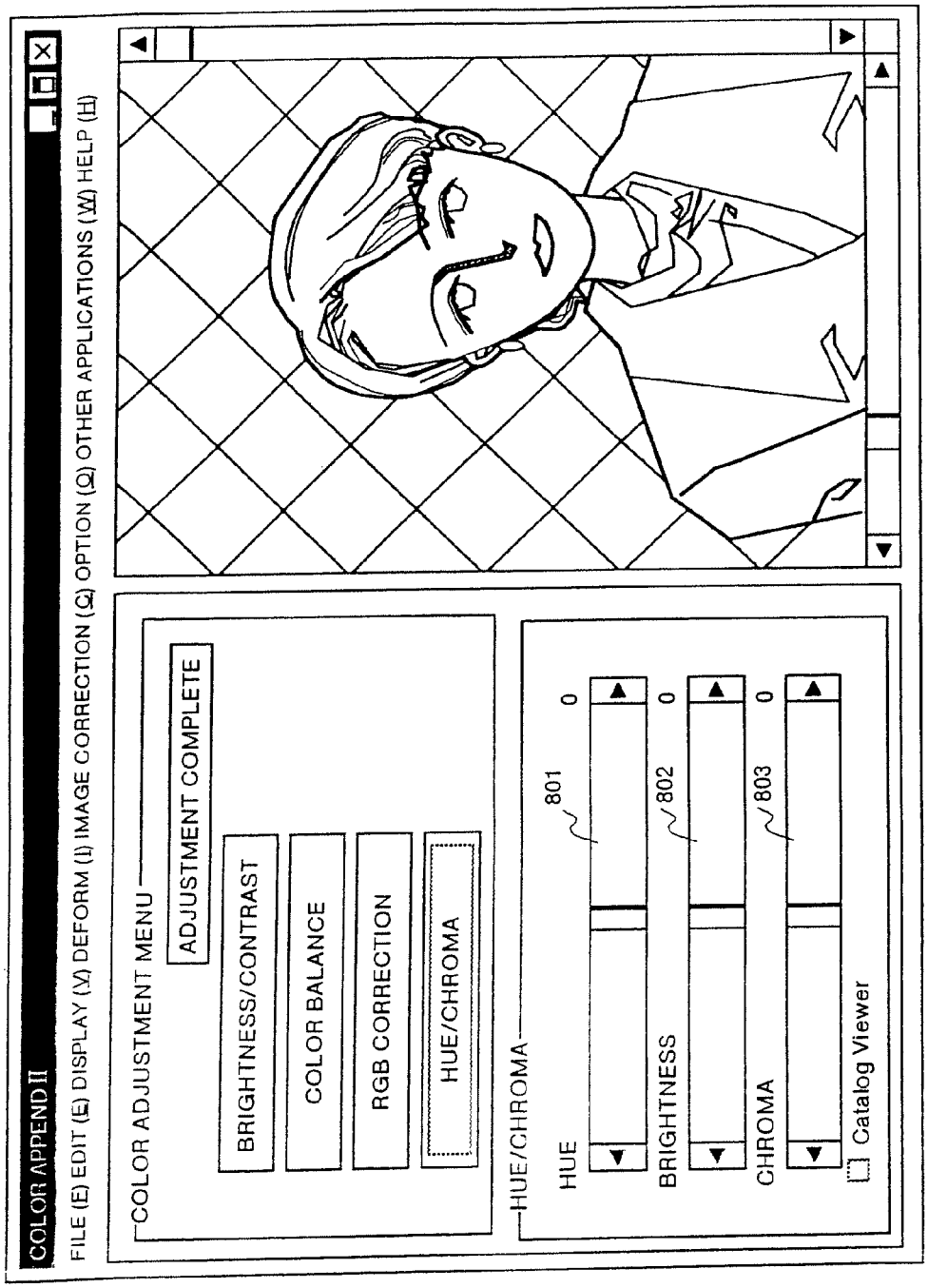
FIG. 8 is an explanatory view showing another example of 1 a screen displayed on the display of the image processing apparatus according to Embodiment 1.

Next, description is made for the operations for adjusting a color as well as for contents of a screen. FIG. 6 to FIG. 8 are example of screens displayed on the display 308 of the image processing apparatus 100 according to Embodiment 1. A screen as shown in FIG. 6 is displayed when a color adjustment menu is selected on the basic screen shown in FIG. 5.

In the screen shown in FIG. 6, there is no charge in the selected image displaying area 503, while a color adjustment menu 601 is displayed in place of the file name displaying area 501 and contracted image displaying area 502. The color adjustment menu 601 consists of a parameter selection button displaying area 602 and a parameter adjustment bar displaying area 603.

The parameter selection button displaying area 602 comprises a "brightness/contrast" button 604, a "colorbalance" button 605, an "RGB correction" button 606, a "hue/chroma" button 607, and an "adjustment complete" button 608. When the button 608 is operated, all the adjustments are completed and the basic screen is displayed.

In the parameter adjustment bar displaying area 603, a display screens to be displayed when the "brightness/contrast" button 604 is operated are displayed, and also an adjustment bar 609 for brightness and an adjustment bar 610 for contrast are displayed therein. Further, a check box 611 for specifying whether a catalog viewer for displaying peripheral screens in addition to the reference screen for adjustment when adjusting parameters is displayed. The catalog viewer is described later.

A level volume 612 is provided for each of the adjustment bars 609 and 610, and each parameter value can be changed by dragging the level volume 612 in the horizontal direction with the mouse 212.

A screen displayed when the "RGB correction" button 606 is operated is shown in FIG. 7. An adjustment bar 701 for a red color (R), an adjustment bar 702 for a green color (G), and an adjustment bar 703 for a blue color (B) are displayed in the parameter adjustment bar displaying area 603. Each of the adjustment bars 701, 702, and 703 has the same configuration as that of the adjustment bar 609, so that description thereof is omitted herein.

Further, a screen when the "hue/chroma" button 607 is operated is shown in FIG. 8. An adjustment bar 801 for hue, an adjustment bar 802 for brightness and an adjustment bar 803 for chroma are displayed in the parameter adjustment bar displaying area 603. Each of the adjustment bars 801, 802, 803 has the same configuration as that of the adjustment bar 609, so that description thereof is omitted herein.

Figure 9:
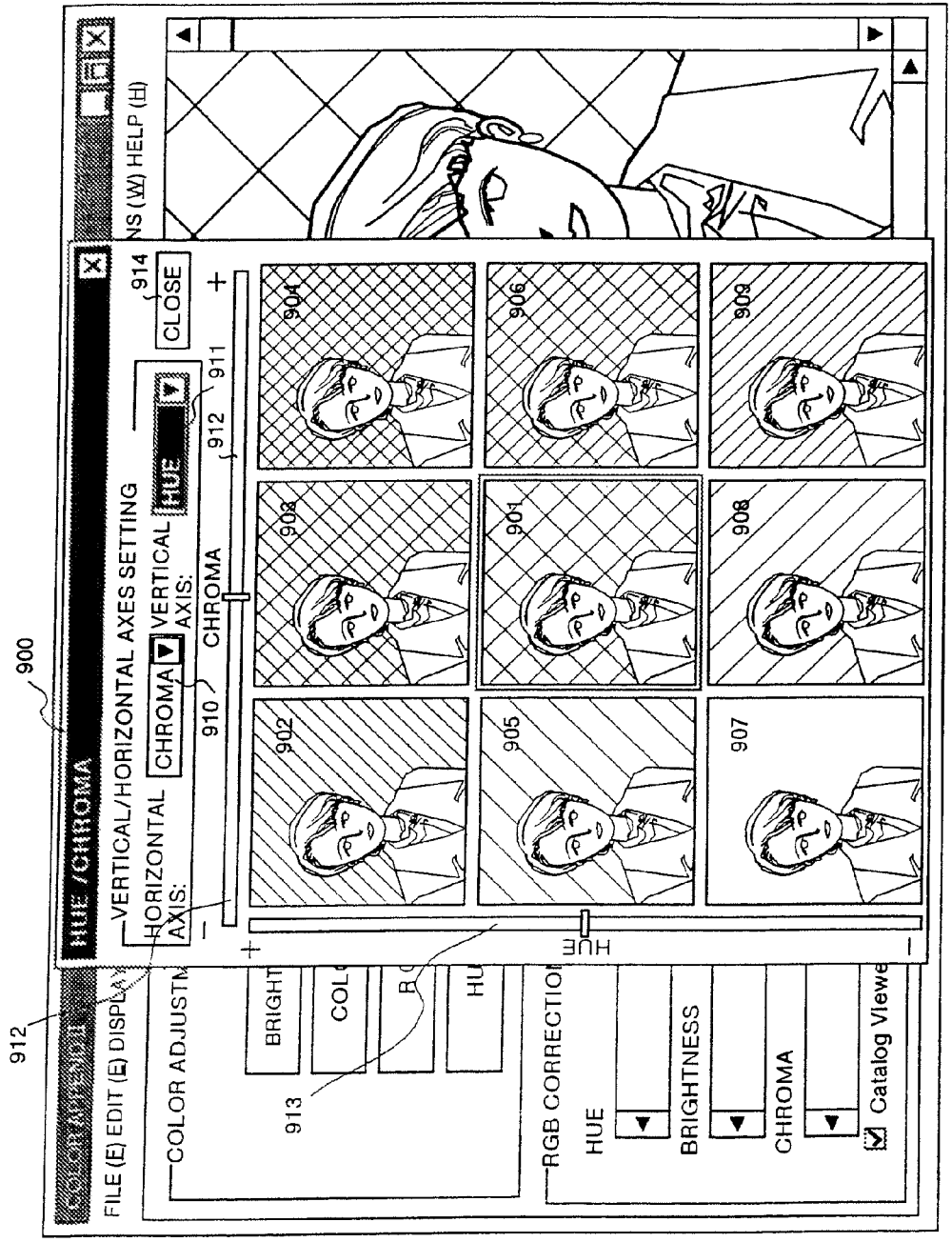
FIG. 9 is an explanatory view showing another example of a screen displayed on the display of the image processing apparatus according to Embodiment 1.

Next, description is made for the catalog viewer. FIG. 9 shows an example of a screen when the check box 611 for specifying whether the catalog viewer is to be displayed or not is checked. In FIG. 9, a catalog viewer 900 is displayed in a window form in the popped-up state.

In the catalog viewer 900 nine image are displayed in a 3×3 matrix form. The image displayed at the center is a reference image 901, and eight peripheral images 902 to 909 are displayed around the reference image 901.

Provided in the window 900 are a horizontal axis parameter frame 910 for setting a parameter for the horizontal axis and a vertical axis parameter frame 911 for setting a parameter for the vertical axis. In FIG. 9, a parameter for chroma is set on the horizontal axis, and that for hue on the vertical axis respectively.

A scale (horizontal scroll bar) 912 for a parameter value for chroma is provided in the horizontal direction (in the upper side) of nine images, and also a scale (vertical scroll bar) 913 for a parameter value for hue is provided in the vertical direction (at the left side) of the nine images according to the parameter set as described above.

A parameter value for chroma increases as one goes rightward on the horizontal scroll bar, and a parameter value decrease as one goes leftward. Likely, a parameter value for hue increases as one goes upward on the vertical scroll bar, and a parameter value decrease as one goes downward.

A "close" button 914 for closing the window of the catalog viewer 900 is provided on the catalog viewer 900.

The reference image 901 is an image obtained by contracting the same image as that displayed in the selected image displaying area 503. Therefore, the parameter values for chroma and hue of the reference image 901 are the same as those for the image displayed in the selected image displaying area 503.

Now, description is made for the peripheral images 902 to 909. Each of the peripheral images 902 to 909 is the same image as the reference image 901, and is obtained by changing either one of or both of parameter values for chroma and hue of the reference image 901 by a specified amount.

Assuming that parameter values for the reference image 901 are (0, 0), when a change in the specified amount of the parameter values is plus or minus, parameter values for the peripheral image 902 becomes (−10, 0), those for the peripheral image 903 becomes (0, 0), those for the peripheral image 904 becomes (10, 10), those for the peripheral image 90 becomes (−10, 0), those for the peripheral image 906 becomes (10, 0), those of the peripheral image 907 becomes (−10, −10), those for the peripheral image 908 becomes (0, −10), and those for the peripheral image 909 becomes (10, −10).

Taking the parameter values for the peripheral image 902 as an example, a parameter value for chroma on the horizontal axis is −10 as compared to that for the reference image 901, while a parameter value for hue on the vertical axis is +10 as compared to that for the reference image 901. Thus, the peripheral image 902 is located at the left side from the reference image 901 for chroma, and at the upper side from the reference image 901 for hue. Consequently, the peripheral image 902 is located at the left upper side from the reference image 901.

As for other peripheral images 903 to 909, the peripheral image 903 is located at the upper side from the reference image 901, the peripheral image 904 at the right upper side, peripheral image 905 at the left side, peripheral image 906 at the right side, peripheral image 907 at the left lower side, peripheral image 908 at the lower side, and peripheral image 909 at the right lower side from the reference image 901 each from the reference image 901 respectively.

Thus, the peripheral images 902 to 909 surround the reference image 901 with the latter being at the center by correlating parameters for the peripheral images 902 to 909 to the horizontal scroll bar 912 indicating a scale for the horizontal axis as well as to the vertical scroll bar 913 indicating a scale for the vertical axis.

To change an image, dragging or other appropriate operation is performed on the horizontal scroll bar 912 and/or the vertical scroll bar 913. With this operation, an image based on parameter values changed according to the scroll bars is displayed.

Figure 10:
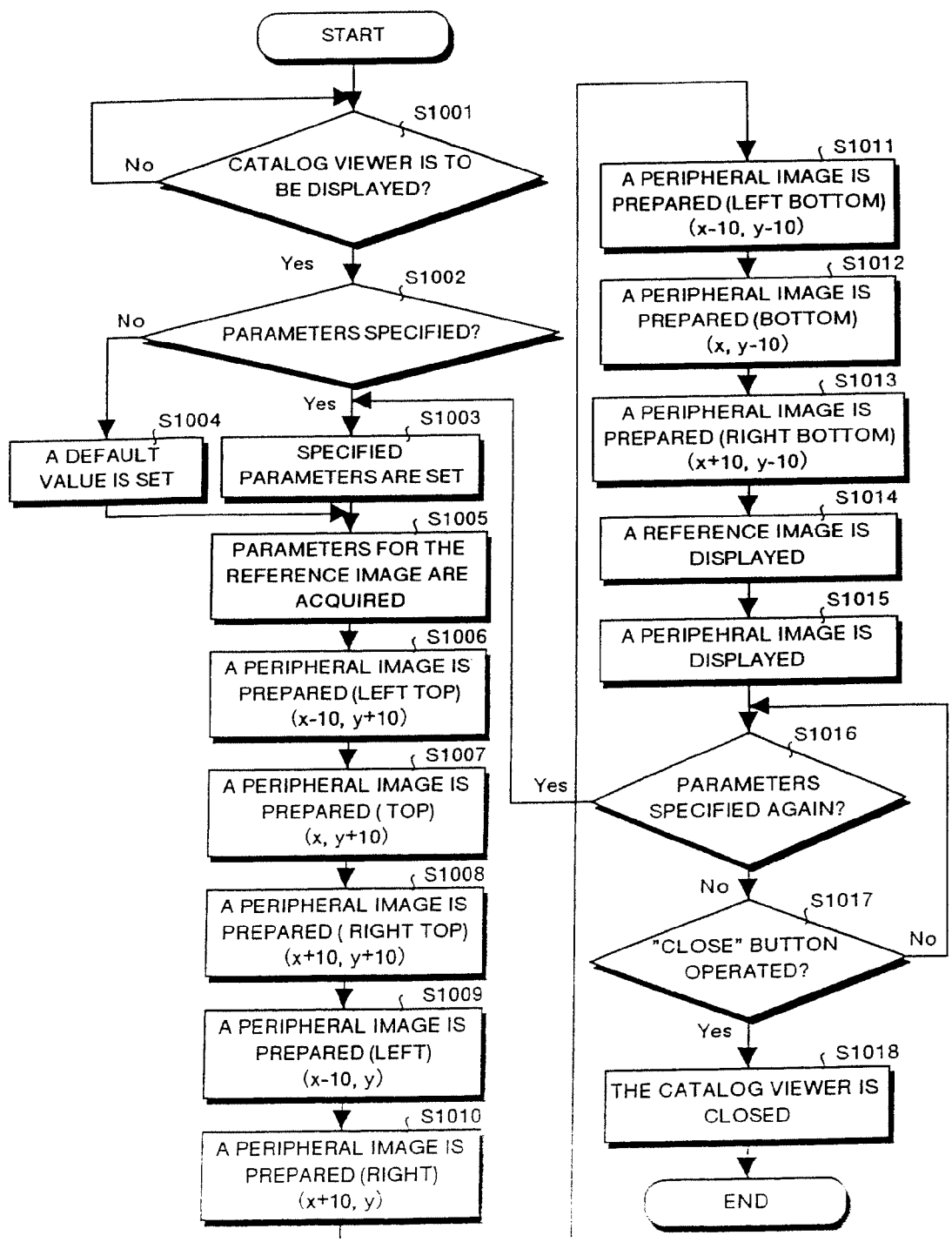
FIG. 10 is a flow chart showing a sequence of display control processing according to Embodiment 1.

Description is made for a sequence of processing for providing controls over display of the reference image 901 and peripheral images 902 to 909 performed by the display controller 307. FIG. 10 is a flow chart showing a sequence of the display control processing in Embodiment 1.

In the flow chart shown in FIG. 10, at first determination is made as to whether an instruction for displaying the catalog viewer 900 has been issued or not, namely whether the check box 611 has been checked or not. When it is determined that the instruction has been issued (step S1001, YES), determination is made as to whether parameters for the vertical axis and horizontal axis have been specified or not (step S1002).

When it is determined in step S1002 that the parameters have been specified (step S1002, YES), the specified parameters are set (step S1003). On the other hand, when it is determined that the parameters have not been specified (step S1002, NO), default values set for the parameters are set as the specified parameters (step S1004).

Next, the parameter values of parameters of the reference image 901 for the horizontal axis and vertical axis set in step S1003 or step S1004 are acquired from the parameter managing section 402 (step S1005).

Next the peripheral image 902, namely the peripheral image located at the left upper side from the reference image 901 is prepared (step S1006). More specifically, a parameter value x of a parameter for the horizontal axis for the reference value is set to 0 (x=0), and x−10 is set as a parameter value of a parameter for the horizontal axis of the peripheral image 902. Likely for the vertical value, a parameter value y for the reference value is set to 0 (y=0), and y+10 is set as a parameter value for the vertical axis. Thus, the parameter values for the peripheral image 902 become (x−10, y+10).

Operations from step S1007 to step S10013 are executed according to the same sequence as that in step S1006. It should be noted that the operations in step S1006 to step S1013 are not always required to be executed according to the sequence as described above. In addition, although parameters are computed by referring to the parameter values of the reference image in the above description, the parameter values may be computed by referring to other peripheral images already prepared among the eight peripheral images.

When all of the peripheral images 902 to 909 are prepared the reference image 901 is displayed on the screen (step S1014), and then the peripheral images 902 to 909 are displayed on the same display screen (step S1015).

In the above description, after all of the peripheral images 902 to 909 have been prepared, the reference image 901 is displayed, but the reference image 901 may be displayed before the peripheral images 902 to 909 are prepared. Also in the above description, the peripheral images 902 to 909 are displayed after all of the peripheral images 902 to 909 are prepared, but the peripheral images may be displayed each time each discrete peripheral image is prepared.

Next, determination is made as to whether parameters for changing those currently being set have been specified or not (step S1016). When it is determined in step S1016 that the parameters have been specified again (step S1016, YES), system control shifts to step S1003, and the same processing is repeated in the subsequent steps.

On the other hand, when it is determined in step S1016 that the parameters have not bee specified, determination is made as to whether the "close" button 914 for closing the catalog viewer 900 has been operated or not (step S1017).

When it is determined in step S1017 that the "Close" button 914 is operated (step S1017, YES), the catalog viewer 900 is closed (step S1018), and the processing sequence is terminated.

When it is determined in step S1017 that the "close" button 914 has not been operated (step S1017, NO), system control shifts to step S1016, and the same processing sequence is repeated in the subsequent steps.

As described above, with this Embodiment 1 of the present invention, parameter values for a reference image can be changed while referring to the peripheral image. Especially, the peripheral images are located around the reference image in correlation to parameters for the vertical axis and horizontal axis, so that the amount of change in each parameter value, how the image has been changed, and balance with other parameters can intuitively be recognized, and also parameters can quickly and efficiently be changed.

Although the parameter setting section 403 sets parameters for vertical and horizontal axes by entering parameters in a horizontal-axis parameter setting frame 911 and a vertical-axis parameter setting frame 912 in Embodiment 1, like in Embodiment 2 described below, parameters may be set by selecting from a plurality of preset parameters.

The hardware configuration of an image and document preparing system as a whole including an image processing apparatus according to Embodiment 2 of the present invention and the image processing apparatus 100 are the same as those in Embodiment 1, so that description thereof is omitted herein. The configuration in the other sections of the image processing apparatus 100 excluding the display controller 307 is also the same as those in Embodiment 1, so that description thereof is also omitted herein.

Figure 11:
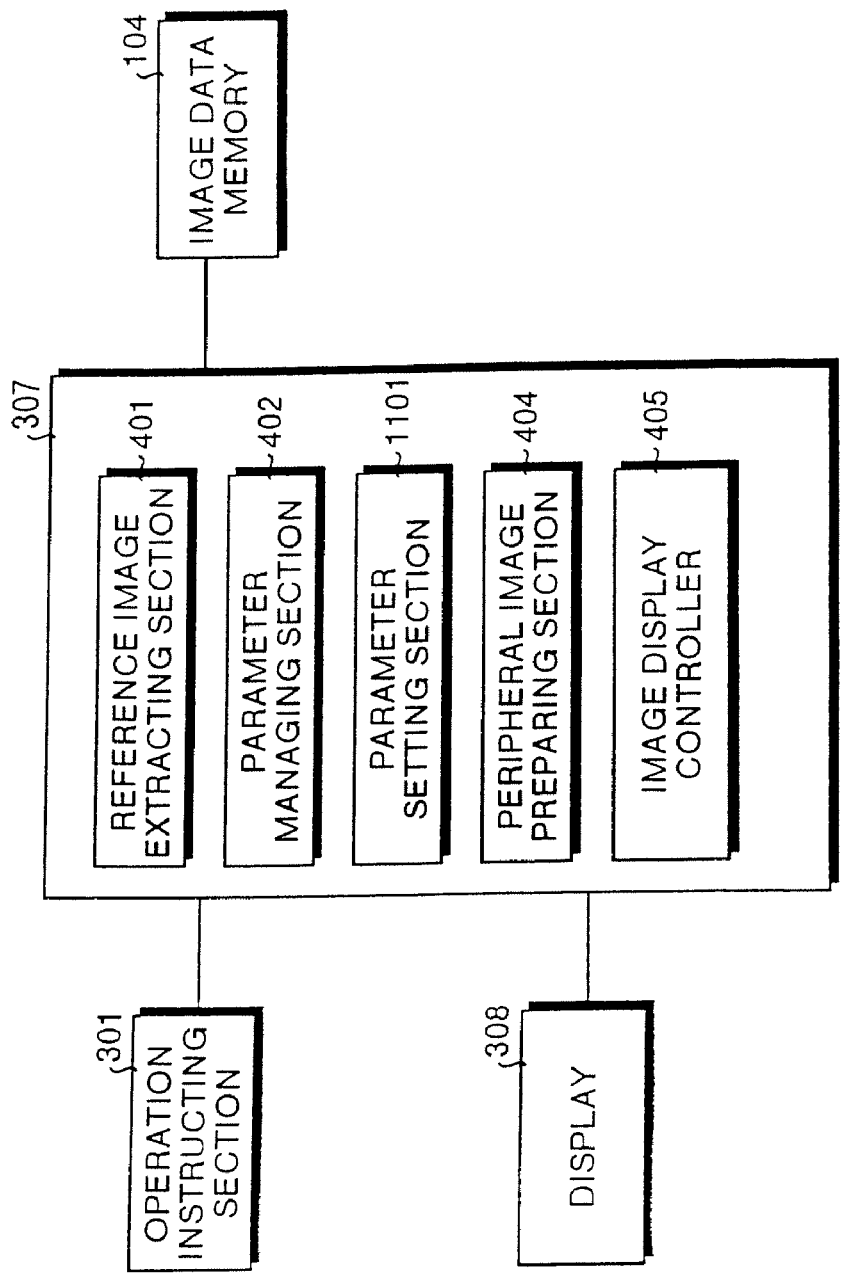
FIG. 11 is a block diagram functionally showing functions of a display controller and a peripheral section thereof in the image processing apparatus according to Embodiment 2 of the present invention.

Next, description is made for the display controller 307. FIG. 11 is a block diagram functionally showing configuration of the display controller and peripheral sections thereof in the image processing apparatus according to Embodiment 2 of the present invention. The configuration of the other sections thereof excluding a parameter setting section 1101 is the same as those of Embodiment 1, so that description thereof is also omitted herein.

The parameter setting section 1101 previously prepares parameters which can be set as parameters for the vertical and horizontal axes, displays candidates for those parameters on the screen, and sets parameters from the parameter candidates one by one for each axis according to an instruction signal from the operation instructing section 301.

In this case, controls are provided so that any parameter the same as that already set on either of the axes can not be set on the other axis. It is meaningless to set the same parameter in both of the axes, because if the operator sets the parameters by mistake, there might occur a conflict between parameter values in an image in the upper left side and an image in the lower right side from the reference image.

Figure 12:
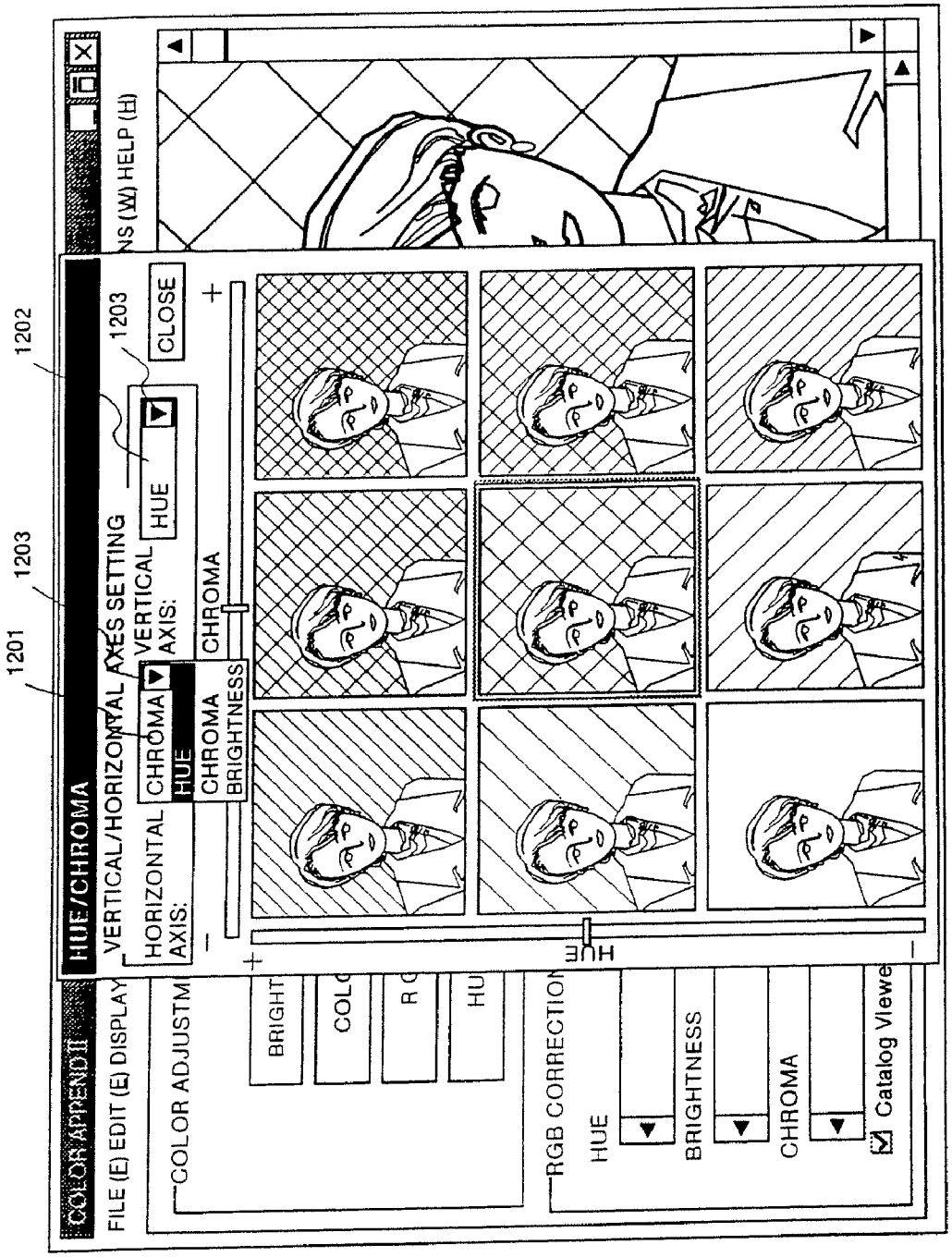
FIG. 12 is an explanatory view showing an example of a screen displayed on a display of the image processing apparatus according to Embodiment 2.

Next, description is made for setting of scales for the vertical axis and the horizontal axis. FIG. 12 shows an example of a screen displayed on the display 308 of the image processing apparatus according to Embodiment 2 of the present invention. In FIG. 12, a parameter concerning current chroma is set in a horizontal-axis parameter setting frame 1201, and a parameter concerning hue is set in a vertical-axis parameter setting frame 1202.

By pressing a button 1203 at the right edge of the horizontal-axis parameter setting frame 1201, selectable candidates are displayed as a pull-down menu. It can be seen that hue and brightness including the currently set chroma are displayed thereon as selectable parameter candidates. As for the vertical-axis parameter setting frame 1202, similarly to the horizontal-axis parameter setting frame 1201, by pressing a button 1203 at the right edge thereof, hue, chroma, and brightness are also displayed thereon as selectable candidates.

When a parameter of hue is to be selected and set in the horizontal-axis parameter setting frame 1201 in the state shown in FIG. 12, the parameter setting section 1101 recognizes that the parameter of hue has already been set in the vertical-axis parameter setting frame 1202, sends a notice to that effect to the operator, and inhibits the setting of a parameter of hue by invalidating entry of a parameter of hue in the horizontal-axis parameter setting frame 1201.

The parameter setting section 1101 may permit, in the same case as described above, setting of a parameter concerning hue in the horizontal-axis parameter setting frame 1201 in place of sending the notice to that effect to the operator and/or in place of reporting it, and in turn automatically set other selectable parameter in place of the parameter concerning hue already set in the vertical-axis parameter setting frame 1202, in this case, a parameter concerning chroma or brightness in place of hue in the frame 1202.

By operating as described above, when the operator wants to change only the axis from the vertical axis to the horizontal axis or in some other similar cases, other parameter can automatically be set on the vertical axis on condition that only the axis is directly set to the horizontal axis, which makes it possible to reduce the time and efforts required for the work that a parameter for the vertical axis is change and a parameter the horizontal axis is set.

Figure 13:
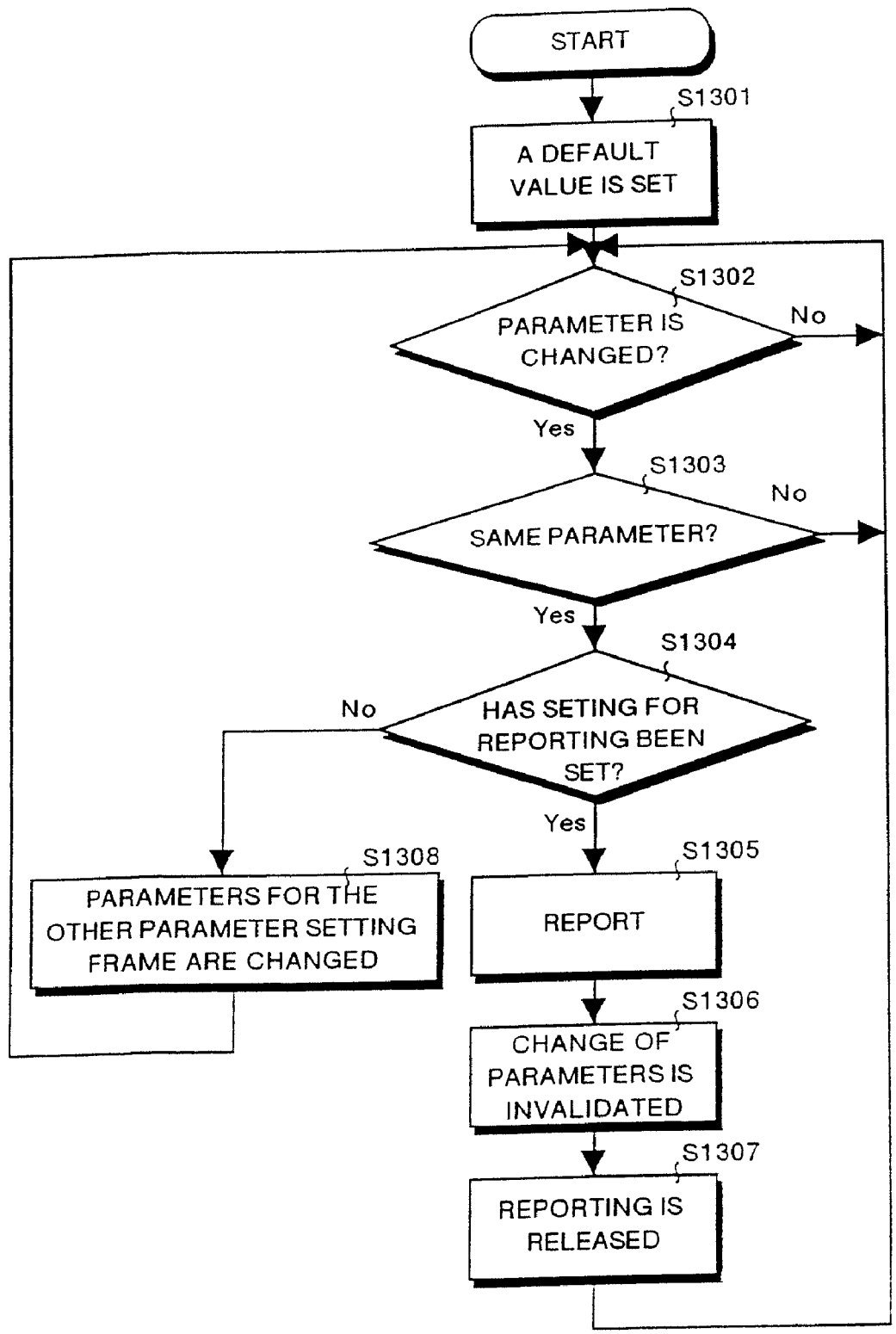
FIG. 13 is a flow chart showing a sequence of parameter setting processing according to Embodiment 2.

Next, description is made for a sequence of setting the parameters by the parameter setting section 1101 in Embodiment 2. FIG. 13 is a flow chart showing the sequence of parameter setting according to Embodiment 2 of the present invention.

In the flow chart of FIG. 13, at first the parameter setting section 1101 sets parameters set as default values in the horizontal-axis parameter setting frame 1201 and the vertical-axis parameter setting frame 1202 (step S1301).

Then, the parameter setting section 1101 determines whether either of the parameters in the horizontal-axis parameter setting frame 1201 and the vertical-axis parameter setting frame 1202 is changed or not (step S1302), and if it is determined that the parameter has been changed (step S1302, YES), the parameter setting section 1101 determines whether the changed parameter is the same as that in the other axis parameter setting frame or not (step S1303).

In step S1303, when it is determined that the parameters are not the same (step S1303: NO), the processing shifts to step S1302. On the other hand, when it is determined in step S1303 that the parameter is the same as the other frame (step S1303, YES), then, the parameter setting section 1101 determines whether setting for reporting has been made or not (step S1304).

In step S1304, when it is determined that the setting for reporting has been made (step S1304, YES), the parameter setting section 1101 sends a report to that effects to the operator* (step S1305). Then, the parameter setting section 1101 invalidates the change of the parameter in step S1302 (step S1306) and relieves the report mode (step S1307), and the processing shifts to step S1302.

On the other hand, when it is determined in step S1304 that the setting for reporting has not been made (step S1304: NO), the parameter setting section 1101 changes a parameter in the other parameter setting frame which is not one where the parameter has been changed to any parameter other than the currently set parameter (step S1308). Then, the processing shifts to the step S1302 and the same processing as described above is repeated hereinafter.

As described above, with Embodiment 2, it can be inhibited that the same parameter is concurrently set on the vertical and horizontal axes, so that it is possible to prevent an operator from setting the same parameter for both the vertical axis and horizontal axis by mistake.

The present invention in Embodiments 1 and 2 described above may add thereto functions of specifying one peripheral image from the peripheral images and extracting the specified peripheral image as a reference image like in Embodiment 3 described below. Description is made hereinafter for Embodiment 3 of the present invention.

The hardware configuration of an image and document preparing system as a whole including an image processing apparatus according to Embodiment 3 of the present invention and the image processing apparatus 100 are the same as those in Embodiment 1, so that description thereof is omitted herein. The configuration of the other sections of the image processing apparatus 100 excluding the display controller 307 is also the same as those in Embodiment 1, so that description thereof is also omitted herein.

Figure 14:
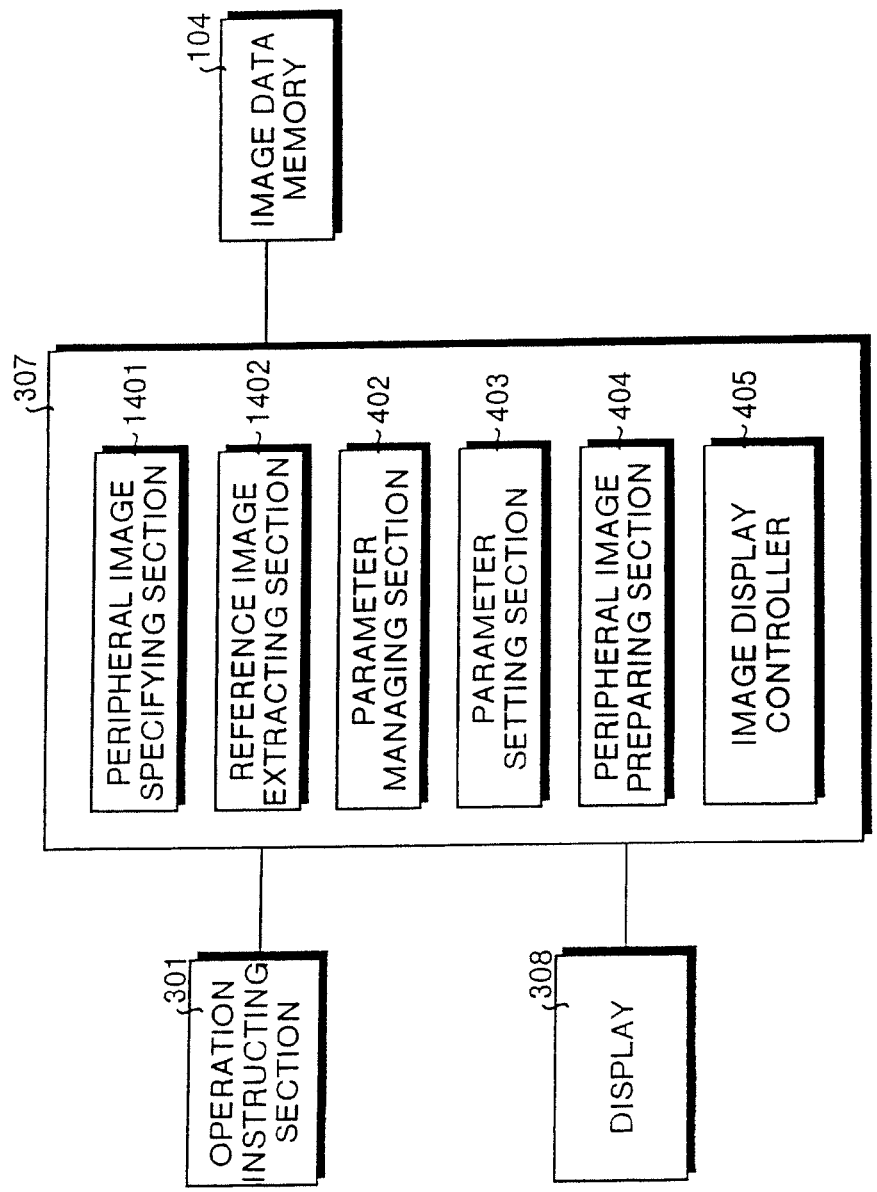
FIG. 14 is a block diagram functionally showing configuration of a display controller and a peripheral section thereof in the image processing apparatus according to Embodiment 3 of the present invention.

Next, description is made for the display controller 307. FIG. 14 is a block diagram functionally showing configuration of the display control and peripheral sections thereof in the image processing apparatus according to Embodiment 3 of the present invention. The configuration of the other sections thereof excluding a peripheral image specifying section 1401 and a reference image extracting section 1402 is also the same as those of Embodiment 1, so that description thereof is also omitted herein.

Next, description is made for the peripheral image specifying section 1401. The peripheral image specifying section 1401 is a section for specifying one peripheral image from the peripheral images displayed on the screen. More specifically, the peripheral image specifying section 1401 specifies one peripheral image from the peripheral images according to an instruction signal from the operation instructing section 301.

For instance, a mouse cursor is shifted within an area where a peripheral image to be specified is displayed and is clicked on with a mouse 212 to specify one peripheral image. In addition to the specification described above, one peripheral image may be specified with an arrow key on the keyboard 211.

The reference image extracting section 1402 extracts a peripheral image specified by the peripheral image specifying section 1401 as a reference image. Accordingly, the peripheral image specified by the peripheral image specifying section 1401 is handled, by the reference image extracting section 1402, as a reference image in place of the image having been used as a reference image until then.

The peripheral image specifying section 1401 and reference image extracting section 1402 realize the respective functions when the CPU 201 or other related section executes commands according to instructions described in programs such as an operating system or application programs recorded in a storage medium such as the ROM 202, RAM 203, hard disk 205, or floppy disk 207.

The parameter managing section 402, parameter setting section 403, peripheral image preparing section 404, and image display controller 405 execute the same processing as that in Embodiment 1, so that description thereof is omitted herein.

Figure 15A:
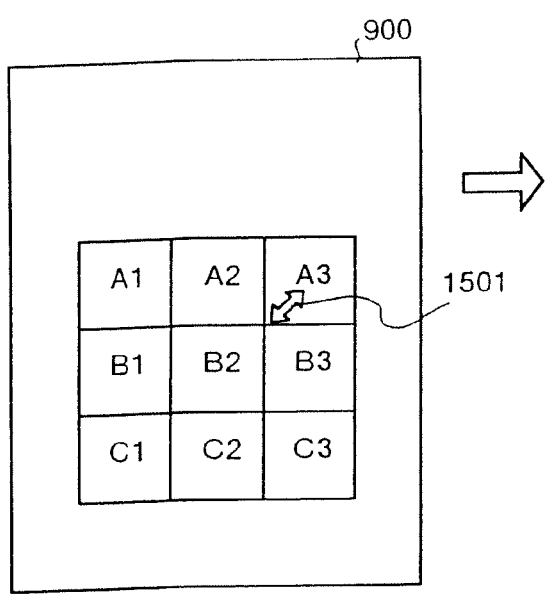
FIGS. 15A and 15B are explanatory views showing a portion of a screen displayed on the display of the image processing apparatus according to Embodiment 3.
Figure 15B:
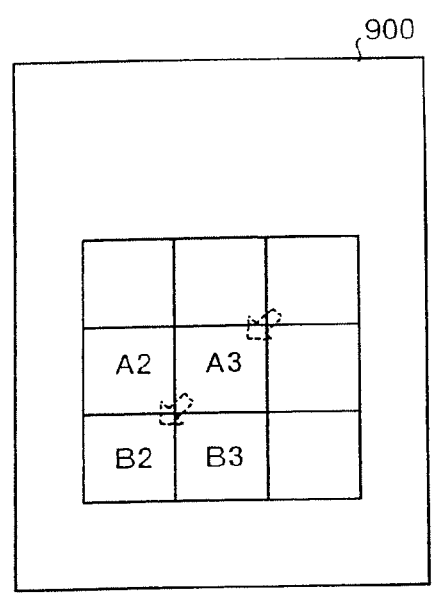

Next, description is made for contents of processing for specifying a peripheral image and extracting a reference image with reference to a specific screen. FIG. 15A and FIG. 15B show a portion (catalog viewer 900) of a screen displayed on the display 308 of the image processing apparatus according to Embodiment 3 of the present invention. In FIG. 15A, a reference image and the peripheral images are displayed in a 3×3 matrix. Numbers from A1 to C3 are assigned to those images for convenience in description. Accordingly, the image B2 is the reference image.

A mouse cursor 1501 is moved on the screen by operating the mouse 212. The mouse cursor 1501 changes its form according to its position. In FIG. 15A, the cursor is positioned at the peripheral image A3, and as the peripheral image A3 moves downwards in a leftward-slanting direction by being specified, so that the form of the cursor 1501 is also changed to a form with arrows representing its downward movement in a leftward-slanting direction and its upward movement in a rightward-slanting direction.

When the mouse cursor is moved to the position of the peripheral image C1, the mouse cursor also has the same form as described above. Similarly, when the mouse cursor 1501 is moved to the position of the peripheral image B1 or B3, the mouse cursor is a form with arrows in the right/left directions; when the mouse cursor is moved to the position of the peripheral image A2 or C2, le mouse cursor has a form with arrows in the vertical direction; and when the mouse cursor is moved to the position of the peripheral image A1 or C3, the mouse cursor has a form with arrows representing :s downward movement in a rightward-slanting direction and its upward movement in a leftward-slanting direction.

Herein, the mouse cursor 1501 is pointed within a display area of the peripheral image A3 located in the right upper side from the reference image and the button of the mouse is clicked. FIG. 15B shows a display state of the screen after clicking. It can be seen that the image A3 which was a peripheral image has moved to the position where the reference image is located. In association with this movement, the image B2 which was the reference image moves downward in the left side from the image A3. Namely, the image as a whole results in moving by one image to a downward direction in the left side in response to specification of the peripheral image in the upper right side. As described above, the entire images move so that the specified peripheral image moves to the position of the reference image.

In association with movement of the peripheral image A3 whose parameter values are (10, 10), an image whose parameter values are (x+10, y+10) is prepared anew for the position where the peripheral image A3 has originally been located by the peripheral image preparing section 404, so that a peripheral image with parameter values of (10+10, 10+10), namely (20, 20) is displayed therein. As described above, parameter values of two parameters for a selected image can also concurrently be changed as a result.

Figure 16:
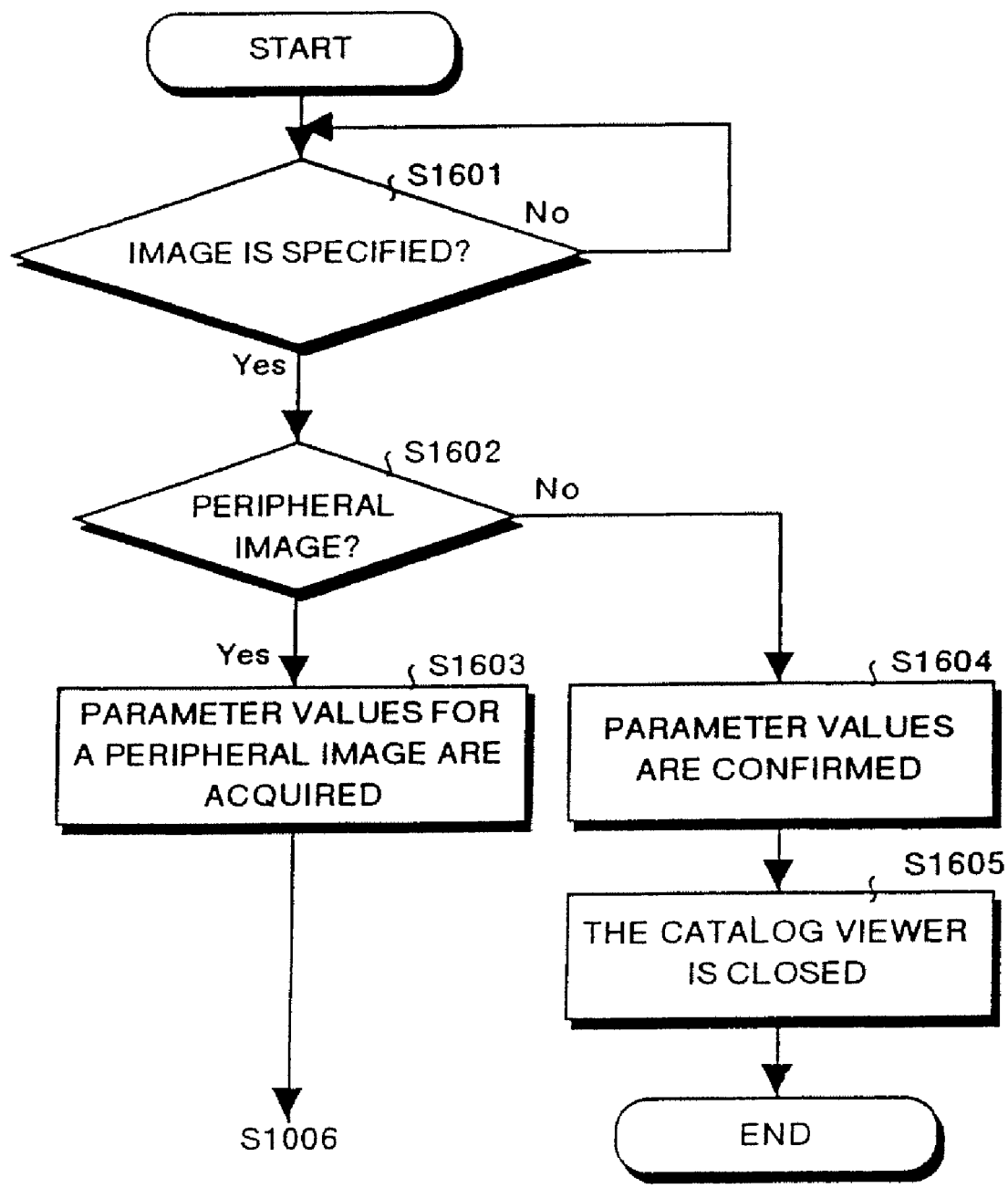
FIG. 16 is a flow chart showing a sequence of processing for specifying a peripheral image as well as the processing for extracting a reference image according to Embodiment 3.

Next, description is made for a sequence of specifying a peripheral image and extracting a reference image by the peripheral image specifying section 1401 and reference image extracting section 1402 respectively in Embodiment 3. FIG. 16 is a flow chart showing the sequence of specifying a peripheral image and extracting a reference image according to Embodiment 3 of the present invention.

In the flow chart of FIG. 16, at first, the peripheral image specifying section 1401 determines whether any image is specified or not (step S1601). Herein, the peripheral image specifying section 1401 waits for specification of an image (step S1601: YES) and determines when an image is specified whether the image is a peripheral image or not (step S1602).

In step S1602, when it is determined that the specified image is a peripheral image (step S1602: YES), the reference image extracting unit 1402 extracts the peripheral image as a reference image and acquires parameter values for the peripheral image (step S1603). Then, the processing shifts to step S1006 in FIG. 10 of Embodiment 1. The sequence of processing after this is the same as that in Embodiment 1, so that description thereof is omitted herein.

On the other hand, when it is determined in step S1602 that the specified image is not a peripheral image but a reference image (step S1602: NO), the peripheral image specifying section 1401 determines that changing parameter values has been finished, confirms the parameter values with the catalog viewer 900 (step S1604), closes the catalog viewer 900 (step S1605), and ends all the processing.

As described above, with Embodiment 3, one peripheral image is specified from a plurality of peripheral images, and the specified peripheral image is extracted as a reference image, so that parameter values for two different parameters can be changed with a simple operation of specifying an image with the most desired parameter values from the plurality of displayed peripheral images, which allows the operator to more visually and intuitively change a plurality of parameter values.

The present invention in Embodiments 1 to 3 described above may add thereto a function of displaying information concerning parameter values within or adjacent to an image displayed as shown in Embodiment 4 described below. Description is made hereinafter for Embodiment 4 of the present invention.

The hardware configuration of an image and document preparing system as a whole including an image processing apparatus according to Embodiment 4 of the present invention and the image processing apparatus 100 are the same as those in Embodiment 1, so that description thereof is omitted herein. The configuration of the other sections of the image processing apparatus 100 excluding the display controller 307 is also the same as those in Embodiment 1, so that description thereof is also omitted herein.

Figure 17:
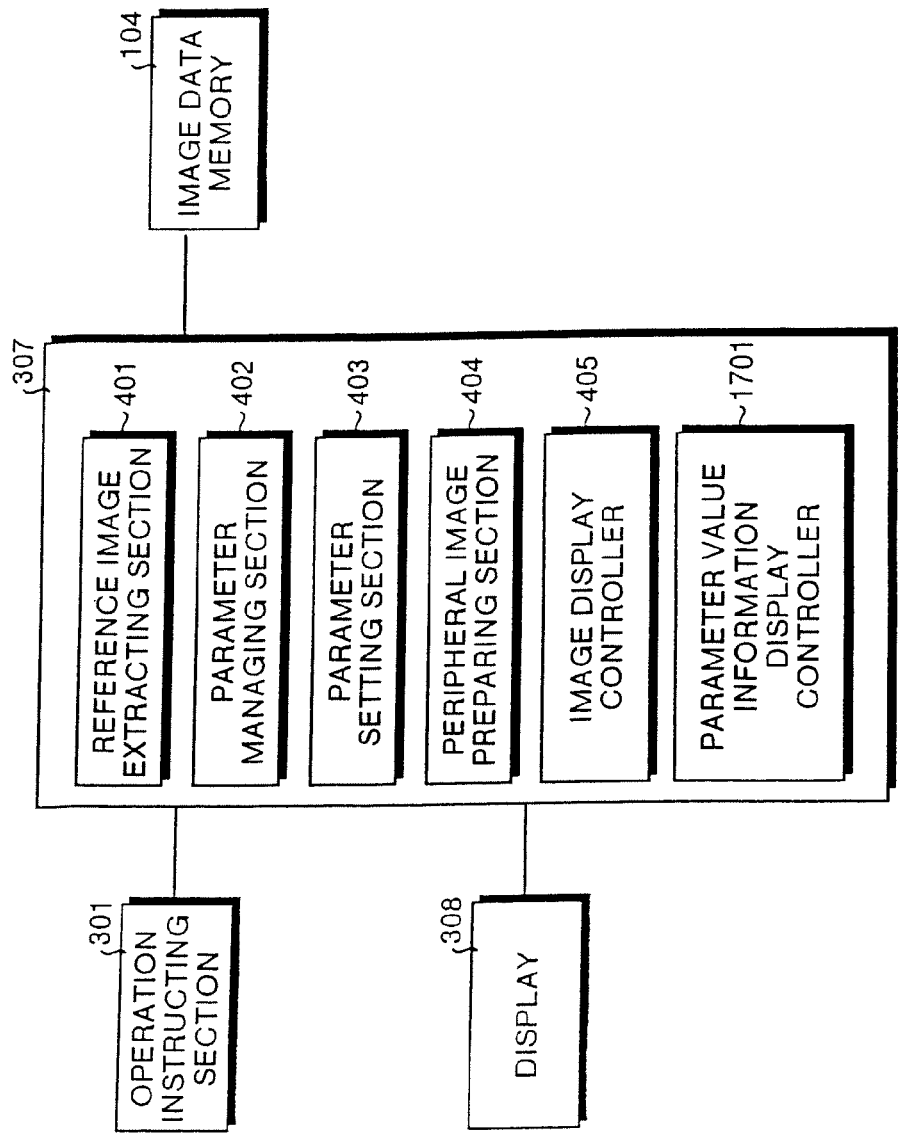
FIG. 17 is a block diagram functionally showing configuration of the display controller and a peripheral section thereof in the image processing apparatus according to Embodiment 4 of the present invention.

Next, description is made for the display controller 307. FIG. 17 is a block diagram functionally showing configuration of the display controller and peripheral sections thereof in the image processing apparatus according to Embodiment 4 of the present invention. The configuration of the other sections thereof excluding a parameter value information display controller 1701 is also the same as those of Embodiment 1, so that description thereof is also omitted herein.

Next, description is made for the parameter value display controller 1701. The parameter value information display controller 1701 is a section for providing controls for displaying information concerning parameter values at a specified position within a reference image and/or a peripheral image or adjacent to a reference image and/or a peripheral image displayed on the screen.

The parameter value information display controller 1701 acquires information concerning parameter values of parameters for each axis of images from the reference image extracting section 401 and reference image preparing section 404 respectively according to a display instruction signal indicating that parameter value information should be displayed from the operation instructing section 301, and displays the acquired information at a specified position in a specified display format (including a display color).

The parameter value information display controller 1701 deletes information concerning the already displayed parameter values from the screen according to a display instruction signal indicating that the parameter value information should be deleted from the operation instructing section 301.

The parameter value information display controller 1701 realizes its function when the CPU 201 or other related section executes commands according to instructions described in programs such as an operating system or application programs recorded in a storage medium such as the ROM 202, RAM 203, hard disk 205, or floppy disk 207.

Information concerning parameter values is a difference value, assuming that the parameter value of the reference image is 0 as also described in Embodiment 1, as the amount of change rate obtained by changing a parameter value of a peripheral image against a parameter value of a reference image.

In addition, a different reference value concerning a parameter value is provided, each parameter value for a reference image and a peripheral image is computed according to the reference value, and the computed parameter value may be displayed as information concerning a parameter value. In short, the information concerning parameter values includes any information with which comparison can be made between parameter values of a reference image and parameter values of a peripheral image.

As a typical method of displaying information concerning parameter values, there is a method of displaying information using (x, y) conceivable as a simple and recognizable display method. Herein, x indicates a parameter value of a parameter for a horizontal axis and y indicates a parameter value of a parameter for a vertical axis respectively. The display method is not limited to this method described above, and includes any display methods each with which a parameter value of a parameter for a horizontal axis and a parameter value of a parameter for a vertical axis can be recognized.

Figure 18:
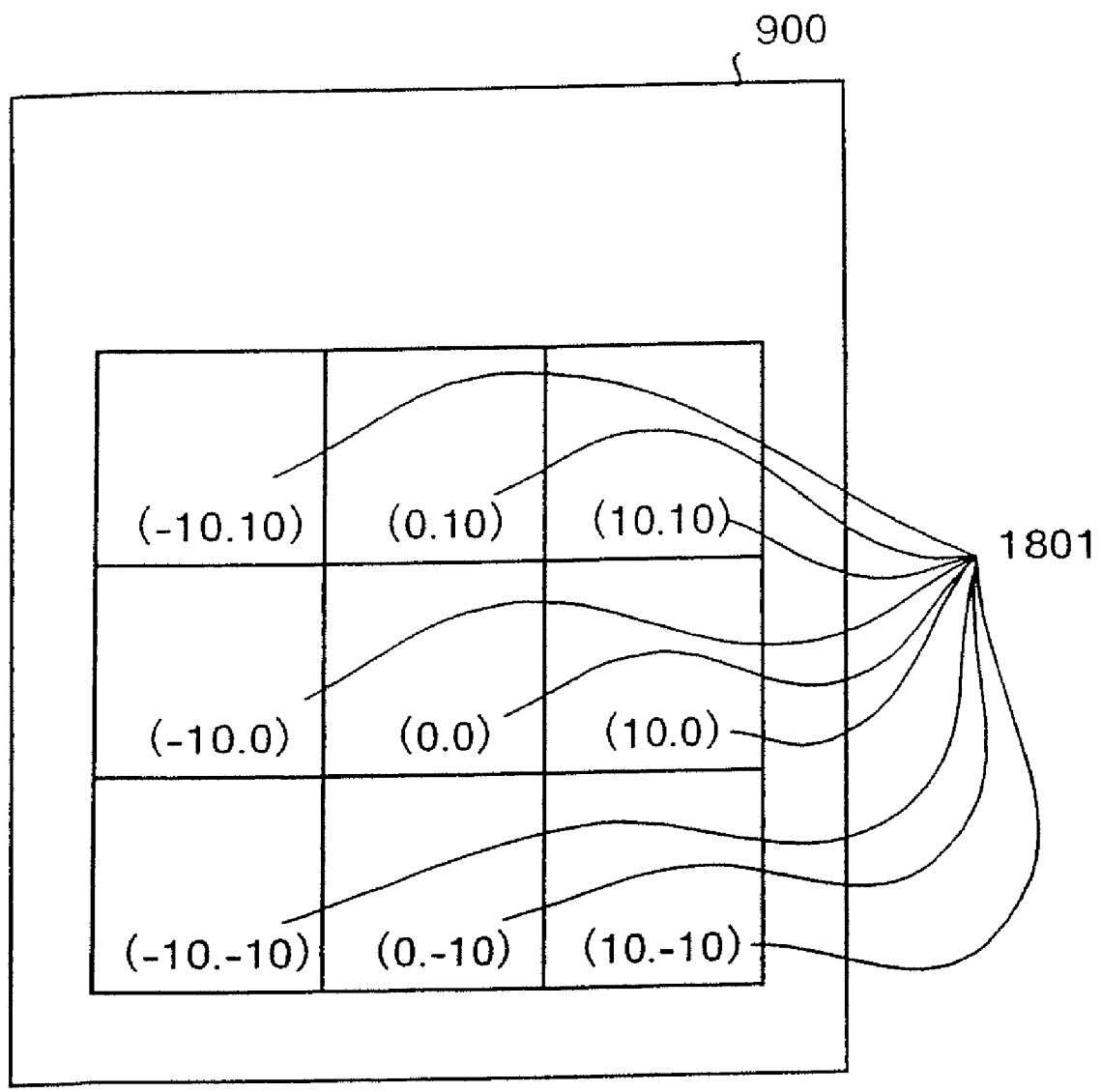
FIG. 18 is an explanatory view showing an example of a portion of a screen displayed on the display of the image processing apparatus according to Embodiment 4.
Figure 19:
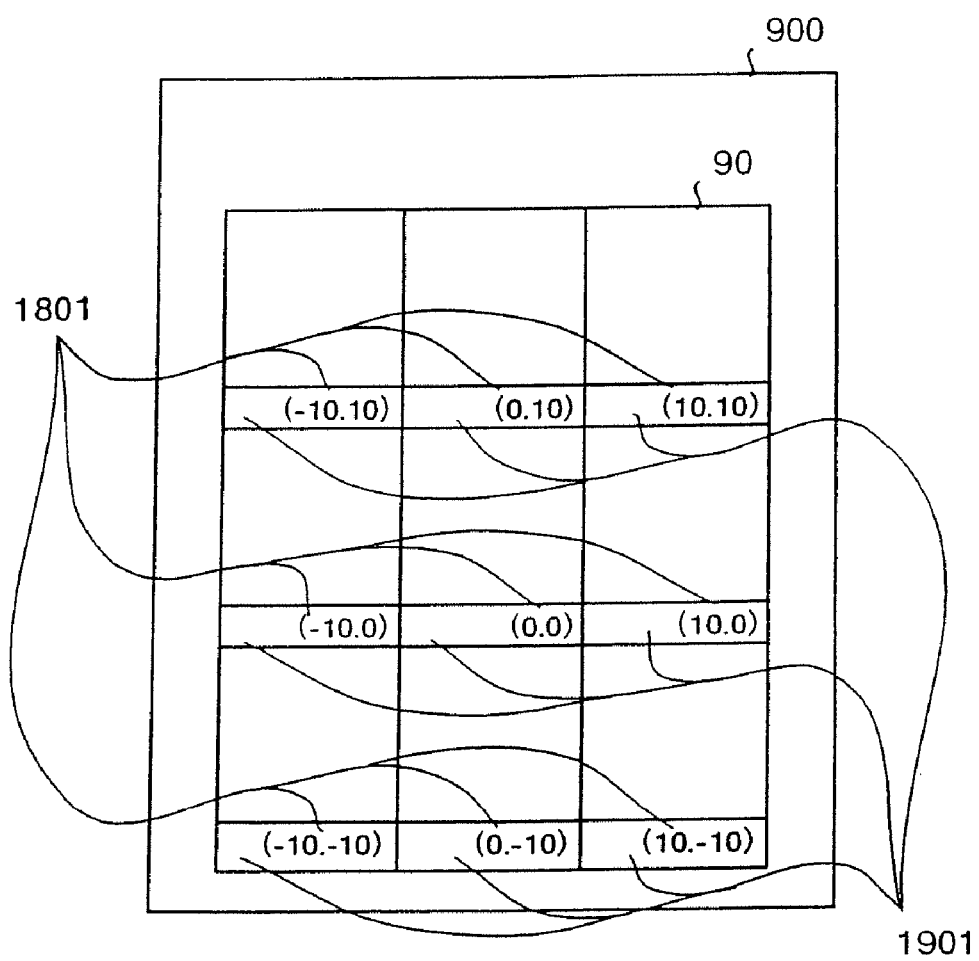
FIG. 19 is an explanatory view showing another example of a portion of a screen displayed on the display of the image processing apparatus according to Embodiment 4.

Next, description is made for contents of a sequence of display controls for information concerning parameter values with reference to a screen. FIG. 18 and FIG. 19 show a portion (catalog viewer 900) of a screen displayed on the display 308 of the image processing apparatus according to Embodiment 4 of the present invention.

In FIG. 18, information concerning parameter values is displayed within the reference image and the peripheral images. The contents of display is as described above. In FIG. 18, although each information 1801 concerning parameter values is displayed in the lower right side of each image, the display thereof is not limited to this position, and a display position can arbitrarily be changed according to the contents of the image or some other conditions. Further, a display position may be changed for each image.

When information concerning parameter values is displayed, a color which can be discrimination from a color of an image is used so that it can be avoided that using a color of a display similar to that of the image makes it difficult to recognize it. Especially, when a state of an image is changed by changing parameter values, a color of a display is changed according to the state of the change.

Further, of the image, only a portion of the image only at a position where information concerning a parameter is displayed is deleted, and the information concerning a parameter is displayed at the deleted position using a recognizable color, so that the information concerning a parameter can surely be displayed within an image each time without changing a color of the display.

In FIG. 19, the information concerning parameter values displayed adjacent to the reference image and peripheral images. In FIG. 19, a dedicated area 1901 provided specifically for displaying information concerning parameters is located in the lower side of each image, and information concerning parameter values is displayed within the dedicated area 1901. Therefore, the information can surely be displayed without preparing an area where the contents of an image may be hidden by displaying information concerning parameter values thereon.

Figure 20:
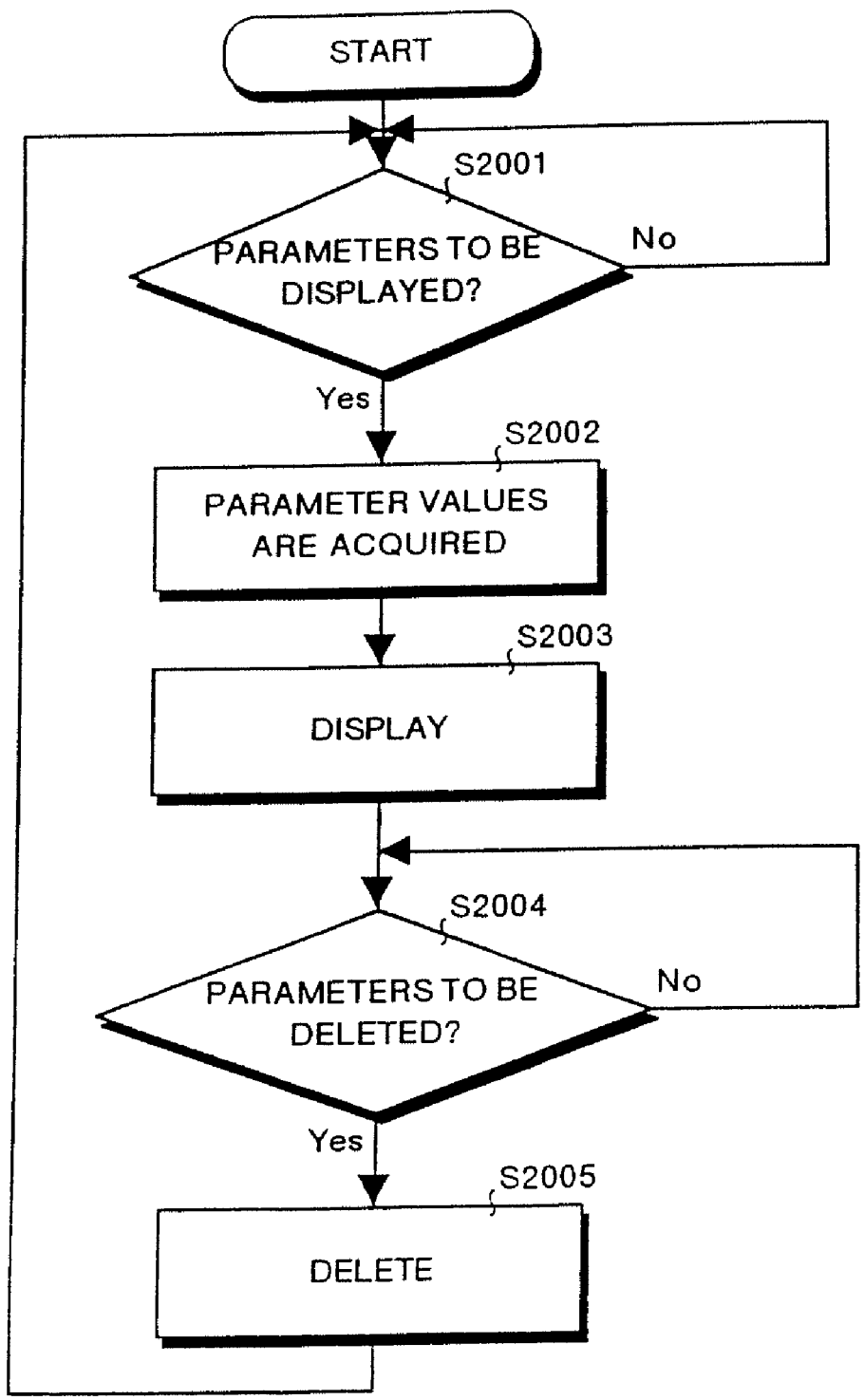
FIG. 20 is a flow chart showing a sequence of processing for controlling display of information concerning parameters according to Embodiment 4.

Next, description is made for a sequence of display controls for information concerning parameter values executed by the parameter value information display controller 1701 in Embodiment 4. FIG. 20 is a flow chart showing the sequence of display controls for information concerning parameter values according to Embodiment 4 of the present invention.

In the flow chart in FIG. 20, at first, the parameter value information display controller 1701 determines whether an instruction to the effect that information concerning parameter values is to be displayed is received or not (step S2001). Herein, the parameter value information display controller 1701 waits for the instruction for display in step S2001 (step S2001: NO), and when it is determined that the instruction is received acquires the parameter values of an image as an object for display (step S2002).

Then, the parameter value information display controller 1701 displays the acquired parameter values in step S2002 on a specified position of the screen in a specified display format (step S2003). Then the parameter value information display controller 1701 determines whether an instruction to the effect that information concerning parameter values is to be deleted is received or not (step S2004).

The parameter value information display controller 1701 waits for the instruction for display in step S2004 (step S2004: NO), and when it is determined that the instruction is received deletes the information concerning the displayed parameter values. Then the processing shifts to step S2001, and the same processing as described above is repeated hereinafter.

As described above, with Embodiment 4, information concerning parameter values are displayed at a specified position within or adjacent to the reference image and the peripheral images with a numerical value, so that the numerical values can be referred to when the parameter values are to be changed.

Especially, when a peripheral image is specified and parameter values of the peripheral image are changed by changing the reference image, the operator can identify how much parameter values have been changed with the data for which peripheral image is specified to and in what way it is specified; the change rate with numerical values. As the original reference image is displayed with numerical values (0, 0), the operator can easily and quickly find where the original reference image is because of display of the numerical values although it is quite difficult to visually determine with only the images which image is the original reference image.

In Embodiment 5 described below, a rotated image as a whole is displayed as a contracted image, so that the operator can easily grasp the inclination or the like of the image from the contracted image.

The hardware configuration of an image and document preparing system as a whole including an image processing apparatus according to Embodiment 5 of the present invention and the image processing apparatus 100 are the same as those in Embodiment 1, so that description thereof is omitted herein. The configuration of the other sections of the image processing apparatus 100 excluding the image changing section 304 and display controller 307 is also the same as those in Embodiment 1, so that description thereof is also omitted herein.

Figure 21:
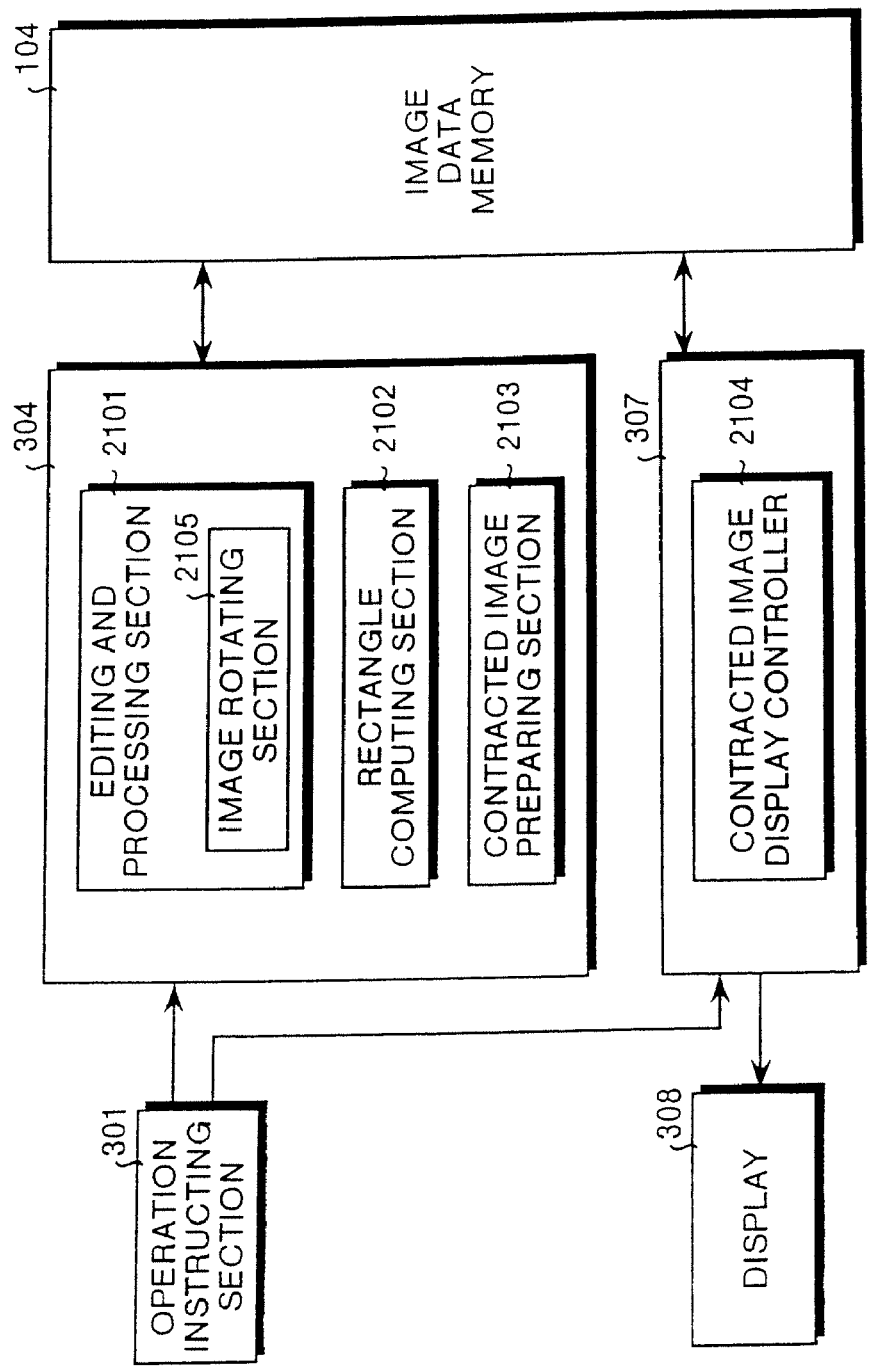
FIG. 21 is a block diagram functionally showing configuration of an image changing section, an image controller, and peripheral sections thereof in the image processing apparatus according to Embodiment 5 of the present invention.

Detailed description is made for configuration of the image changing section 304 and display controller 307. FIG. 21 is a block diagram functionally showing configuration of the image changing section 304, the display controller 307, and the peripheral section thereof in the image processing apparatus according to Embodiment 5. As shown in FIG. 21, the image changing section 304 comprises an editing and processing section 2101, a rectangle computing section 2102, and a contracted image preparing section 2103. The display controller 307 comprises a contracted image display controller 2104. Further, the editing and processing section 2101 includes an image rotating section 2105.

The editing and processing section 2101 is a section which edits and processes an image displayed on the display 308 by the display controller 307 and stored in the image data memory 104. The editing and processing includes all of editing and processing for an image such as rotating a displayed image by a specified angle with the image rotating section 2105, reversing an image, changing a number of pixels of an image, color adjustment for a color image, and synthesizing the images or the like.

It should be noted that available technology is used for the rotation of an image by the image rotating section 2105. Details of the processing for rotation of an image will be described later. Further, image edited and processed by the editing and processing section 2101 is stored in the image data memory 104 with a file name added thereto.

The rectangle computing section 2102 computes a rectangle having a minimum size among those that can cover the rotated image. When a rectangular image is obtained by rotating the image by a specified angle with the image rotating section 2105, the rectangle with a minimum size is naturally larger than the rotated rectangular image. A method of computing a rectangle is described later.

The contracted image preparing section 2103 is a section for preparing a contracted image and prepares a contracted image according to a form (an aspect ratio) and a size of the rectangle computed by the rectangle computing section 2102.

The contracted image display controller 2104 is a control section for providing controls for displaying a contracted image prepared by the contracted image preparing section 2103 at a specified position on the screen of the display 308. A display position and a display method are described later.

The editing and processing section 2101, rectangle computing section 2102, contracted image preparing section 2103, contracted image display controller 2104, and image rotating section 2105 realize the respective functions when the CPU 201 or other related section executes commands according to instructions described in programs such as an operating system or application programs recorded in a storage medium such as the ROM 202, RAM 203, hard disk 205, or floppy disk 207.

Figure 22:
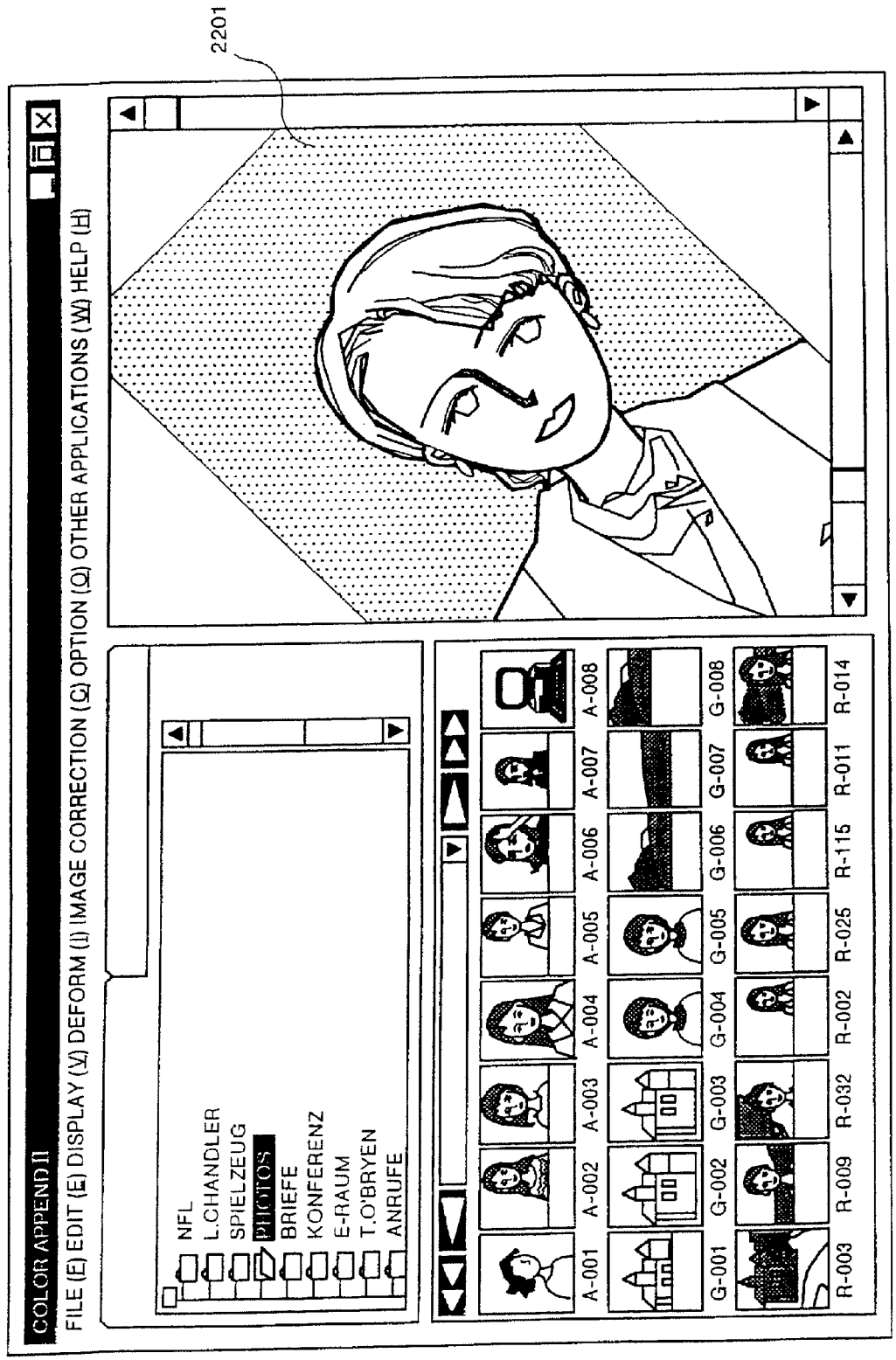
FIG. 22 is an explanatory view showing another example of a screen displayed on the display of the image processing apparatus according to Embodiment 5.

Next, description is made for the processing of rotating an image. FIG. 22 shows an example of a screen displayed on the display 308 in the image processing apparatus according to Embodiment 5 of the present invention. In FIG. 22, a selected image 2201 obtained by rotating the image selected in FIG. 5 by 45 degrees is displayed in the selected image displaying area 503.

As a method of instructing to rotate a graphics, there is a method of inputting, for instance, a desired rotational angle and a rotational direction through the keyboard 211 to rotate an image around the center of the image. There may be employed a method of rotating an image to a specified angle by dragging the image with the mouse 212 or the like. The method of rotating an image is not particularly limited.

The selected image 2201 has the same size as that of the image displayed in the selected image displaying area 503 in FIG. 5. However, it is clear that the image as a whole is not displayed within the selected image displaying area 503 because of the rotation of the image by 45 degrees.

Figure 23:
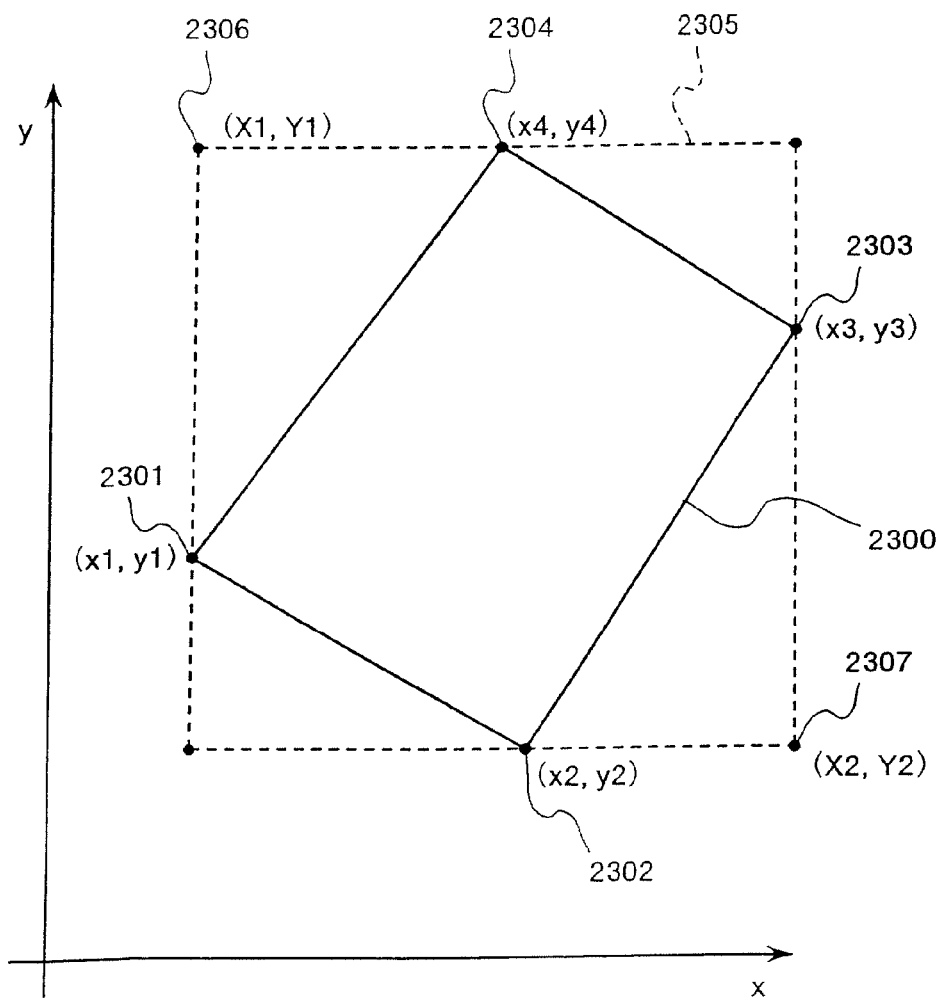
FIG. 23 is an explanatory view conceptually showing a rectangle computing method executed by a rectangle computing section of the image processing apparatus according to Embodiment 5.

Description is made for a method of computing a rectangle by the rectangle computing section 2102. FIG. 23 explains the rectangle computing method employed by the rectangle computing section 2102 in the image processing apparatus according to Embodiment 5 of the present invention.

In FIG. 23, a rotated rectangular image 2300 has four vertexes 2301 (x1, y1), 2302 (x2, y2), 2303 (x3, y3), and 2304 (x4, y4). Of those vertexes, vertexes having the largest and the smallest coordinates for x and those having the largest and the smallest coordinates for y are, extracted respectively. The largest coordinate for x is x3, and the smallest is x1. The largest coordinate for y is y4, and the smallest is y2.

A rectangle 2305 to be obtained is shown by a dotted line. By obtaining two vertexes on a diagonal line of the rectangle, a rectangle with the minimum size covering the image 2300 can be obtained. A vertex 2306 (X1, Y1) and a vertex 2307 (X2, Y2) on the diagonal line thereof are obtained as X1=x1, Y1=y4, X2=x3, and Y2=y2.

Namely, it is understood that the vertexes of the rectangle 2305 to be computed are coordinates with, of each vertex of the rotated rectangle, the maximum value of the coordinate in the x direction and the minimum value of the coordinate in the y direction, and those with the minimum value of the coordinate in the x direction and the maximum value of the coordinate in the y direction. A length of each side of the rectangle 2305 is a length as a difference obtained by comparing the coordinates between the two vertexes of the rectangle 2305 in the x direction to each other and the coordinates therebetween in the y direction to each other, and subtracting the small value from the large value in each direction. The rectangle 2305 is computed as described above.

Figure 24:
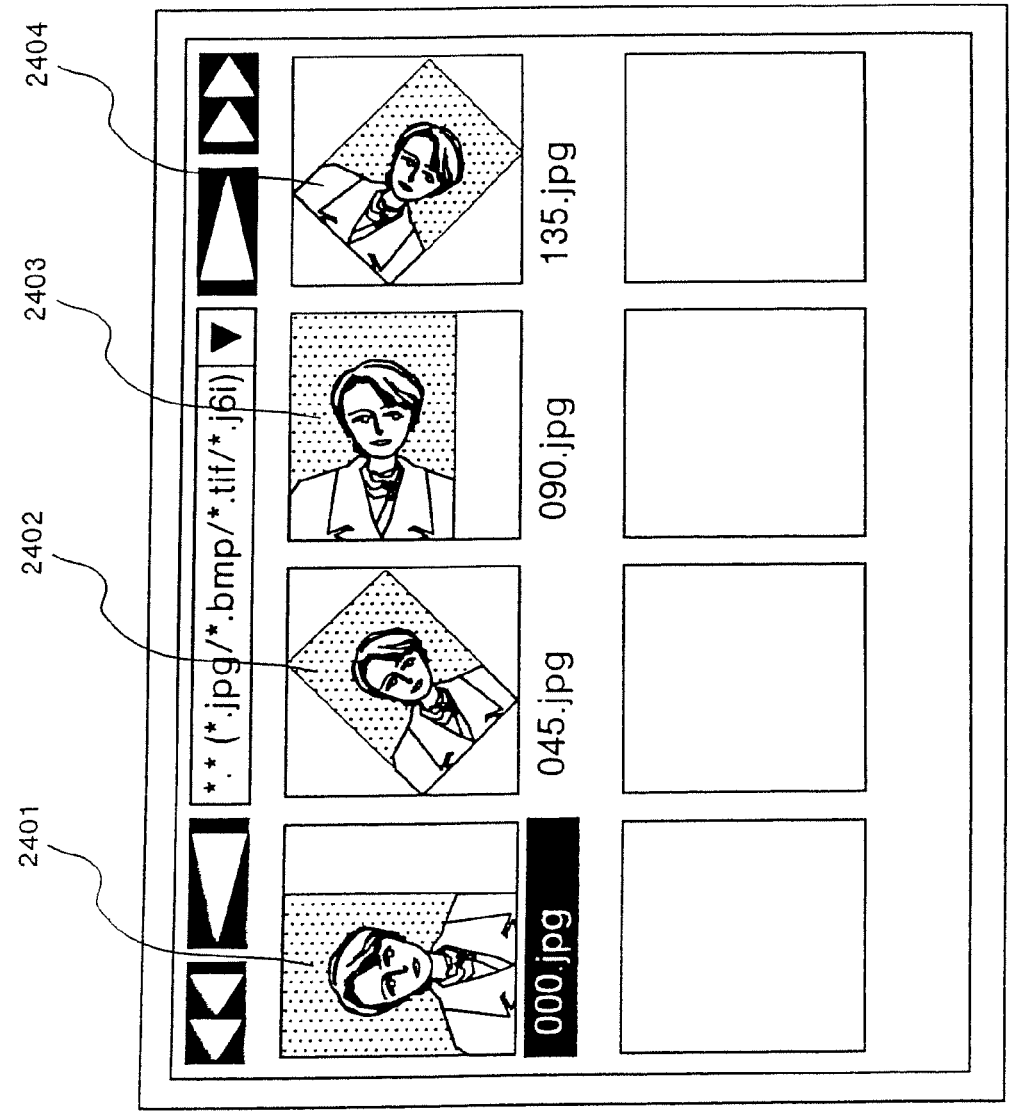
FIG. 24 is an explanatory view showing an example of a portion (a contracted image display area) of a screen displayed on the display of the image processing apparatus according to Embodiment 5.

Next, description is made for preparation of a contracted image and display controls for a contracted image with reference to a display example of a contracted image. FIG. 24 shows one example of a portion (contracted image displaying area 502) of a screen displayed on the display 308 in the image processing apparatus according to Embodiment 5 of the present invention. In FIG. 24, eight contracted images are displayed, but this number is only for the convenience of description, and -it does not matter for the processing even if the twenty-four contracted images are displayed as shown in FIG. 5.

In FIG. 24, four images based on the same original image but having a different angle of rotation are displayed as contracted images. A contracted image 2401 is not rotated, so that its angle of rotation is 0 degree. A contracted image 2402 is rotated by 45 degrees in the clockwise direction, a contracted image 2403 is rotated by 90 degrees, and a contracted image 2404 is rotated by 135 degrees in the same direction respectively.

As for the contracted image 2401, the rectangle 2305 with a minimum size among those that cover the image is the same as the image 2401 in size, so that the rectangle is compared to the length and breadth sizes of a frame with the contracted image displayed therein, the original image is contracted with a specified magnification so that the entire image 2401 becomes a maximum image displayable in the frame, and the contracted image is displayed in a display frame.

As for the contracted image 2402, the rectangle 2305 is computed using the method as described above, the rectangle 2305 is compared to the length and breadth sizes of the display frame, and the original image is contracted by a specified magnification so that the entire rectangle 2305 is displayable with its maximum size, and the contracted image is displayed in a display frame.

As understood when the images in FIG. 24 are compared to each other, the rectangle 2305 is larger than the original image in size, therefore, the contraction ratio of the original image is larger, so that it is obvious that the image itself is smaller as compared to the contracted image 2401. However, the rotation of the image is clearly understood, so that the speed and efficiency for retrieving a desired image is extremely improved. The same effect is obtained in the contracted images 2403 and 2404.

Figure 25:
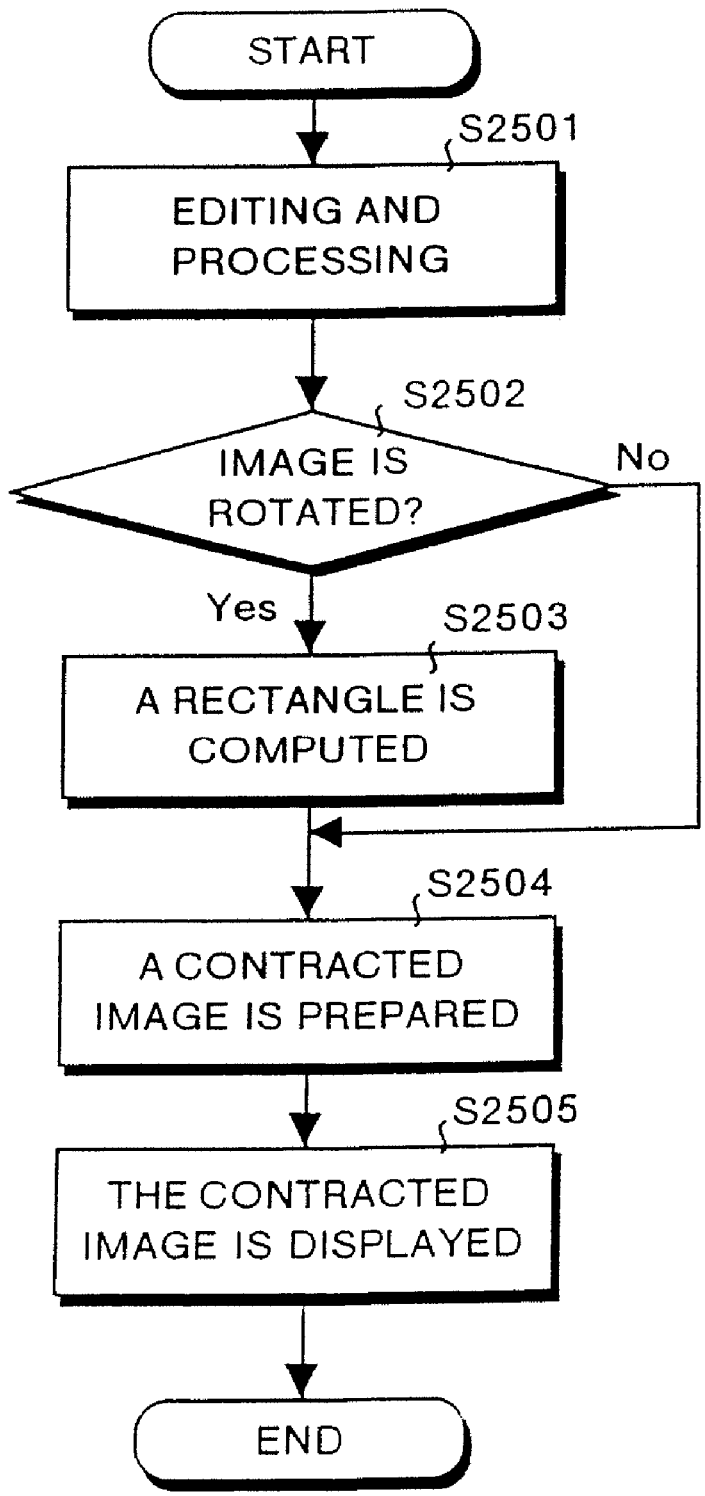
FIG. 25 is a flow chart showing a sequence of a series of processing for displaying a contracted image in the image processing apparatus according to Embodiment 5.

Description is made for a sequence of a series of processing for displaying a contracted image in Embodiment 5. FIG. 25 is a flow chart showing the sequence of a series of processing for displaying a contracted image in the image processing apparatus according to Embodiment 5 of the present invention. In the flow chart in FIG. 25, at first, a selected image is edited and processed in various ways (step S2501).

Then, it is determined in step S2501 whether the edited and processed image is rotated or not (step S2502). In step S2502, when it is determined that the image is not rotated (step S2502: NO), the processing shifts to step S2504. While in step S2502, when it is determined that the image is rotated (step S2502: YES), a rectangle with a minimum size which covers the rotated image is computed (step S2503).

Then, in step S2504, a contracted image is prepared according to a rectangle with a minimum size covering the rotated or the rotated image. Then, the contracted image prepared in step S2504 is displayed at a specified position of the display 308 (step S2505), and all the processing is ended.

As described above, with Embodiment 5, the rotated image as a whole is displayed as a contracted image, so that the operator can easily grasp the inclination or the like of the image on the contracted image, and quickly and efficiently retrieves the image thereby.

In Embodiment 5, although the image edited and processed by the editing and processing section 2101 is an image obtained by rotating a rectangular image by a specified angle, but like in Embodiment 6 described below, the image may be an image obtained by separating the image edited and processed by the editing and processing section with a shape other than the rectangle.

The hardware configuration of an image and document preparing system as a whole including an image processing apparatus according to Embodiment 6 of the present invention and the image processing apparatus 100 are the same as those in Embodiment 1, so that description thereof is omitted herein. The configuration in the other sections of the image processing apparatus 100 excluding the image changing section 304 and the display controller 307 is also the same as those in Embodiment 1, so that description thereof is also omitted herein.

Figure 26:
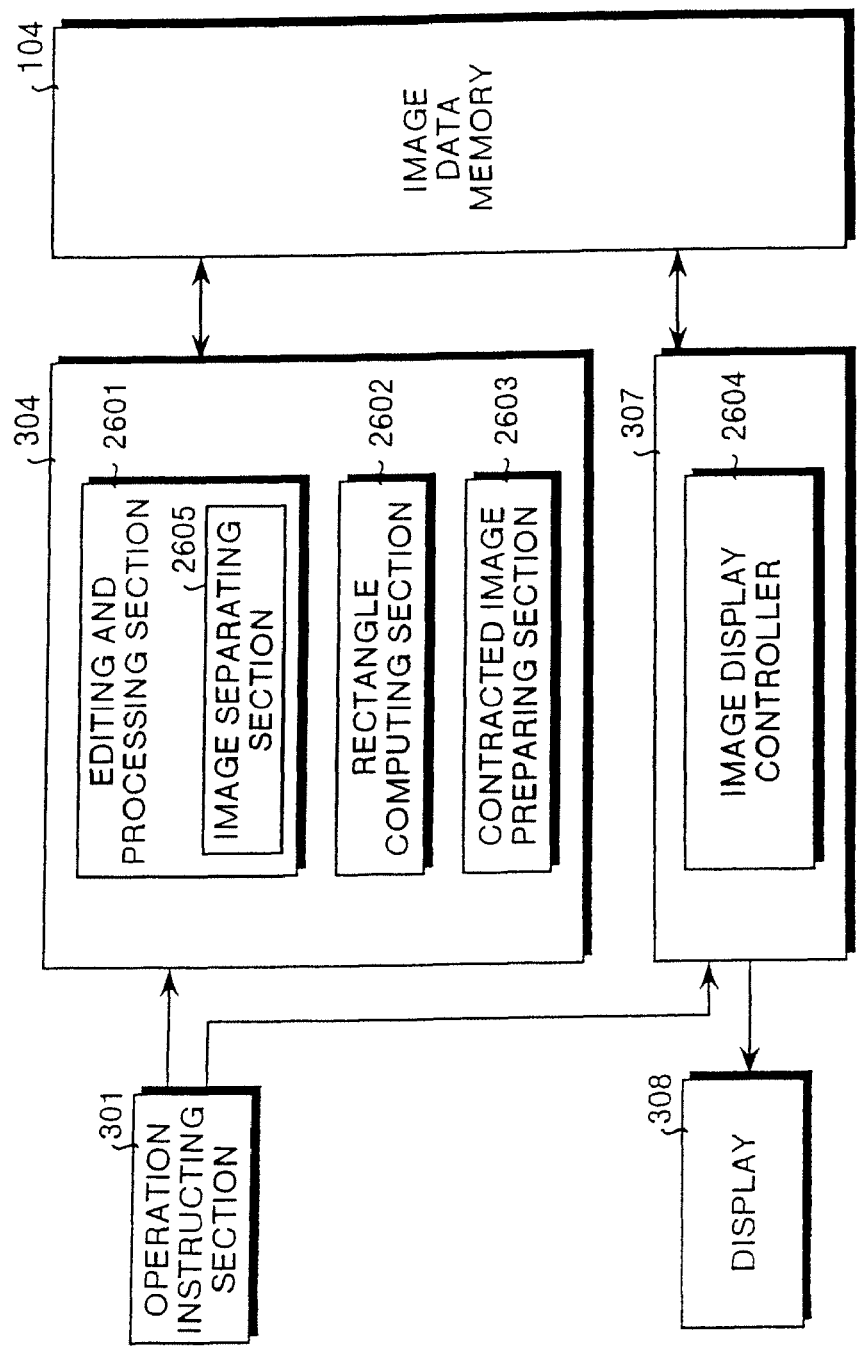
FIG. 26 is a block diagram functionally showing configuration of an image changing section, a display controller and peripheral sections thereof in the image processing apparatus according to Embodiment 6 of the present invention.

Description is made for the image changing section 304 and display controller 307. FIG. 26 is a block diagram functionally showing configuration of the image changing section 304, display controller 307, and the peripheral section thereof in the image processing apparatus according to Embodiment 6 of the present invention. As shown in FIG. 26, the image changing section 304 comprises an editing and processing section 2601, a rectangle computing section 2602, and a contracted image preparing section 2603. The display controller 307 comprises a contracted image display controller 2604. Further, the editing and processing section 2601 includes an image separating section 2605.

The editing and processing section 2601 is a section which edits and processes an image displayed on the display 308 by the display controller 307 and stored in the image data memory 104. The editing and processing includes all of editing and processing for an image such as separating a displayed image having a specified form by the image separating section 2605, reversing an image, changing a number of pixels of an image, color adjustment for a color image, and synthesizing the images or the like.

It should be noted that available technology is used for separation of an image by the image separating section 2605. Details of the processing for separation of an image will be described later. Further, image edited and processed by the editing and processing section 2601 is stored in the image data memory 104 with a file name added thereto.

The rectangle computing section 2602 computes a rectangle having a minimum size among those that can cover the edited and processed image, especially an image whose size has changed due to separation thereof. The maximum value as well as minimum value of the coordinates in the x direction and the maximum value as well as minimum value of the coordinates in the y direction are obtained, similarly to that of the rectangle computing section 2101 in Embodiment 5, according to the coordinates of the trail along the separated line of the separated image, and the rectangle is computed from the obtained values.

The configuration of the contracted image preparing section 2603 and image display controller 2604 is the same as that of the contracted image preparing section 2103 and contracted image display controlling section 2104 according to Embodiment 5, so that description thereof is omitted herein.

The editing and processing section 2601, rectangle computing section 2602, contracted image preparing section 2603, contracted image display controller 2604, and image separating section 2605 realize the respective functions when the CPU 201 or other related section executes commands according to instructions described in programs such as an operating system or application programs recorded in a storage medium such as the ROM 202, RAM 203, hard disk 205, or floppy disk 207.

The contents of operations of the image processing apparatus as well as the contents of display on the screen according to Embodiment 6 are the same as those especially described in Embodiment 1 with reference to FIG. 5, so that description thereof is omitted herein.

Figure 27:
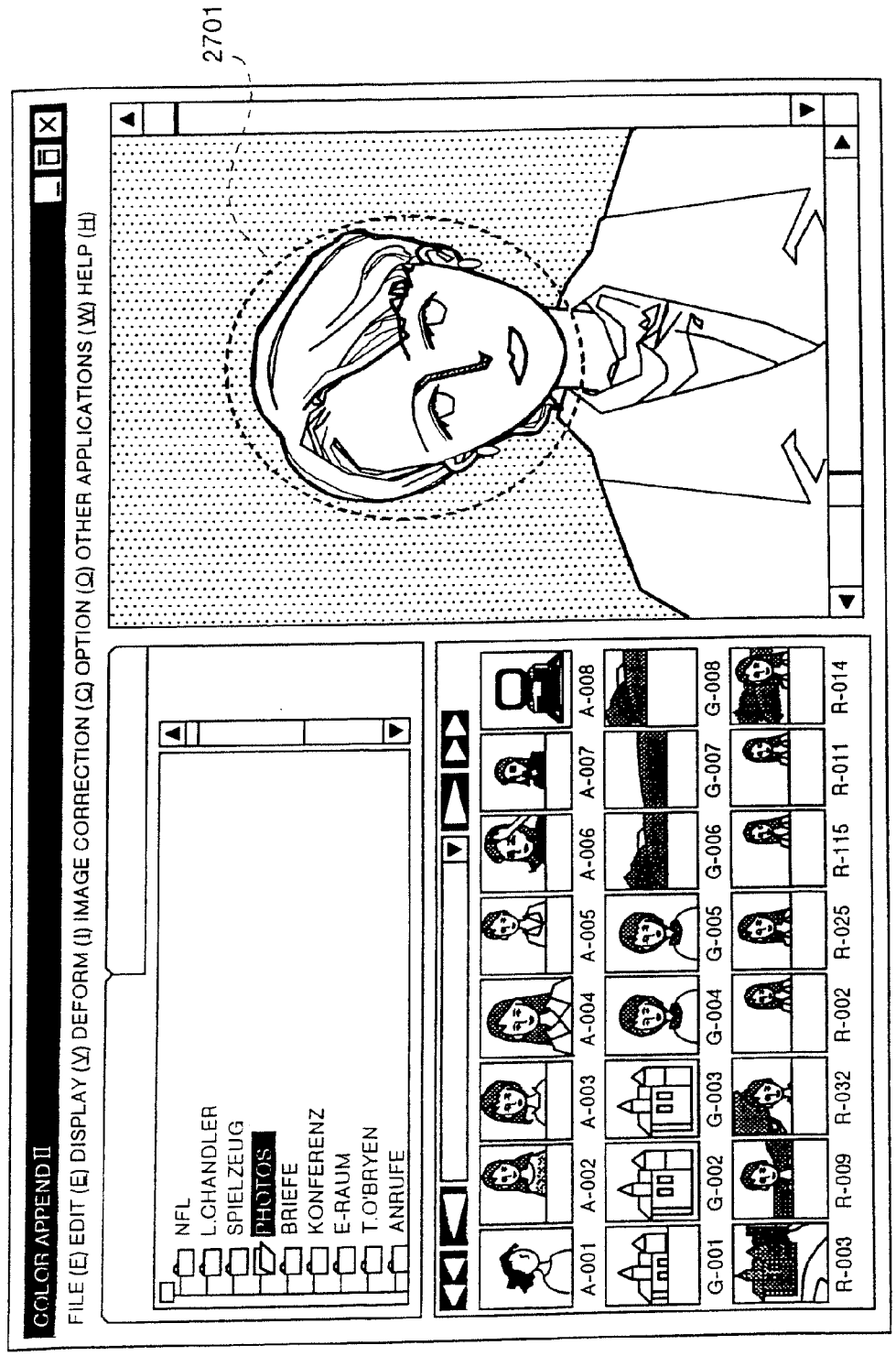
FIG. 27 is an explanatory view showing an example of a screen displayed on the display of the image processing apparatus according to Embodiment 6.

Next, description is made for separation of an image. FIG. 27 shows one example of a screen displayed on the display 308 of the image processing apparatus according to Embodiment 6 of the present invention. In FIG. 27, an oval indicated by a dotted line is a separating line 2701 for an image. To separate an image with the oval, at first a type of area is selected.

As the type of areas, in addition to the oval, a polygon, a free hand, and a template are prepared. The oval is realized with the mouse 212 or the like by pressing the mouse button thereof or the like at a desired position, and moving the mouse 212 while pressing the button until the area becomes of a desired size and shape with the oval separating line 2701 indicated by a dotted line appearing on the screen in response to releasing the pressing of the mouse button or the like at the point of time the area has become the desired size and shape.

The polygon is formed with the mouse 212 or the like by making a single-click at a desired position which position is regarded as a vertex of the polygon. Then the operator double-clicks the mouse at each of the vertices of the polygon and returns to the position where the mouse was single-clicked and the completes polygon. Thus, the polygonal separating line indicated by a dotted line appears on the screen.

In a case of a free hand, a shape is drawn with the mouse 212 or the like by pressing the mouse button thereof or the like at a desired position, drawing a desired shape freehand with the button being pressed, and by automatically lining from the position at the point of time the pressing of the mouse button is relieved to the original start point, a closed area is completed. The closed area is confirmed as an area to be separated, and the separating line for the area to be separated indicated by a dotted line appears on the screen.

Figure 28:
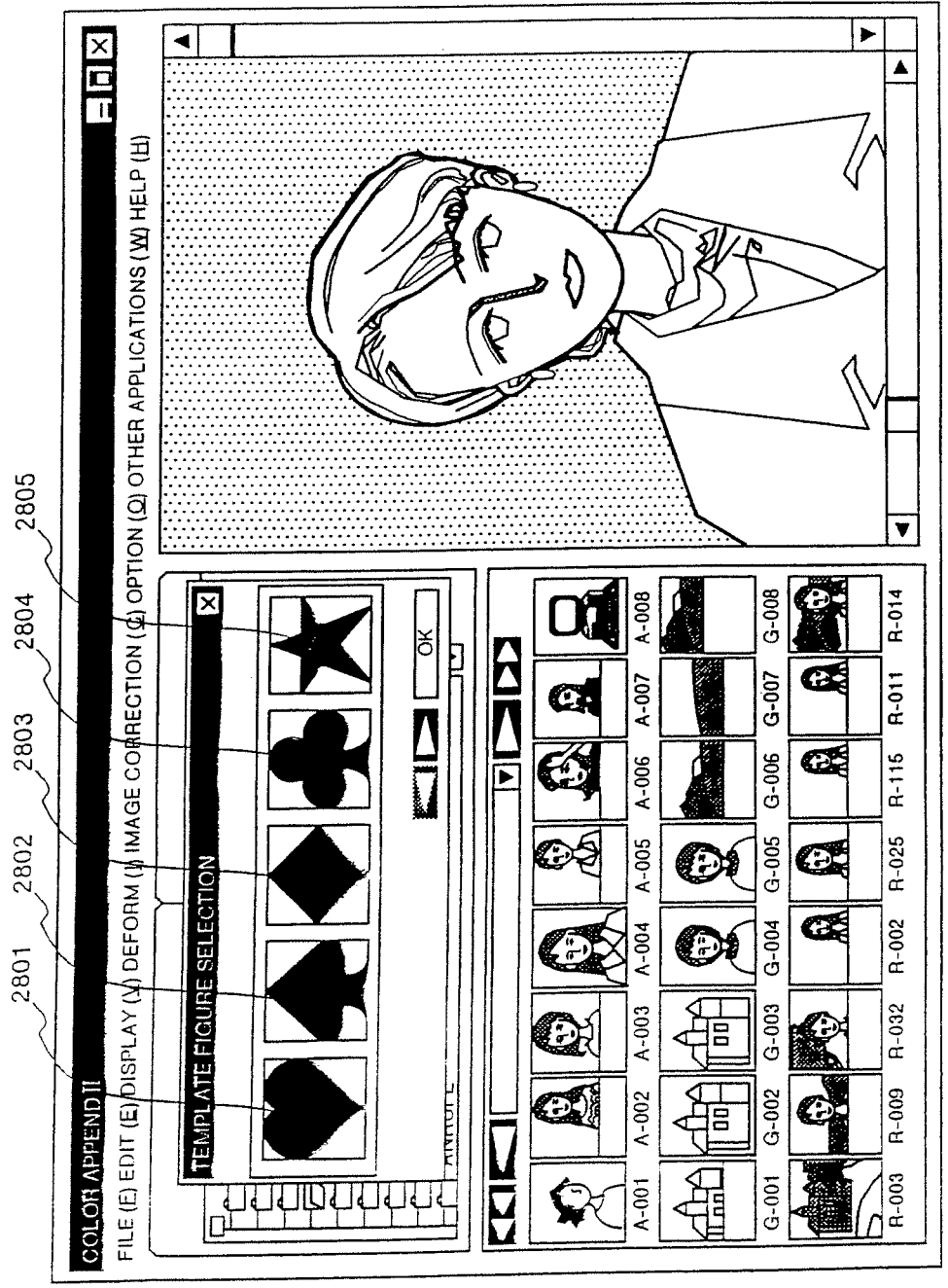
FIG. 28 is an explanatory view showing another example of a screen displayed on the display of the image processing apparatus according to Embodiment 6.

Next, description is made for specification of an area with a template. FIG. 28 shows another example of a screen displayed on the display 308 of the image processing apparatus according to Embodiment 6 of the present invention. In FIG. 28, there appear a plurality of templates (a heart-shaped template 2801, a spade-shaped template 2802, a diamond-shaped template 2803, a clover-shaped template 2804, and a star-shaped template 2805) thereon. The templates are not limited to these five described above and the operator can create an arbitrary shape and register the shape as a template.

Figure 29:
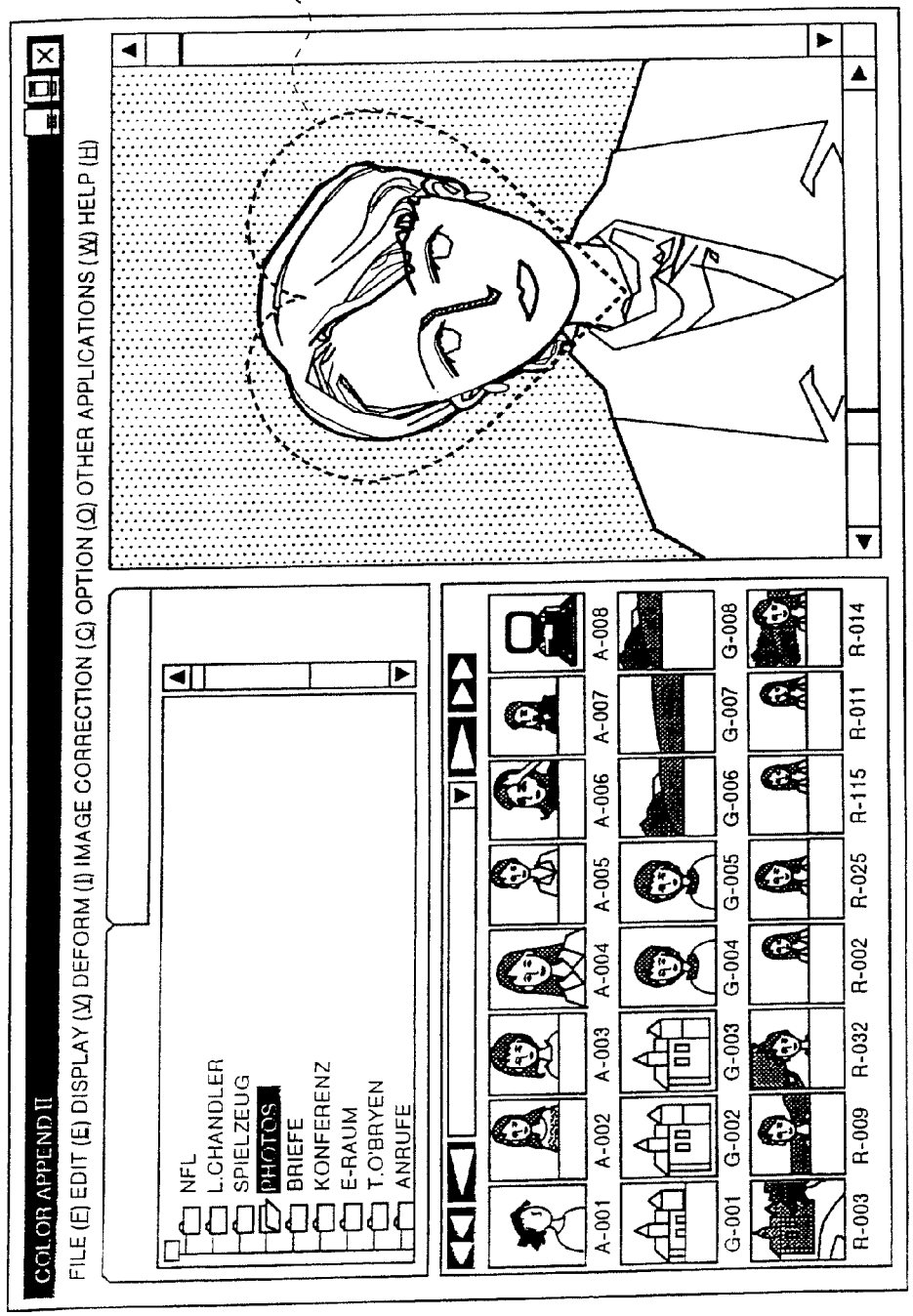
FIG. 29 is an explanatory view showing another example of a screen displayed on the display of the image processing apparatus according to Embodiment 6.

FIG. 29 shows another example of a screen displayed on the display 308 of the image processing apparatus according to Embodiment 6 of the present invention. In FIG. 29, an image is separated by using the heart-shaped template 2801 with the heart-shaped separating line 2901 appearing on the image. The processing of separating an image with a template is the same as that of separating an image with the oval so that description thereof is omitted herein.

Figure 30:
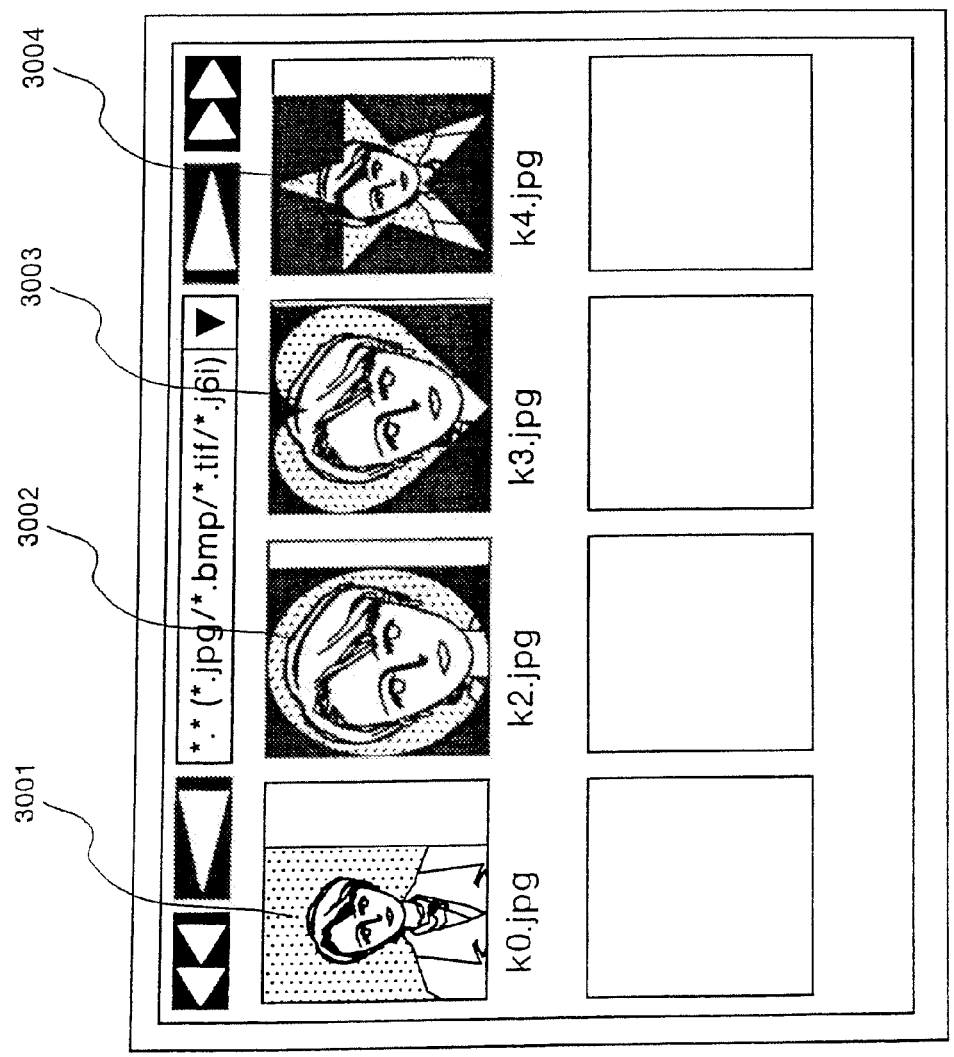
FIG. 30 is an explanatory view showing an example of a portion (a contracted image display area) of a screen displayed on the display of the image processing apparatus according to Embodiment 6.

Description is made for preparation of a contracted image and display controls for the prepared contracted image with reference to a display example of a contracted image. FIG. 30 shows one example of a portion (contracted image displaying area 502) of a screen displayed on the display 308 of the image processing apparatus according to Embodiment 6 of the present invention. In FIG. 30, eight contracted images are displayed the same as that of FIG. 8 in Embodiment 1, but this is only for the convenience of description, and it does not matter even if twenty-four contracted images are displayed as shown in FIG. 27.

In FIG. 30, three images each of which is based on the same original image but having a different separated area from the original image are displayed as contracted images. A contracted image 3001 is obtained by contracting the original image as it is. A contracted image 3002 is obtained by being separated with an oval matching the size of the face, a contracted image 3003 is obtained by being separated with the heart-shaped template 2801 also matching the size of the face, and a contracted image 3004 is obtained by being separated also with the star-shaped template 2805.

As for the contracted image 3001, a rectangle with a minimum size which can cover the image is the same as the image 3001 in size. Thus, the size of rectangle is compared with the length and breadth of a frame where the contracted image is to be displayed. Controls are provided so that the original image is contracted with a specified magnification such that the entire image 3001 becomes a maximum image displayable in the frame and the image is displayed in a display frame.

As for the contracted image 3002, a rectangle with a minimum size which can cover the separated image is computed, the size of the rectangle is compared with the length and breadth of the display frame, and controls are provided so that the original image is enlarged by a specified magnification such that the entire rectangle is displayable with its maximum size and the image is displayed in a display frame.

As understood when the images in FIG. 30 are compared to each other, the rectangle is smaller than the original image in size, therefore, the contraction ratio of the original image is smaller, so that it is obvious that the image itself (a portion of the face) is larger as compared to the contracted image 3001. The same effect is obtained in the contracted images 3003 and 3004.

Figure 31:
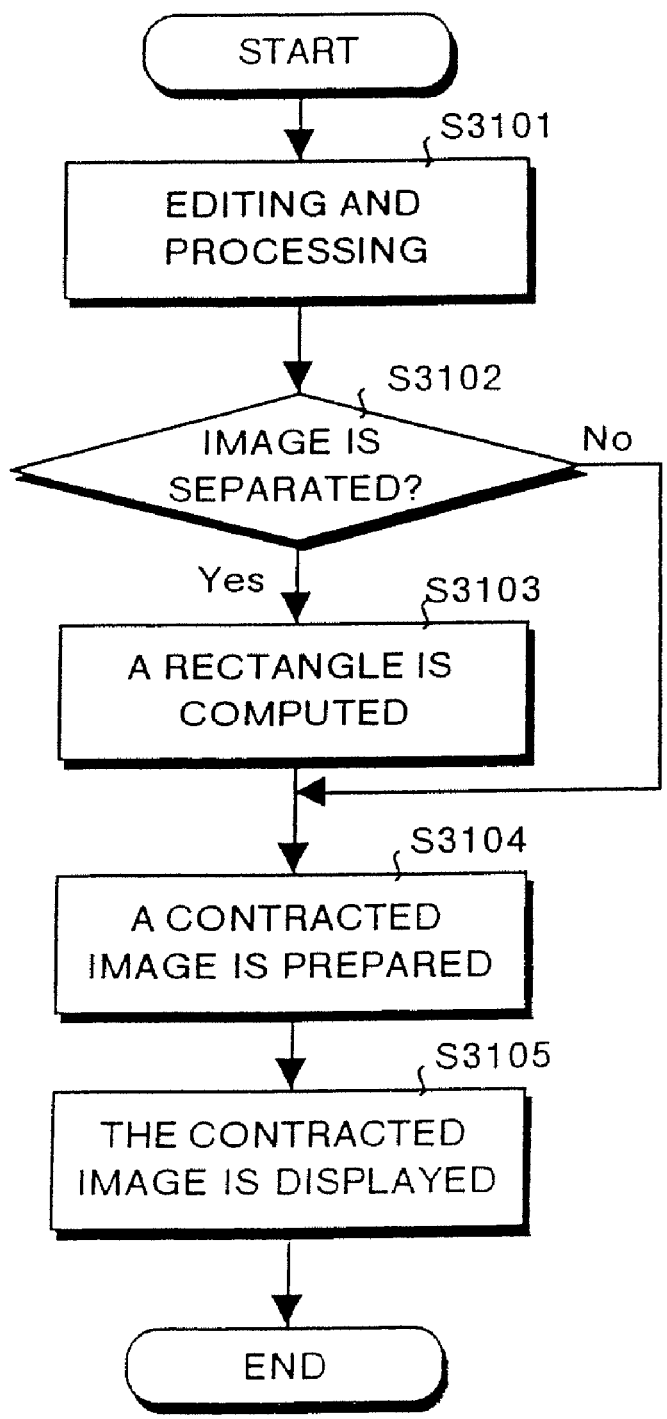
FIG. 31 is a flow chart showing a sequence of a series of processing for displaying a contracted image in the image processing apparatus according to Embodiment 6.

Next description is made for a sequence of a series of processing for displaying a contracted image in Embodiment 6. FIG. 31 is a flow chart showing the sequence of a series of processing for displaying a contracted image in the image processing apparatus according to Embodiment 6 of the present invention. In the flow chart in FIG. 31, at first, a selected image is edited and processed in various ways (step S3101).

Then, it is determined in step S3101 whether the edited and processed image is separated or not (step S3102). In step S3102, when it is determined that the image is not separated (step S3102: NO), the processing shifts to step S3104. While in step S3102, when it is determined that the image is separated (step S3102: YES), a rectangle with a minimum size which can cover the separated image is computed (step S3103).

Then, in step S3104, a contracted image is prepared according to the rectangle with a minimum size covering the not separated or the separated image. Then, the contracted image prepared in step S3104 is displayed at a specified position of the display 308 (step S3105), and all the processing is ended.

As described above, with Embodiment 6, the separated image as a whole is displayed as a contracted image, so that the image is displayed larger as compared to the original image so as to check characteristics of a separated portion on the contracted image. This allows the operator to easily check the characteristics of each image, and quickly grasp situations such as separated shape and size of the image on the contracted image, and because of this feature, the operator can efficiently retrieve any image.

In Embodiment 7 described below, by specifying a color to be a transparent color, operator can arbitrarily select a color used for coloring a section to be made transparent, so that it is possible to avoided a situation in which a section not to be made transparent is disadvantageously made transparent.

The hardware configuration of an image and document preparing system as a whole including an image processing apparatus according to Embodiment 7 of the present invention and the image processing apparatus 100 are the same as those in Embodiment 1, so that description thereof is omitted herein. The configuration in the other sections of the image processing apparatus 100 excluding the image changing section 304 and the display controller 307 is also the same as those in Embodiment 1, so that description thereof is also omitted herein.

Figure 32:
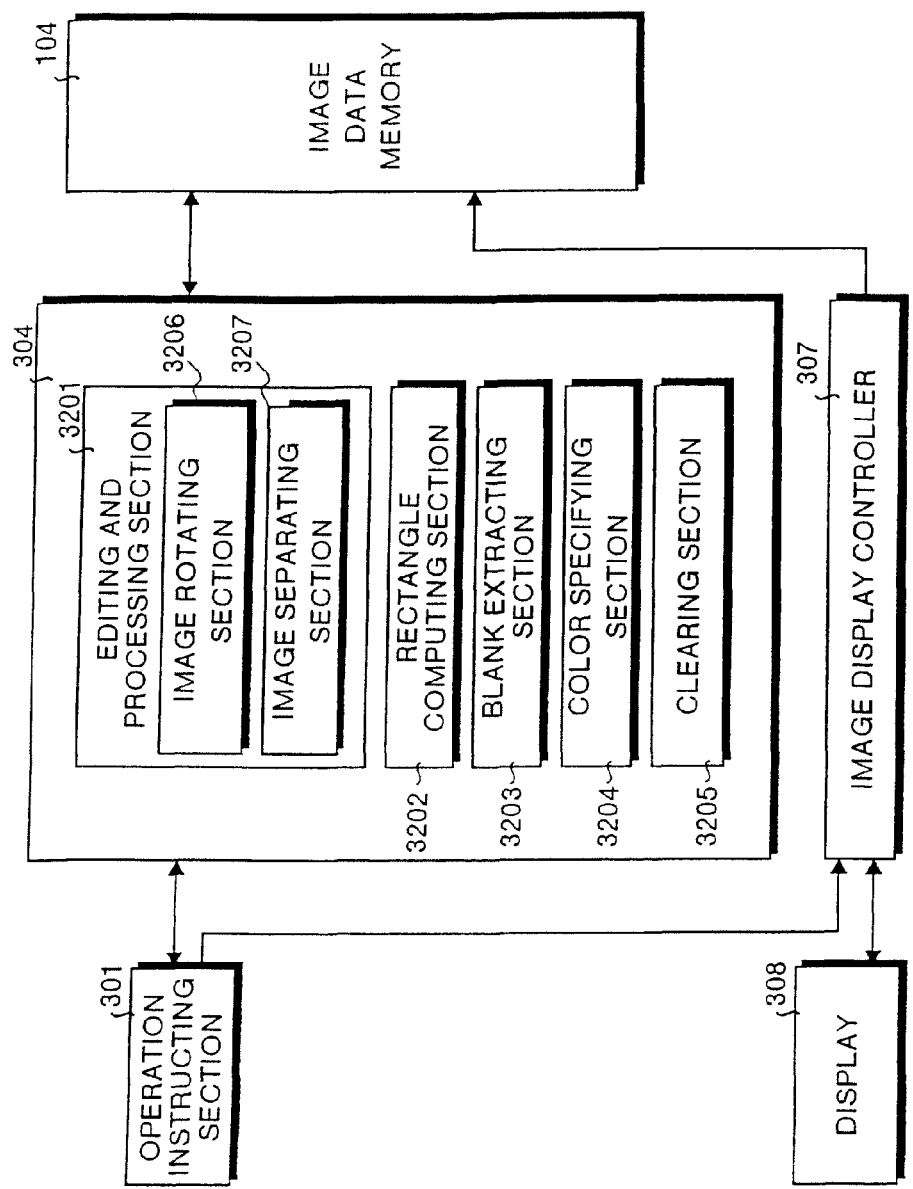
FIG. 32 is a block diagram functionally showing configuration of an image changing section and a peripheral section thereof in the image processing apparatus according to Embodiment 7 of the present invention.

Detailed description is made for configuration of the image changing section 304. FIG. 32 is a block diagram functionally showing configuration of the image changing section 304 and the peripheral section thereof in the image processing apparatus according to Embodiment 7 of the present invention. As shown in FIG. 32, the image changing section 304 comprises an editing and processing section 3201, a rectangle computing section 3202, a blank extracting section 3203, a color specifying section 3204, and a clearing section 3205. Further, the editing and processing section 3201 includes an image rotating section 3206 and an image separating section 3207.

The editing and processing section 3201 is a section which edits and processes an image displayed on the display 308 by the image display controller 307 and stored in the image data image 104. The editing and processing includes the processing of rotating a displayed image by a specified angle with the image rotating section 3206 and the processing of separating a displayed image in a specified shape with the image separating section 3207, reversing an image, changing a number of pixels of an image, color adjustment for a color image, and synthesizing the images or the like.

It should be noted that available technology is used for rotation of an image by the image rotating section 3206 and separation of an image by the image separating section 3207. Details of the processing for rotation of an image and separation of an image will be described later. Further, image edited and processed by the editing and processing section 3201 is stored in the image data memory 104 with a file name added thereto.

The rectangle computing section 3202 computes a rectangle having a minimum size among those that can cover the edited and processed image. The blank extracting section 3203 extracts a blank section which is a section other than the edited image of the rectangle computed by the rectangle computing section 3202. The color specifying section 3204 specifies a color used for coloring the blank section extracted by the blank extracting section 3203.

More specifically, when the edited and processed image is stored in the image data memory 104, the operator specifies a color from a transparent color setting screen. The clearing section 3205 makes transparent the section colored with a specified color by the color specifying section 3204. Details of the processing for computing a rectangle, extracting a blank, specifying a color, and transparent processing will be described later.

The editing and processing section 3201, rectangle computing section 3202, blank extracting section 3203, color specifying section 3204, clearing section 3205, image rotating section 3206, and image separating section 3207 realize the respective functions when the CPU 201 or other related section executes commands according to instructions described in programs such as an operating system or application programs recorded in a storage medium such as the ROM 202, RAM 203, hard disk 205, or floppy disk 207.

Figure 33:
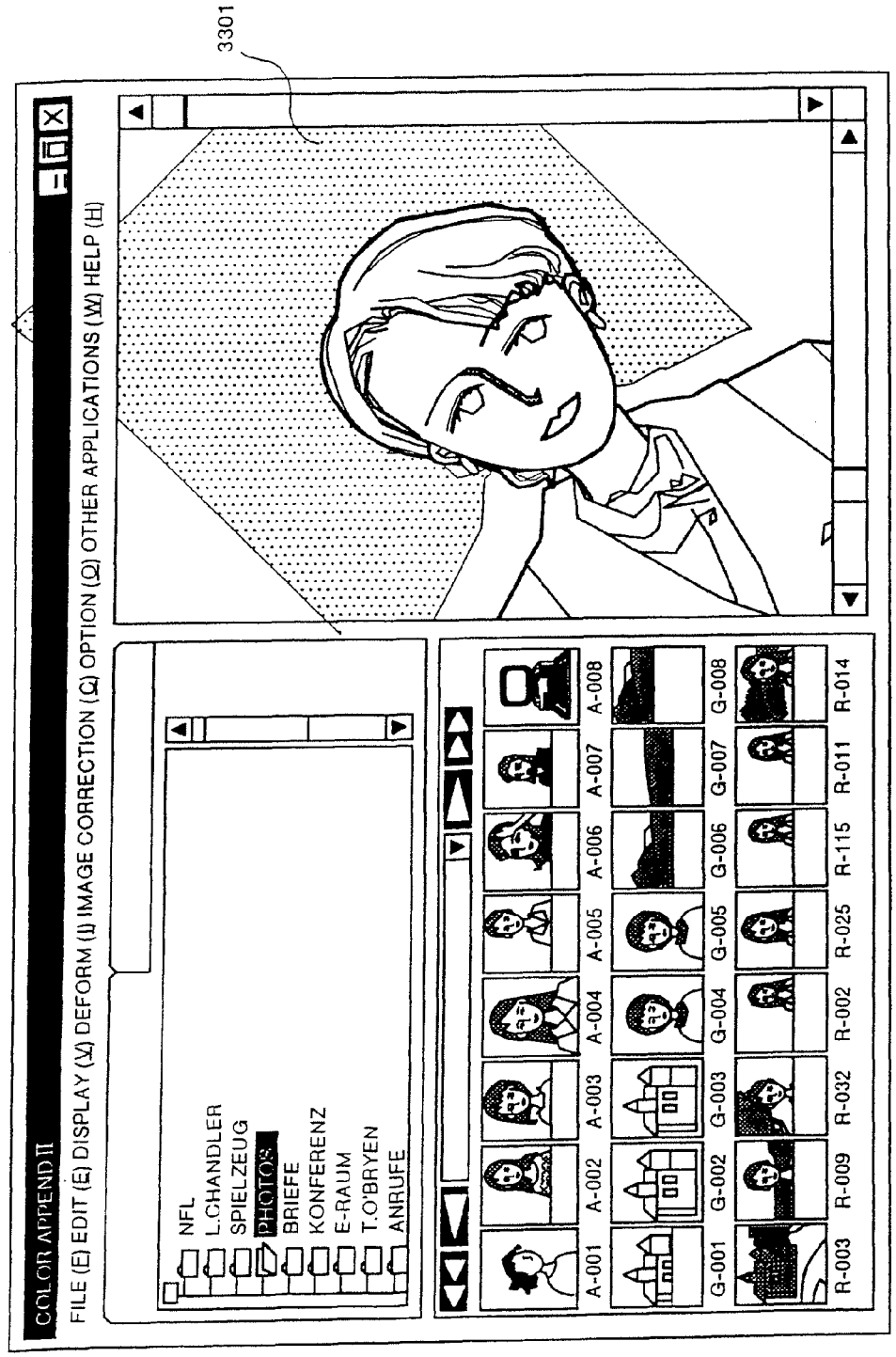
FIG. 33 is an explanatory view showing another example of a screen displayed on the display of the image processing apparatus according to Embodiment 7.

Next, description is made for the processing for rotating an image. FIG. 33 shows another example of a screen displayed on the display 308 of the image processing apparatus according to Embodiment 7 of the present invention. In FIG. 33, a selected image 3301 obtained by rotating the image selected in FIG. 5 by 45 degrees in the clockwise direction is displayed in the selected image displaying area 503.

As a method of instructing to rotate a graphics includes a method of inputting, for instance, a desired rotational angle and a rotational direction through the keyboard 211 to rotate an image around the center of the image. There may be employed a method of rotating an image to a specified angle by dragging the image with the mouse 212 or the like. The method of rotating an image is not particularly limited.

The selected image 3301 has the same size as that of the image displayed in the selected image displaying area 503 in FIG. 5. However, it is clear that the image as a whole is not displayed within the selected image displaying area 503 because of the rotation of the image by 45 degrees.

Figure 34:
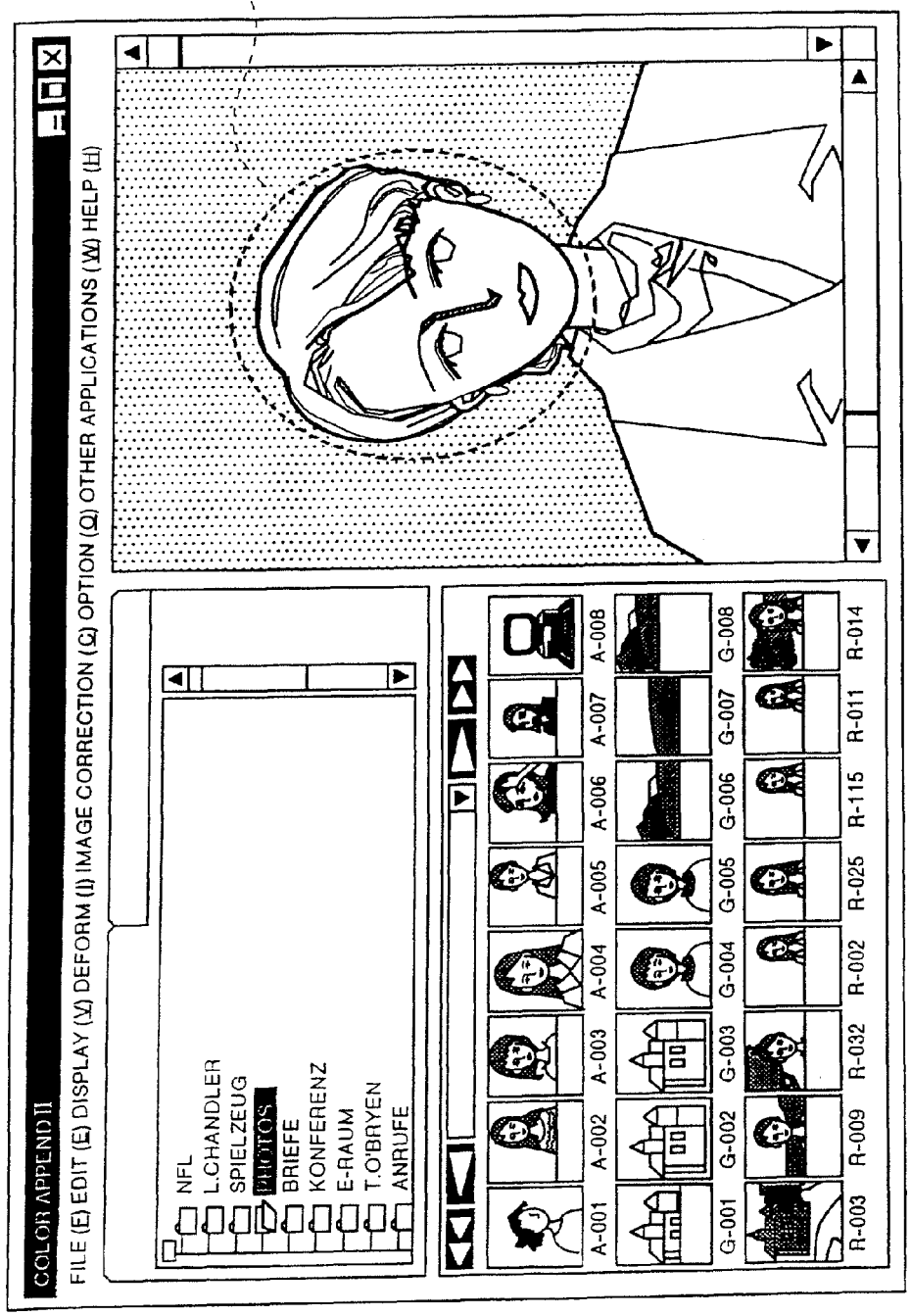
FIG. 34 is an explanatory view showing another example of a screen displayed on the display of the image processing apparatus according to Embodiment 7.

Description is made for the processing of separation of an image. FIG. 34 shows one example of a screen displayed on the display 308 of the image processing apparatus according to Embodiment 7 of the present invention. In FIG. 34, an oval indicated by a dotted line is a separating line 3401 for an image. To separate an image with the oval, at first a type of area is selected. As the types of areas, in addition to the oval, a polygon, a free hand, and a template are prepared.

The oval is realized with the mouse 212 or the like by pressing the mouse button thereof or the like at a desired position, and moving the mouse 212 while pressing the button until the area becomes of a desired size and shape with the oval separating line 3401 indicated by a dotted line appearing on the screen in response to releasing the pressing of the mouse button or the like at the point of time the area has become the desired size and shape.

The polygon is formed with the mouse 212 or the like by making a single-click at a desired position which position is regarded as a vertex of the polygon. Then the operator double-clicks the mouse at each of the vertices of the polygon and returns to the position where the mouse was single-clicked and the completes polygon. Thus, the polygonal separating line indicated by a dotted line appears on the screen.

In a case of a free hand, a shape is drawn with the mouse 212 or the like by pressing the mouse button thereof or the like at a desired position, drawing a desired shape freehand with the mouse button being pressed, and by automatically lining from the position at the point of time the pressing of the mouse button is relieved to the original start point, a closed area is completed. The closed area is confirmed as an area to be separated, and the separating line for the area to be separated indicated by a dotted line appears on the screen.

Figure 35:
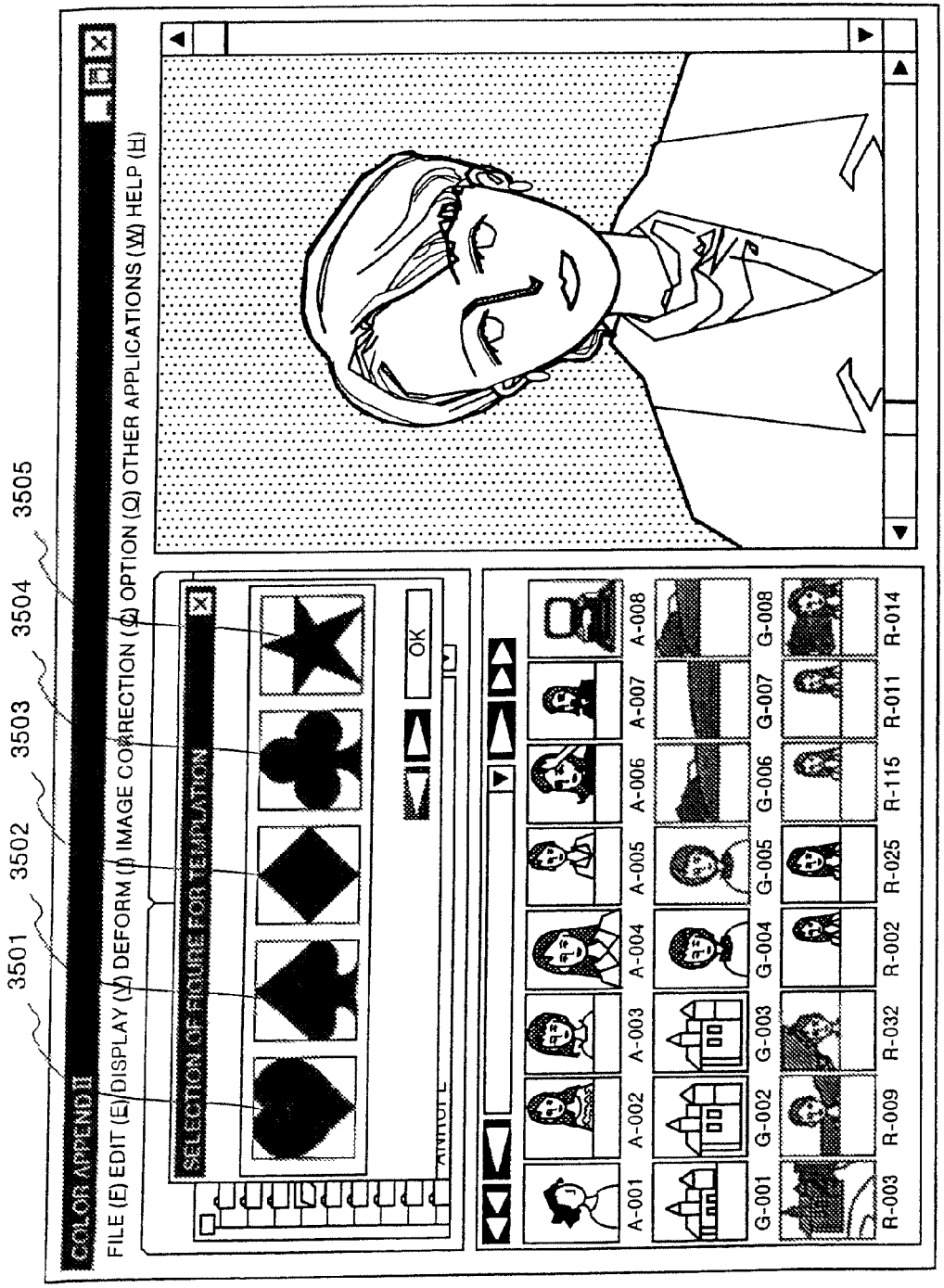
FIG. 35 is an explanatory view showing another example of a screen displayed on the display of the image processing apparatus according to Embodiment 7.

Next, description is made for specification of an area with a template. FIG. 35 shows another example of a screen displayed on the display 308 of the image processing apparatus according to Embodiment 7 of the present invention. In FIG. 35, there appear a plurality of templates (a heart-shaped template 3501, a spade-shaped template 3502, a diamond-shaped template 3503, a clover-shaped template 3504, and a star-shaped template 3505) thereon. The templates are not limited to these five described above and the operator can create an arbitrary shape and register the shape as a template.

Figure 36:
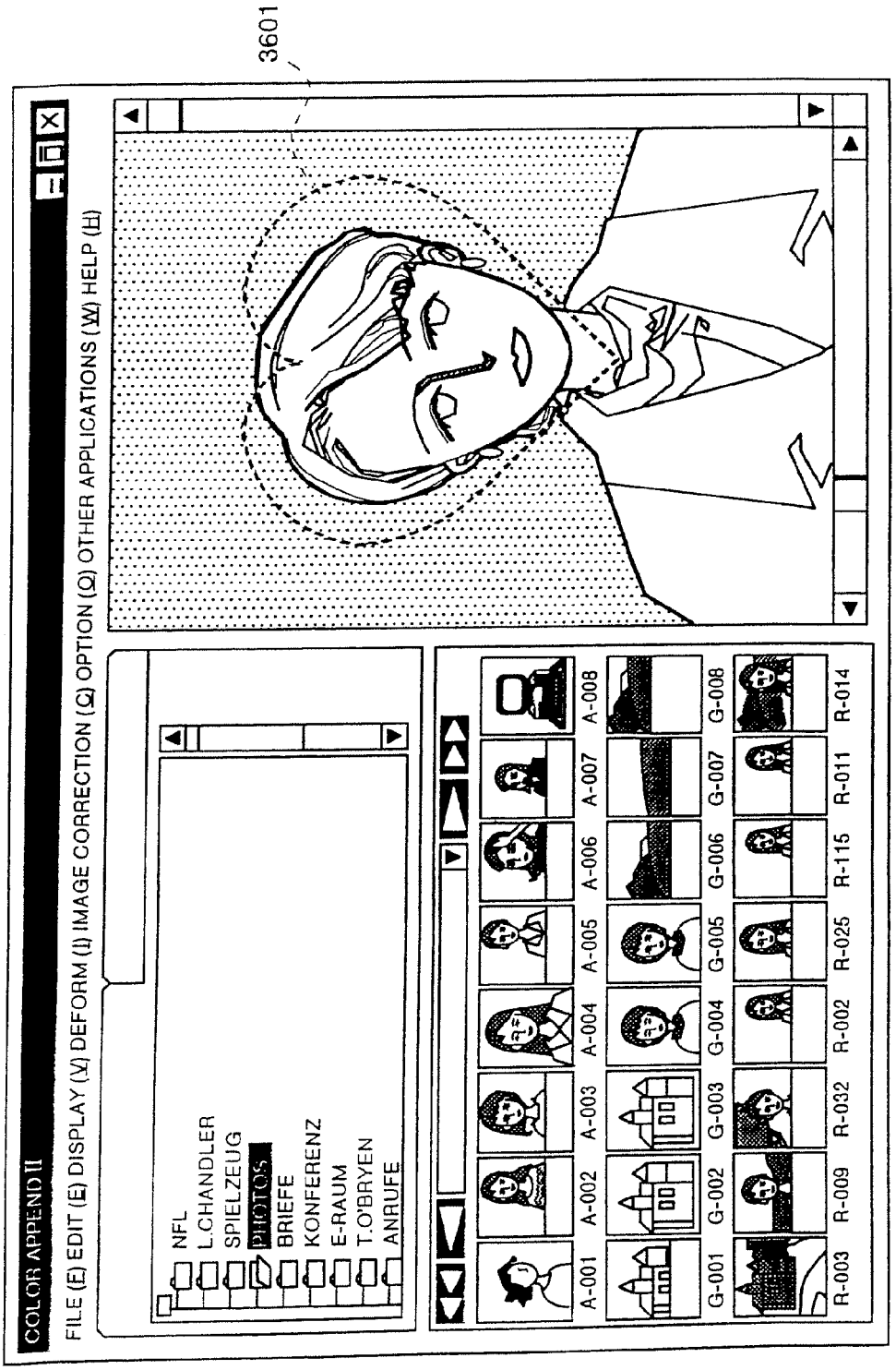
FIG. 36 is an explanatory view showing another example of a screen displayed on the display of the image processing apparatus according to Embodiment 7.

FIG. 36 shows another example of a screen displayed on the display 308 of the image processing apparatus according to Embodiment 7 of the present invention. In FIG. 36, an image is separated by using the heart-shaped template 3501 with the heart-shaped separating line 3601 appearing on the image. The processing of separating an image with a template is the same as that of separating an image with the oval so that description thereof is omitted herein.

Figure 37:
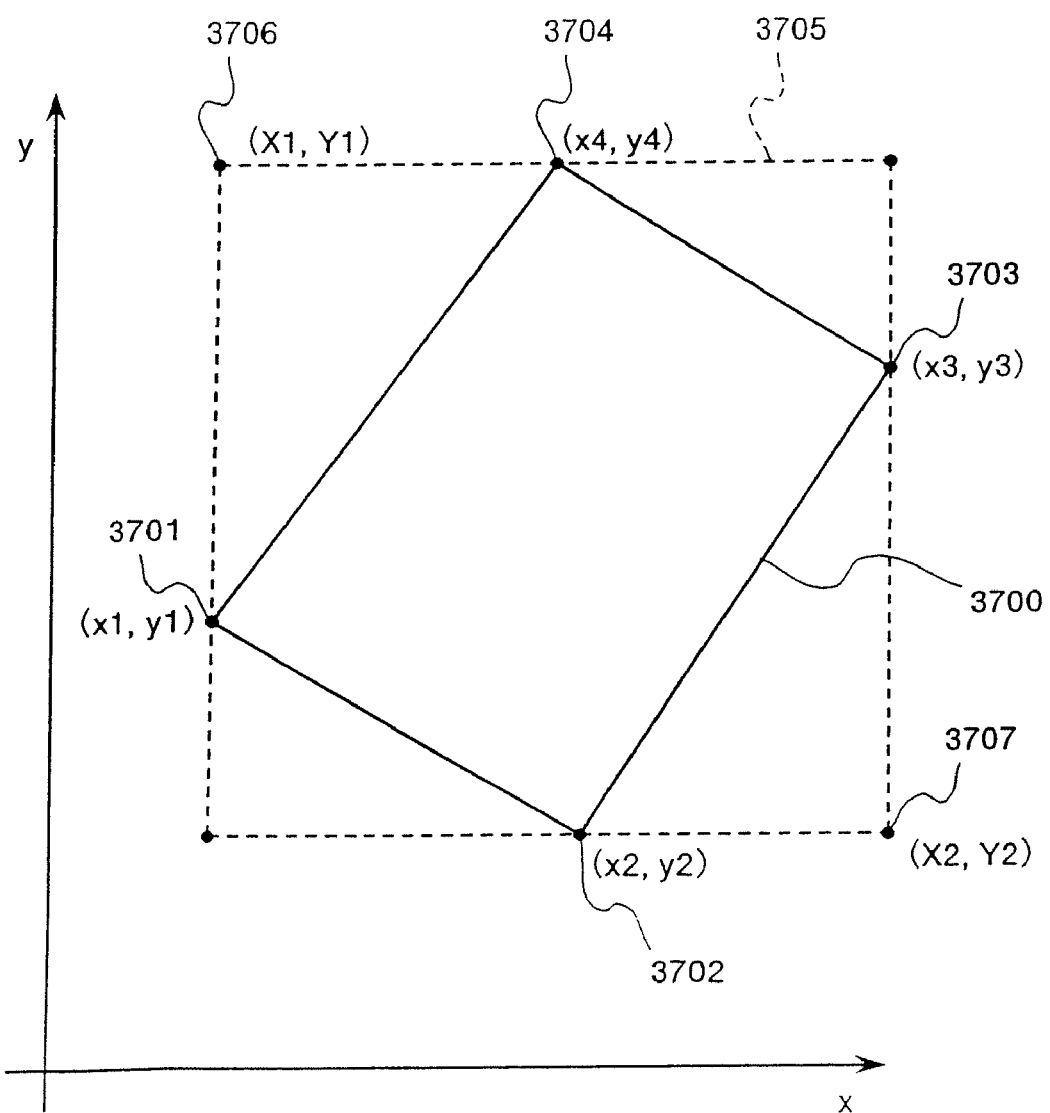
FIG. 37 is an explanatory view conceptually showing processing for computing a rectangle executed by a rectangle computing section of the image processing apparatus according to Embodiment 7.

Description is made for a method of computing a rectangle by the rectangle computing section 3202. FIG. 37 explains the rectangle computing method employed by the rectangle computing section 3202 in the image processing apparatus according to Embodiment 7 of the present invention. In FIG. 37, a rotated rectangular image 3700 has four vertexes 3701 (x1, y1), 3702 (x2, y2), 3703 (x3, y3), and 3704 (x4, y4).

Of those vertexes, vertexes having the largest and the smallest coordinates for x and those having the largest and the smallest coordinates for y are extracted respectively. The largest coordinate for x is x3, and the smallest is x1. The largest coordinate for y is y4, and the smallest is y2.

A rectangle 3705 to be obtained is shown by a dotted line. By obtaining two vertexes on a diagonal line of the rectangle, a rectangle with the minimum size covering the image 3700 can be obtained. A vertex 3706 (X1, Y1) and a vertex 3707 (X2, Y2) on the diagonal line thereof are obtained as X1=x1, Y1=y4, X2=x3, and Y2=y2.

Namely, it is understood that the vertexes of the rectangle 3705 to be computed are coordinates with, of each vertex of the rotated rectangle, the maximum value of the coordinate in the x direction and the minimum value of the coordinate in the y direction, and those with the minimum value of the coordinate in the x direction and the maximum value of the coordinate in the y direction. A length of each side of the rectangle 3705 is a length as a difference obtained by comparing the coordinates between the two vertexes of the rectangle 3705 in the x direction to each other and the coordinates therebetween in the y direction to each other, and subtracting the small value from the large value in each direction. The rectangle 3705 is computed as described above.

A method of computing a rectangle with a minimum size among those which can cover the image whose size has been changed especially due to separation thereof with the image separating section 3207 is realized, similarly to that of the rotated rectangular image, by obtaining the maximum value as well as minimum value of the coordinates in the x direction and the maximum value as well as minimum value of the coordinates in the y direction according to the coordinates of the trail along the line of separation of the image, and the rectangle is computed from the obtained values.

Figure 38:
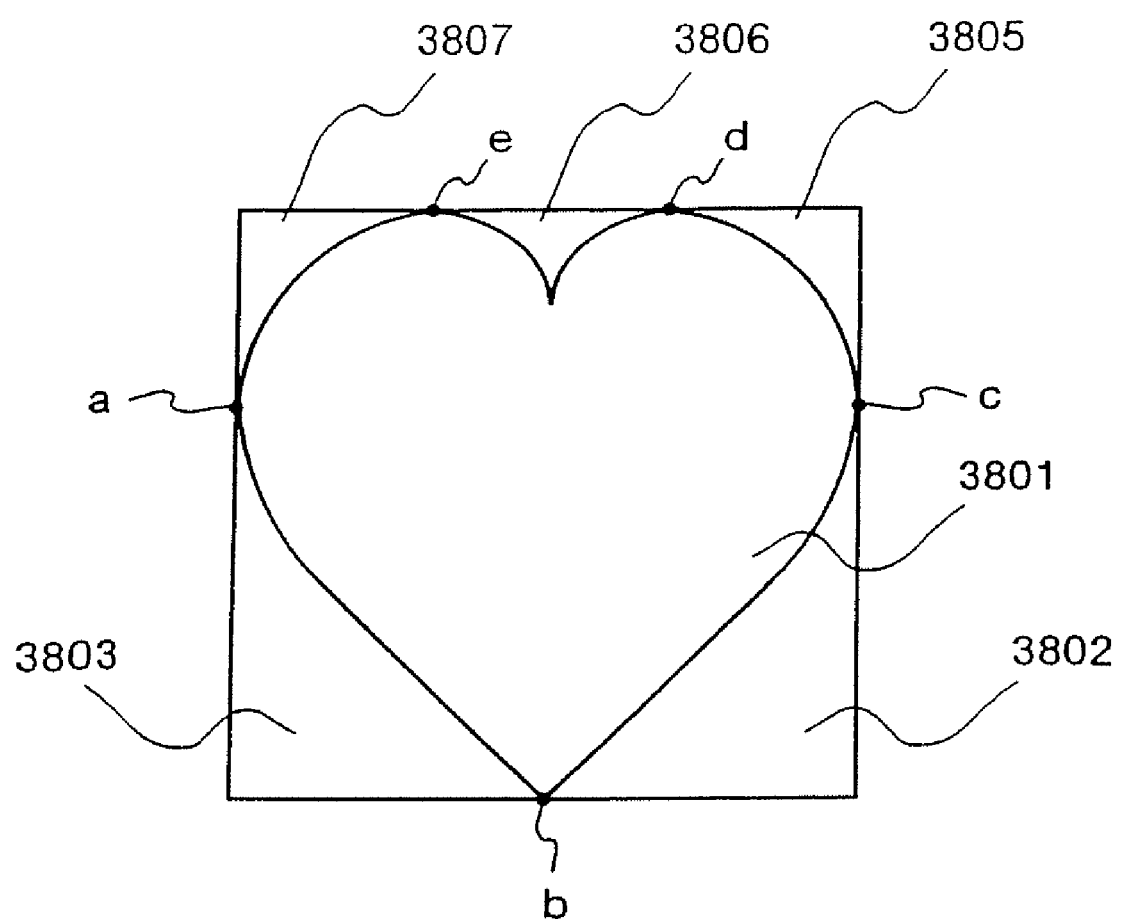
FIG. 38 is an explanatory view conceptually showing processing for extracting a blank section executed by a blank extracting section of the image processing apparatus according to Embodiment 7.

Next, description is made for extraction of a blank by the )lank extracting section 3203. FIG. 38 explains the method of blank extraction employed by the blank extracting section 3203 .n the image processing apparatus according to Embodiment 7 of the present invention. FIG. 38 shows a separated image 3801 and a rectangle 3802 covering the image 3801. The image 3801 and the rectangle 3802 contact each other at contact points a, b, c, d, and e.

A blank section is a section remained when the image 3801 is removed from the rectangle 3202, and a blank section 3803 is in an area between the contact points a and b, a blank section 3804 is an area between the contact points b and c, a blank section 3805 is an area between the contact points c and d, a blank section 3806 is an area between the contact points d and e, and a blank section 3807 is an area between the contact points e and a respectively. Those blank sections 3803 to 3807 can be obtained by computing a difference based on the coordinates indicating the area of the image 3801, coordinates indicating the area of the rectangle 3802, and coordinates of the contact points a to e. The blank extracting section 3203 extracts a blank as described above.

Figure 39:
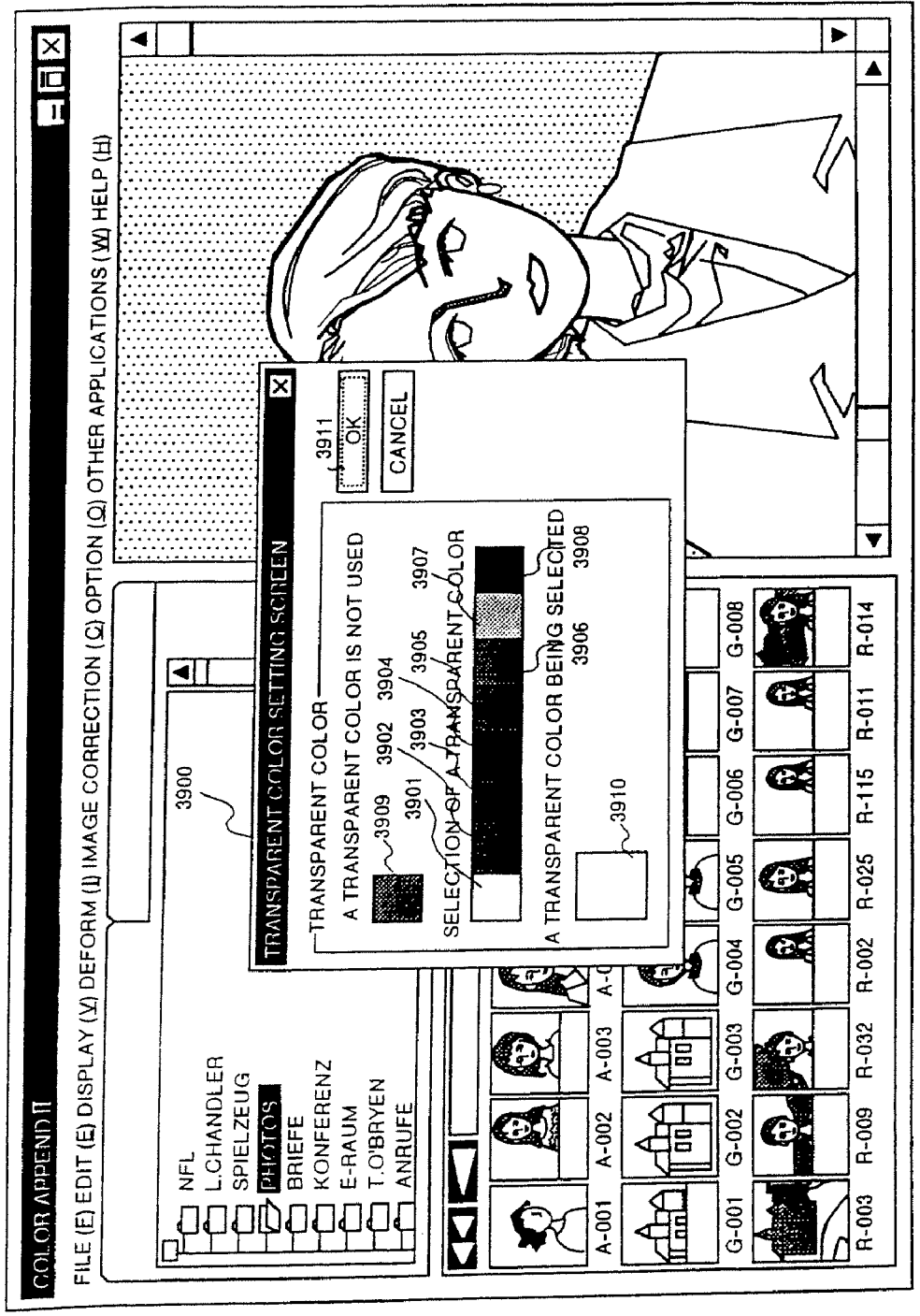
FIG. 39 is an explanatory view showing another example of a screen displayed on the display of the image processing apparatus according to Embodiment 7.

Next description is made for processing of specifying a color by the color specifying section 3204. FIG. 39 shows another example of a screen displayed on the display 308 of the image processing apparatus according to Embodiment 7 of the present invention. In FIG. 39, when "Option (O)"— "Environment settings"—"Transparent-color settings" are chosen from the menu bar, a transparent-color setting screen 3900 appears on the screen. Eight colors are previously prepared in the transparent-color setting screen 3900 for selecting a transparent color.

A white color selection box 3901, a red color selection box 3902, a green color selection box 3903, a blue color selection box 3904, a pink color selection box 3905, a light-blue color selection box 3906, a yellow color selection box 3907, and a black color selection box 3908 appear in the transparent-color selection box in the area below the area where "Select a transparent color" appears. The operator specifies a desired color used for coloring a blank section from those selection boxes 3901 to 3908.

A method of specifying one of the colors is generally realized by moving a mouse cursor above the area of a desired selection box with the mouse 212 or the like and clicking the mouse button or the like. When a transparent color is not to be used, the operator specifies a gray-colored box 3909 for not using a transparent color appearing in the lower side of the area described "Transparent color is not used" in the same manner as described above.

The color specified by clicking the mouse 212 or the like appears in a display box 3910 in the lower side of the area described "transparent color being selected". When the box 3909 for not using a transparent color is specified, the gray color appears in the display box 3910. When specification of the color is confirmed, "OK" button 3911 is operated, then the color specification is completed, and the transparent-color setting screen 3900 is closed. With this, the processing of specifying a color is completed. When a color is to be changed, repetition of the same processing allows colors to be changed for any number of times.

Color specification is generally performed with a white color. Accordingly, the default value is also set to the white color. However, when an image is based on white color as a whole, for instance, when the image is a photograph of a snowscape, and if the white color is specified, not only the blank section is made transparent but also the section of the image having a white color is disadvantageously made transparent. In that case, the problem described above can be avoided by specifying one of the other colors.

After the color is specified, when the image is edited and processed, for instance, when a portion of the image is selected and the selected image is stored in the image data memory 104, the color in the blank section in the rectangle having a minimum size covering the separated shape is colored with the color specified at the time of specifying a color. If the same processing is performed without specifying a color therefor, the section is colored with a white color which is the default color. When the separation is executed after the specifying the box 3909 for not using a transparent color, the white color as the default is also used for coloring.

Figure 40:
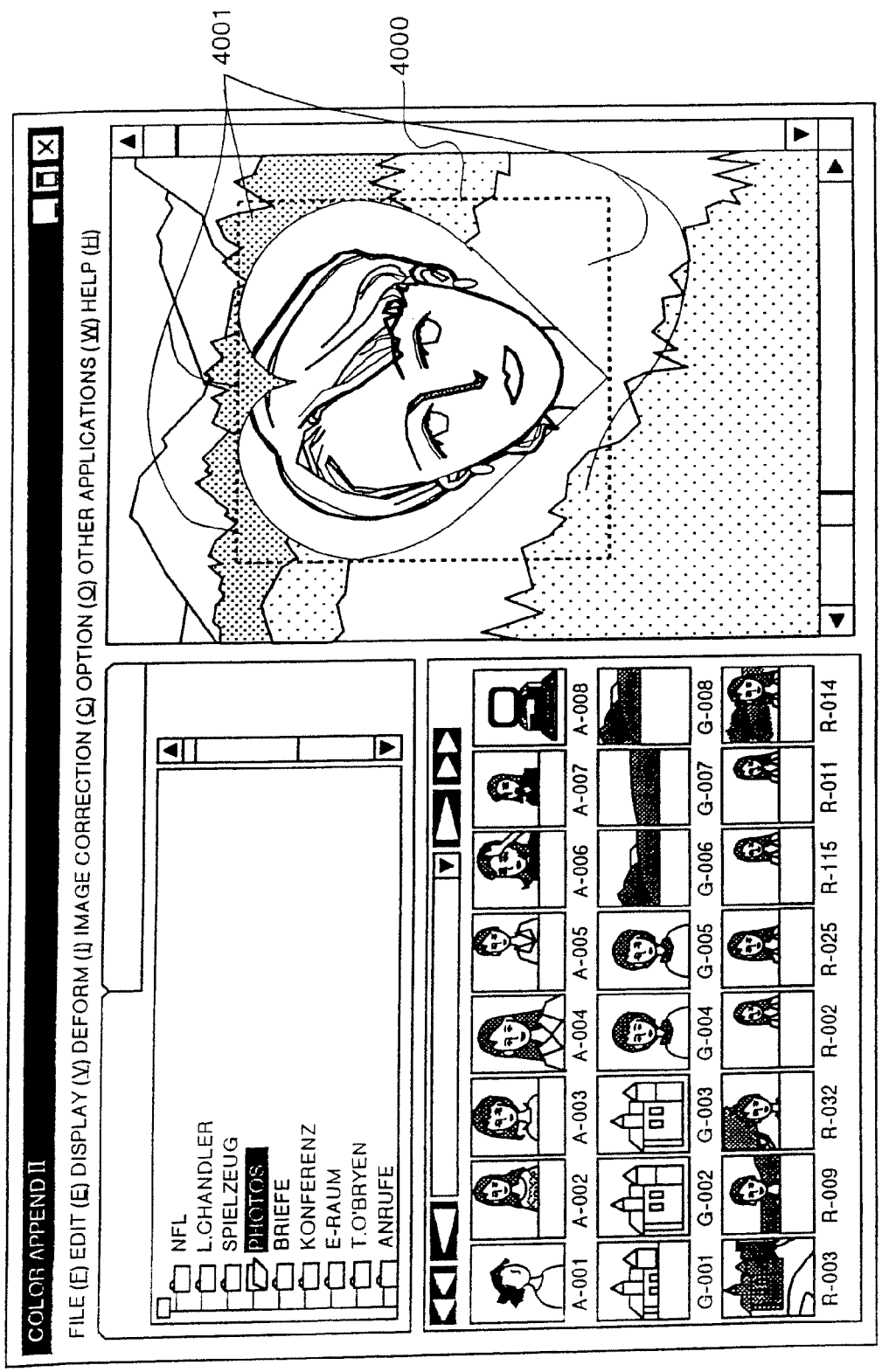
FIG. 40 is an explanatory view showing another example of a screen displayed on the display of the image processing apparatus according to Embodiment 7.
Figure 41:
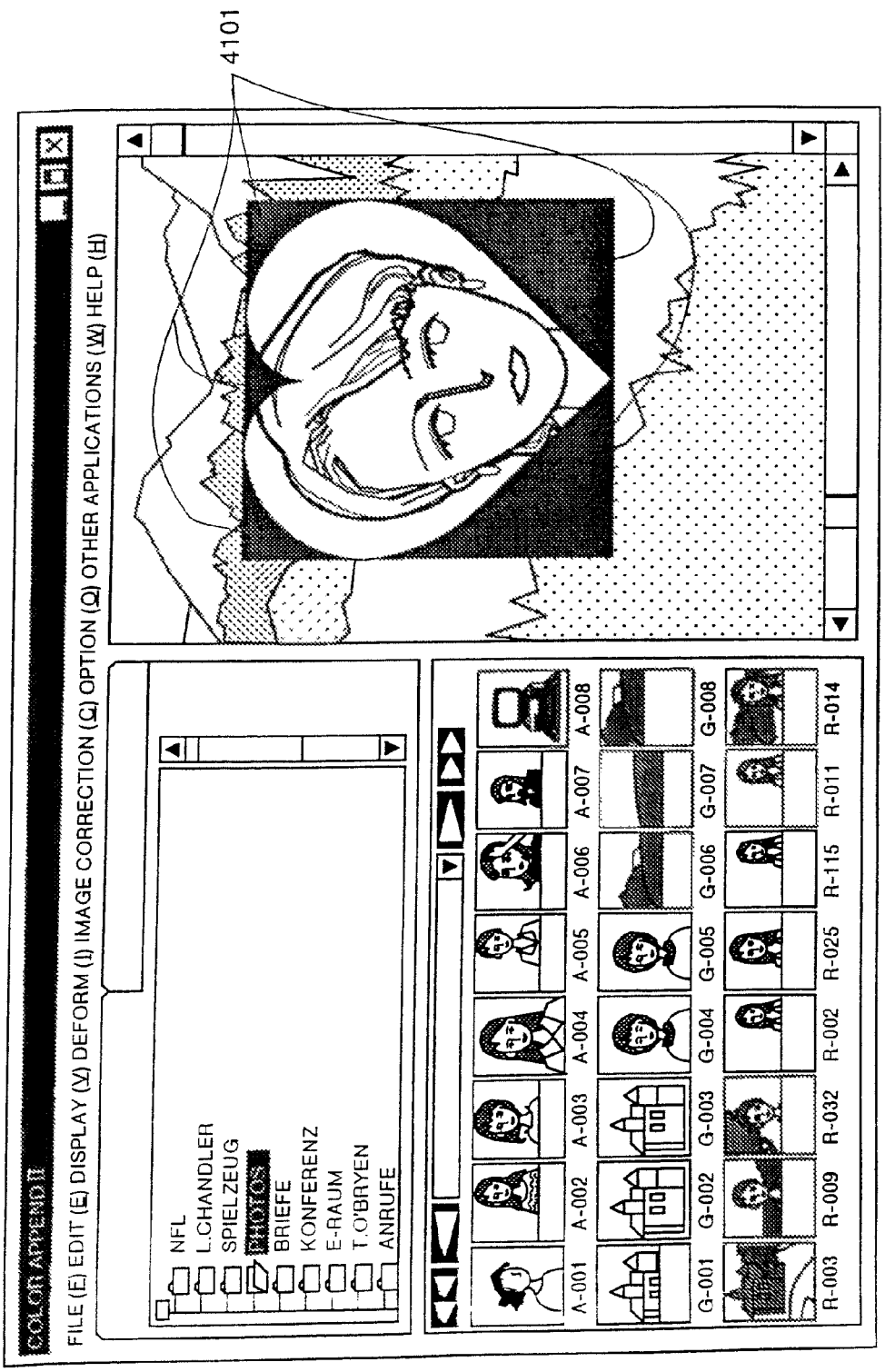
FIG. 41 is an explanatory view showing another example of a screen displayed on the display of the image processing apparatus according to Embodiment 7.

Description is made for transparent processing by the clearing section 3205. FIGS. 40 and 41 show another examples of a screen displayed on the display 308 of the image processing apparatus according to Embodiment 7 of the present invention. FIG. 40 shows a case in which a transparent processing is subjected when the images are synthesized, while FIG. 41 shows a case in which the transparent processing is not subjected.

The transparent processing by the clearing section 3205 is processing for making transparent the image in the corresponding color section, when there is a color to be made transparent in an image 4000 as an object for editing and processing including blank sections 4001 indicated by a dotted line so that an image hidden below the image as an object for editing and processing can be seen. In FIG. 40, as the blank sections 4001 are colored with a color to be made transparent, these blank sections are made transparent so that the image hidden below the image projects and appears.

On the other hand, in FIG. 41, blank sections 4101 are not colored with a color to be made transparent, so that the blank sections are not made transparent and are shown as they are. The case where the blank sections 4101 are not colored with a color to be made transparent includes, in the color specifying section 3204, for instance, a case where a color to be made transparent is changed to a different color from the color used for coloring a blank section after an image is stored, or a case where a color used for coloring a blank section is changed to a different color after an image is stored.

Figure 42:
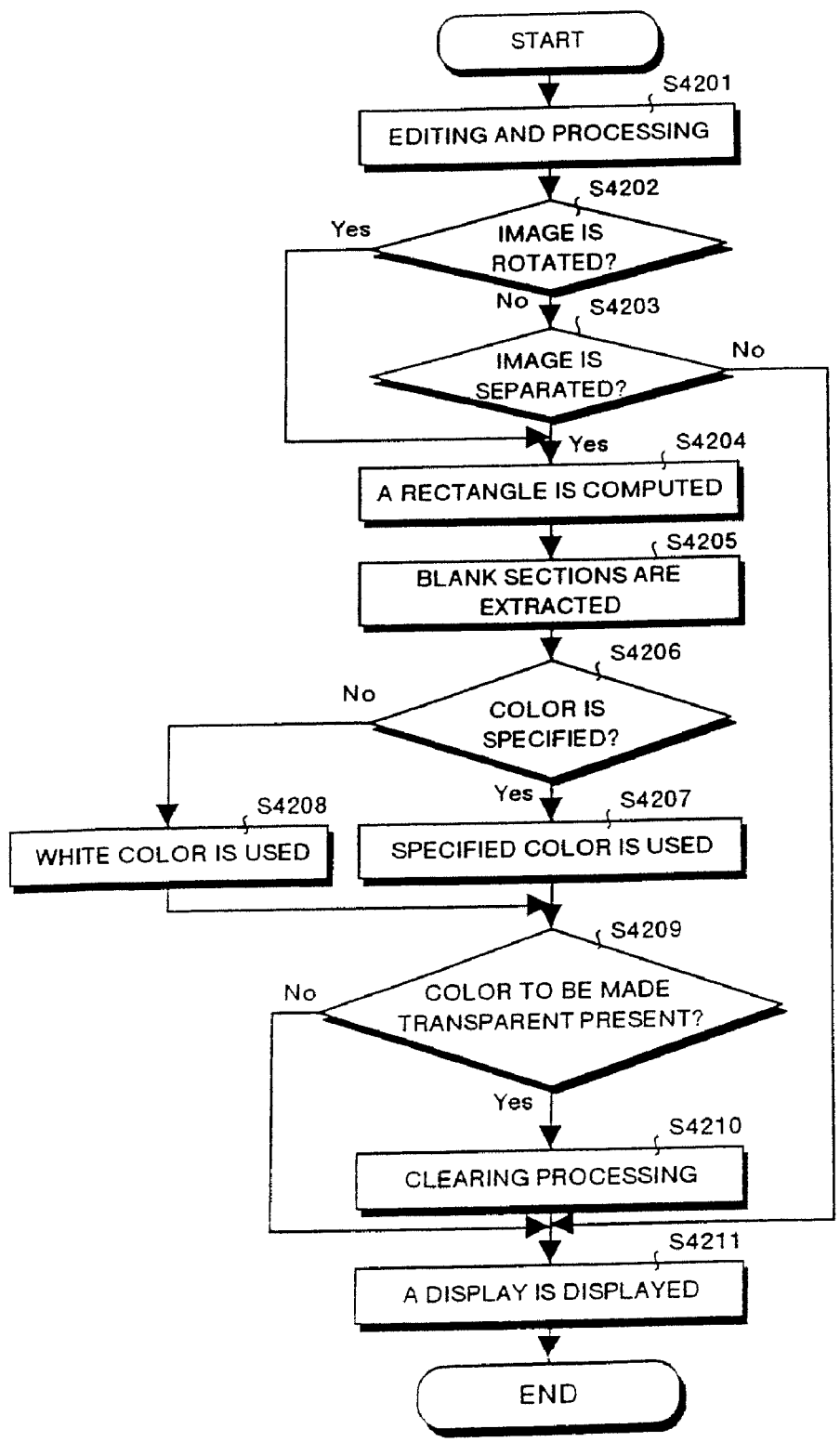
FIG. 42 is a flow chart showing a sequence of a series of processing executed by an image changing section and a display controller according to Embodiment 7.

Description is made for a sequence of a series of processing by the image changing section 304 as well as for the display controller 307 in Embodiment 7. FIG. 42 is a flow chart showing the sequence of a series of processing for the image changing section 304 as well as for the display controller 307 according to Embodiment 7 of the present invention. In the flow chart in FIG. 42, at first, a selected image is edited and processed in various ways (step S4201).

Then, it is determined whether the image edited and processed in step S4201 is rotated or not (step S4202). It is also determined whether the image edited and processed in step S4201 is separated or not (step S4203).

When it is determined that the image is subjected to either one of the processing in step S4202 and step S4203 (step S4202: YES, or step S4202: NO and step S4203: YES), a rectangle having a minimum size which can cover the edited and processed image is computed (step S4204).

On the other hand, when it is determined that the image is subjected to neither of the processing in step S4202 nor the processing in step S4203 (step S4202: NO, and step S4203: NO), the processing shifts to step S4211. When a rectangle is computed in step S4204, the image changing section extracts blank sections from the difference between the rectangle and the edited and processed image (step S4205).

Then, it is determined whether a color used for coloring a blank section is specified or not (step S4206). In step S4206, when it is determined that a color is specified, the blank sections are colored with the specified color (step S4207). While in step S4206, when it is determined that a color is not specified, the blank sections are colored with the white color which is a default color (step S4208).

Then, it is determined whether there is a color in the image which is the same as the color set to be made transparent or not (step S4209). In step S4209, when it is determined that such a color exists (step S4209: YES), the portion of the image having that color is made transparent (step S4210). While in step S4209, when it is determined that such a color does not exist (step S4209: NO), the processing shifts to step S4211. Finally, the image is displayed (step S4211), and all the processing is ended.

As described above, with Embodiment 7, by specifying a color which is to be made transparent, the operator can arbitrarily select any color used for coloring a section to be made transparent, so that it is possible to be avoided that any section not to be made transparent is disadvantageously made transparent.

Although a color to be made transparent is specified by the color specifying section 3204 in Embodiment 7 described above, like in Embodiment 8 described below, a color to be made transparent may be set according to the colors in the image.

The hardware configuration of an image and document preparing system as a whole including an image processing apparatus according to Embodiment 8 of the present invention and the image processing apparatus 100 are the same as those in Embodiment 1, so that description thereof is omitted herein. The configuration in the other sections of the image processing apparatus 100 excluding the image changing section 304 is also the same as those in Embodiment 1, so that description thereof is also omitted herein.

Figure 43:
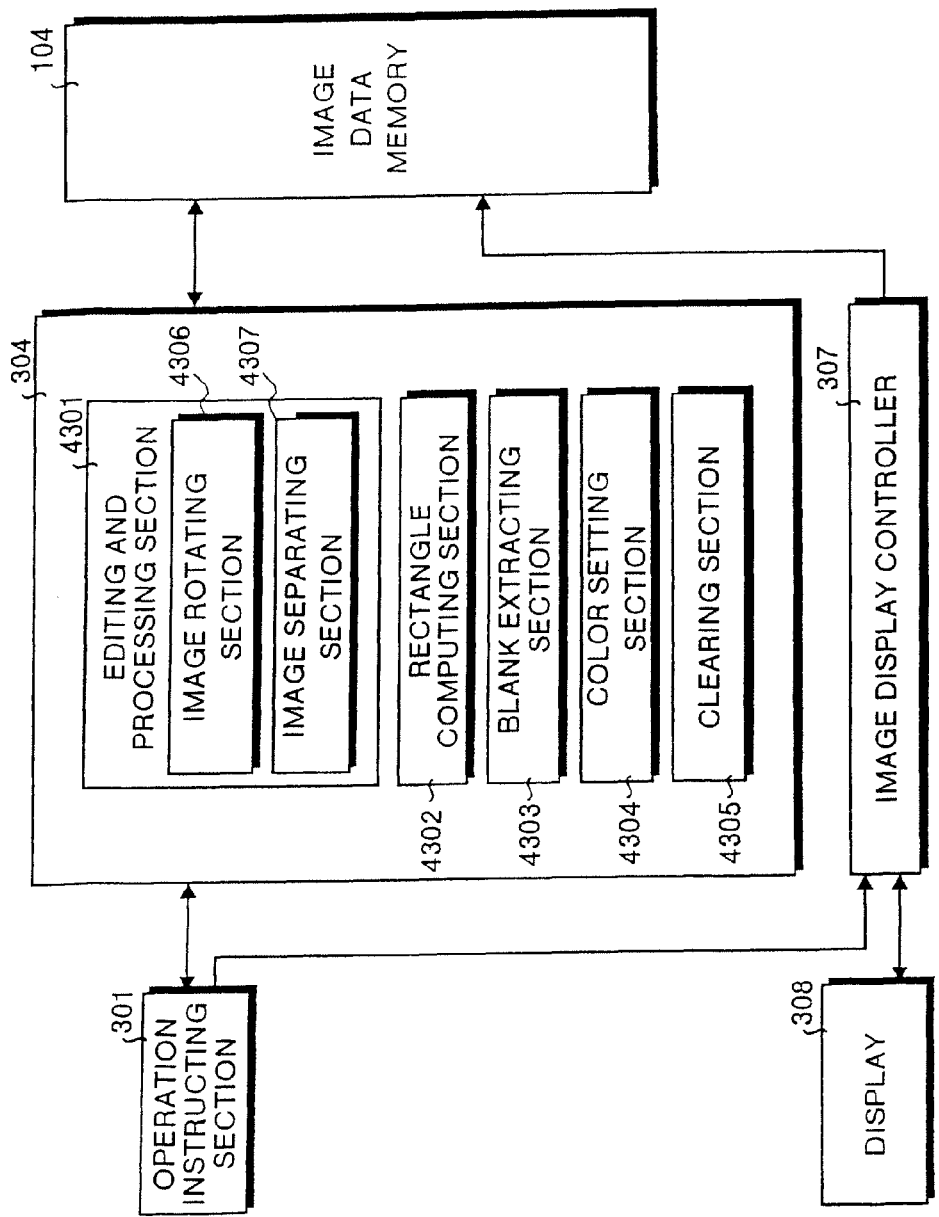
FIG. 43 is a block diagram functionally showing configuration of an image changing section, a display controller, and peripheral sections thereof in the image processing apparatus according to Embodiment 8 of the present invention.

Next description is made for the image changing section 304. FIG. 43 is a block diagram functionally showing configuration of the image changing section 304 and the peripheral section thereof in the image processing apparatus according to Embodiment 8 of the present invention.

As shown in FIG. 43, the image changing section 304 comprises an editing and processing section 4301, a rectangle computing section 4302, a blank extracting section 4303, a color setting section 4304, and a clearing section 4305. Further, the editing and processing section 4301 includes a image rotating section 4306 and a image separating section 4307. It should be noted that the configuration of the sections excluding the color setting section 4304 is the same as those in Embodiment 7, so that description thereof is omitted herein.

The editing and processing section 4301, rectangle computing section 4302, blank extracting section 4303, color setting section 4304, clearing section 4305, image rotating section 4306, and image separating section 4307 realize—the respective functions when the CPU 201 or other related section executes commands according to instructions described in programs such as an operating system or application programs recorded in a storage medium such as the ROM 202, RAM 203, hard disk 205, or floppy disk 207.

Figure 44:
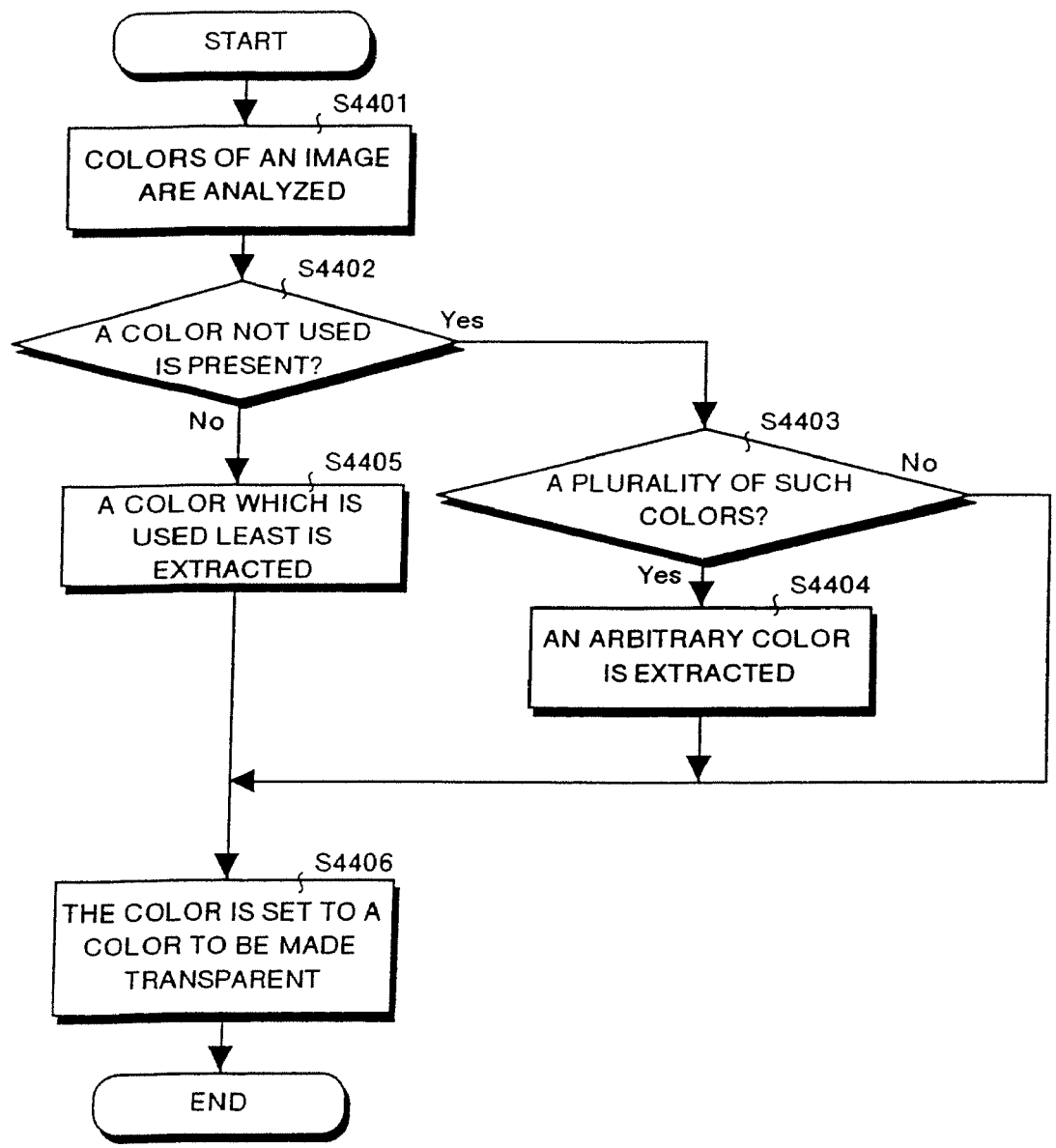
FIG. 44 is a flow chart showing a sequence of processing for setting a color executed by a color setting section according to Embodiment 8.

Next description is made for the processing of setting a color by the color setting section 4304. FIG. 44 is a flow chart showing a sequence of processing of color settings by the color setting section 4304 according to Embodiment 8 of the present invention. In the flow chart in FIG. 44, at first, the color setting section 4304 analyzes the colors of an edited and processed image (step S4401). The color setting section 4304 determines whether there is a color that is not used in the edited and processed image or not among a plurality of preset colors, for instance, eight colors set as candidates for color settings in Embodiment 7 (step S4402).

In step S4402, when it is determined that there is a color which is not present in the image, the color setting section 4304 determines if there are a plurality of such colors (step S4403). When it is determined that there are a plurality of such colors (step S4403: YES), one arbitrary color from these colors is extracted (step S4404), then the processing shifts to step S4406. While in step S4403, when it is determined that a plurality of such colors do not exist, namely there is only one such color (step S4403: NO), the processing shifts to step S4406.

In step S4402, when it is determined that there is not a single such color (step S4402: NO), the color setting section 4304 extracts a color used least from the plurality of colors present in the image (step S4405).

In step S4406, the extracted color is set as a transparent color, and all the processing is ended.

Figure 45:
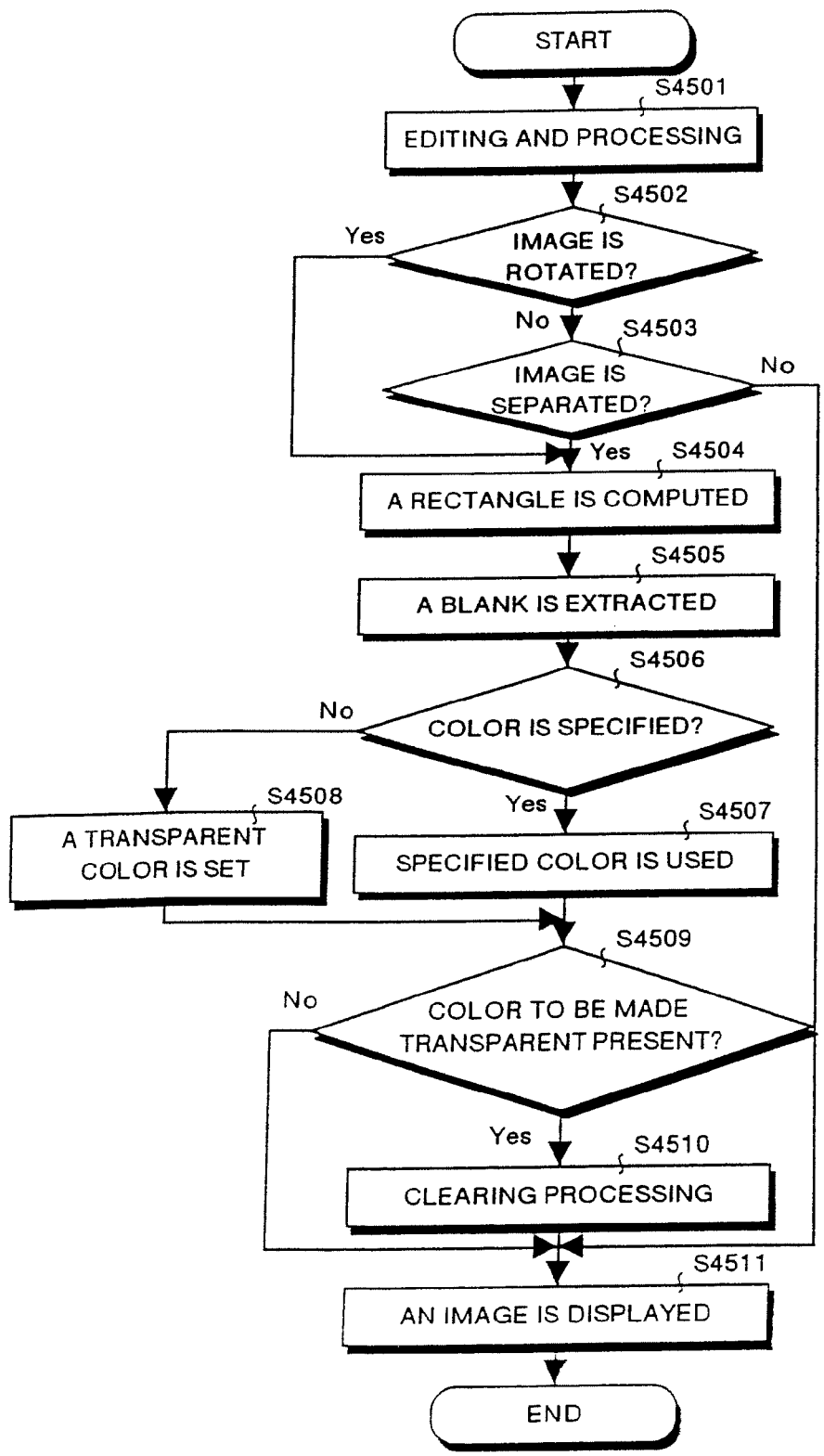
FIG. 45 is a flow chart showing a sequence of a series of processing executed by an image changing section and a display controller according to Embodiment 8.

Next description is made for a sequence of a series of processing by the image changing section 304 as well as for the display controller 307 in Embodiment 8. FIG. 45 is a flow chart showing the sequence of a series of processing for the image changing section as well as for the display controller according to Embodiment 8 of the present invention. In the flow chart in FIG. 45, the processing in step S4501 to step S4507 is the same as that in step S4201 to step S4207 in FIG. 42 of Embodiment 7, so that description thereof is omitted herein.

In step S4506, when a color is not specified, a transparent color is set according to the sequence shown in the flow chart of FIG. 44, and the blank sections are colored with the transparent color (step S4508). The processing in step S4509 to step S4511 is also the same as that in step S4209 to step S4211 in FIG. 42 of Embodiment 7, so that description thereof is also omitted herein.

As described above, with Embodiment 8, a color that is used least among colors in an image is set as a transparent color, so that it is possible to be avoided that any section not to be made transparent is disadvantageously made transparent.

In Embodiment 9, a history of editing and processing of the image edited and processed is displayed, so that the operator can easily grasp how the image is edited and processed, and can edit and process the image according to the displayed history of editing and processing.

The hardware configuration of an image and document preparing system as a whole including an image processing apparatus according to Embodiment 9 of the present invention and the image processing apparatus 100 are the same as those in Embodiment 1, so that description thereof is omitted herein. The configuration in the other sections of the image processing apparatus 100 excluding the image data memory 104, image changing section 304, and display controller 307 is also the same as those in Embodiment 1, so that description thereof is also omitted herein.

Figure 46:
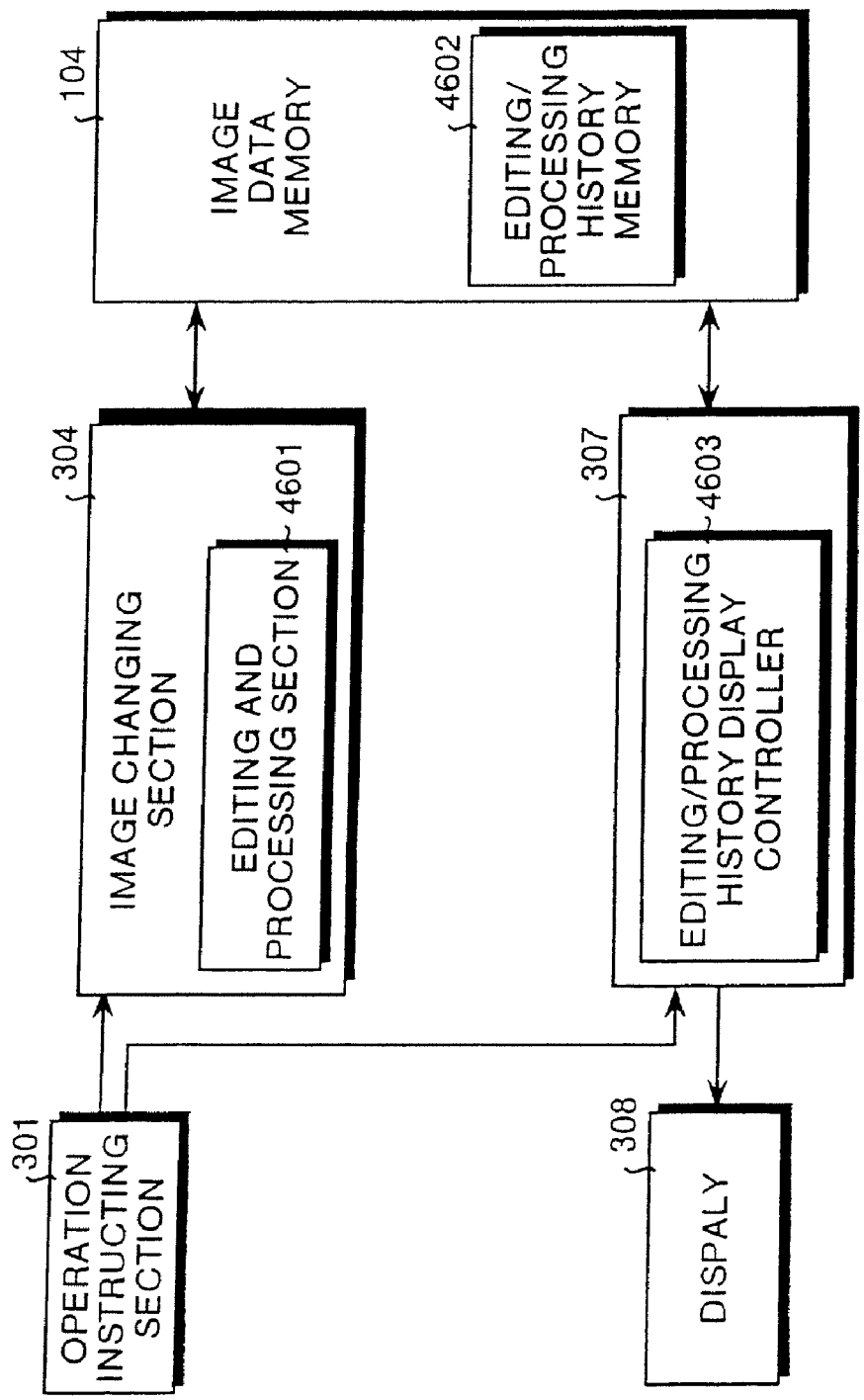
FIG. 46 is a block diagram functionally showing configuration of an image changing section, a display controller, and peripheral sections thereof in the image processing apparatus according to Embodiment 9 of the present invention.

Next description is made for the image data memory 104, image changing section 304, and display controller 307. FIG. 46 is a block diagram functionally showing configuration of the image data memory 104, image changing section 304, display controller 307, and the peripheral section thereof in the image processing apparatus according to Embodiment 9 of the present invention.

As shown in FIG. 46, the image data memory 104 includes an editing/processing history storing section 4602. The image changing section 304 includes an editing and processing section 4601. The display controller 307 includes an editing/processing history display controller 4603.

The editing and processing section 4601 edits and processes an image appearing on a screen. The editing and processing includes the processing of reversing an image, changing a number of pixels of an image, color adjustment for a color image, and synthesizing the images or the like. The image edited and processed by the editing and processing section 4601 is stored in the image data memory 104 with a file name added thereto.

The editing/processing history memory 4602 stores thereon a history of editing and processing of an image edited and processed by the editing and processing section 4601. At this point of time, the history is stored in correlation to the image processed in the editing and processing section 4601. The editing/processing history memory 4602 also stores thereon information for an original image as an object for editing and processing.

The editing/processing history display controller 4603 displays the history of editing and processing stored in the editing/processing history memory 4602 together with the image on the screen. The editing/processing history display controller 4603 also displays information for the original image as an object for editing and processing stored in the editing/processing history memory 4602.

The editing and processing section 4601, editing/processing history memory 4602, and editing/processing history display controller 4603 realize the respective functions when the CPU 201 or other related section executes commands according to instructions described in programs such as an operating system or application programs recorded in a storage medium such as the ROM 202, RAM 203, hard disk 205, or floppy disk 207.

Figure 47:
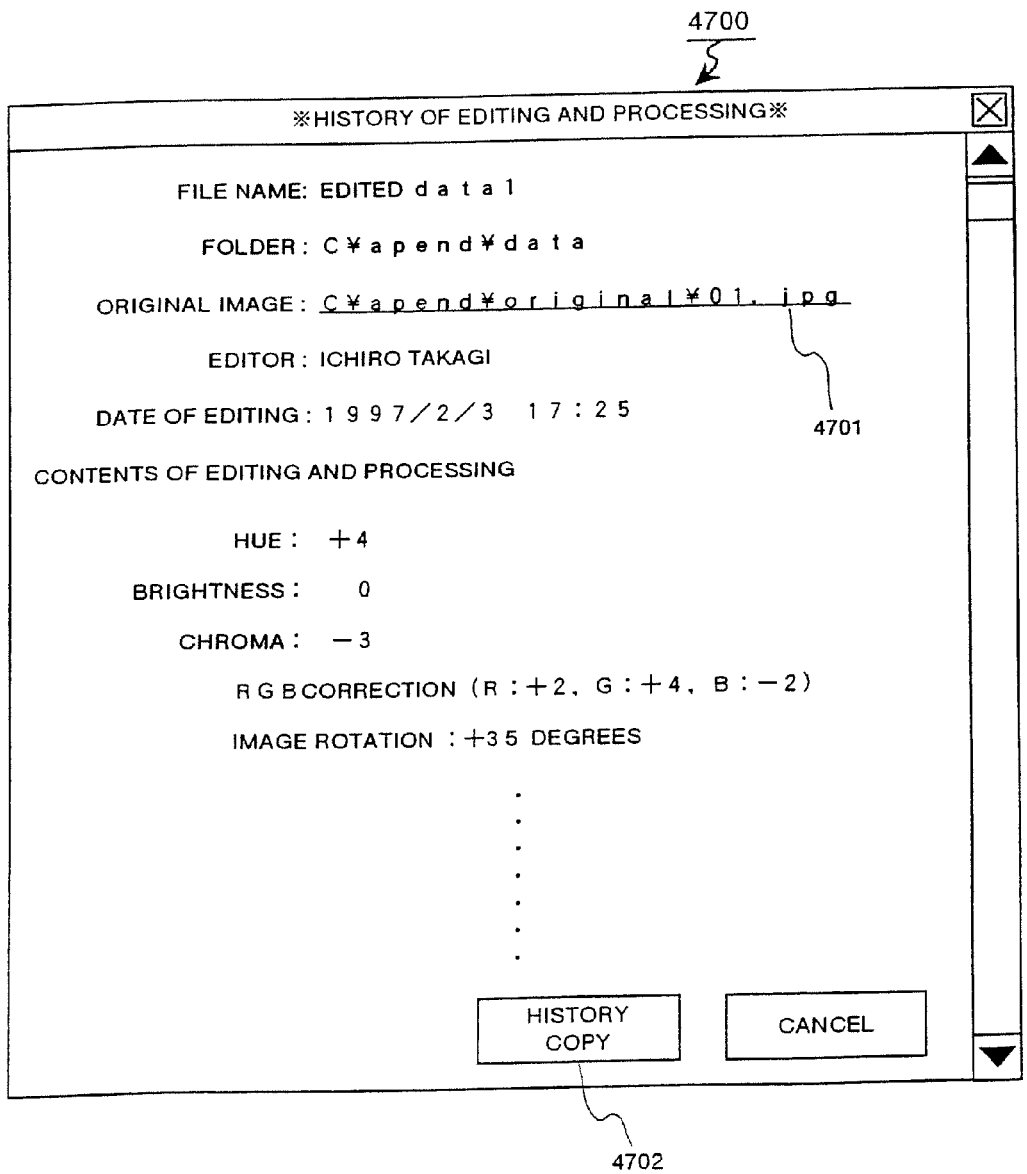
FIG. 47 is an explanatory showing an example of a history of editing and processing displayed on the display of the image processing apparatus according to Embodiment 9.

Next, description is made for contents of a history of editing and processing. FIG. 47 shows one example of a history of editing and processing displayed on the display 308 of the image' processing apparatus according to Embodiment 9 of the present invention. On the screen shown in FIG. 5, and in a state where an image is displayed in the selected image displaying area 503, by moving the cursor to the area of the image and clicking the right button or the like of the mouse, a editing and processing history display screen 4700 shown in FIG. 47 is displayed.

In FIG. 47, displayed in information for the history of editing and processing are the file name of the image, name of the folder in which this file is stored, name of the original image as an object for editing and processing, name of the operator who has done the editing and processing, date and time of editing and processing, and contents of editing and processing. A path indicating the location of the original image is also displayed. Further, when the path is hyperlinked, by clicking on this path section with the mouse or the like the original image can also directly be displayed on the selected image displaying area 503.

There are displayed contents concerning editing and processing, for instance, the level to which hue, brightness, and chroma are changed, the level at which RGB correction is performed, or the angle by which the image is rotated or the like.

The operator may select only the required information of editing and processing and only the selected information may be displayed. Thus, only the contents as an object for editing and processing may be displayed.

Further, by pressing "History Copy" button 4702, the displayed history information can be copied, and other images can automatically be edited and processed according to the copied history information.

As described above, with Embodiment 9, the history of editing and processing of an image edited and processed is displayed, so that the operator can easily grasp how the image is edited and processed, and can easily and efficiently edit and process the image according to the displayed history of editing and processing.

Further, information concerning an original image as an object for editing and processing is displayed, so that the operator can easily identify the original image and can easily and efficiently edit and process the image.

It should be noted that the image processing methods having been described in Embodiments 1 to 9 are realized by making a computer such as a personal computer and a work station execute a program previously prepared therein. This program is recorded in a computer-readable storage medium such as a hard disk, a floppy disk, a CD-ROM, an MO or a DVD, and the computer executes the program after reading it out from the storage medium. This program can also be distributed through the receding medium and a network.

With the present invention, a reference image is displayed at a specified position on a screen and a peripheral image is displayed around this reference image with n layers by correlating parameters of the peripheral image to scales of the vertical axis and horizontal axis. Thus, parameters of the reference image can be changed by visually checking the peripheral image. More specifically, a peripheral image is located adjacent to the reference image in correlation to scales of the vertical axis and horizontal axis. Thus, an operator can easily recognize synthesis of amount of change of two parameters and change of an image according to the synthesized parameter values. Thus, an operator can quickly and efficiently change a plurality of parameters for the reference image, and because of this feature, there is provided the advantage that an image processing apparatus with which an operator can easily and efficiently edit and process an image can be obtained.

With the present invention, it is inhibited that the same parameter is selected as a parameters for both the vertical and horizontal axes simultaneously. Thus, it is possible to prevent an operator from setting the same parameter for both the vertical axis and horizontal axis by mistake, and hence, there is provided the advantage that an image processing apparatus with which an operator can easily and efficiently edit and process an image can be obtained.

With the present invention, one out of a plurality of peripheral images is specified and the specified peripheral image is extracted as a reference image, so that operator can change two different parameters by simply specifying an image having the most desired parameters from a plurality of displayed peripheral images. Further an operator can easily and efficiently select an image closest to finally selected two parameters only by successively specifying images close to a desired image. Thus makes it possible for the operator to more visually and intuitively change a plurality of parameter values simultaneously, and hence, there is provided the advantage that an image processing apparatus with which an operator can easily and efficiently edit and process an image can be obtained.

With the present invention, information concerning parameter values of parameters for the vertical axis and horizontal axis is displayed at a specified position within or adjacent to a reference and/or a peripheral image, so that the parameter values can visually be checked and changed. More specifically, the amount of change can easily be recognized when parameter values are changed by extracting a peripheral image as the reference image, and hence, there is provided the advantage that an image processing apparatus with which an operator can easily and efficiently edit and process an image can be obtained.

With the present invention, a contracted image with an appropriate size is displayed. Thus, an operator can easily and efficiently retrieve a desired image data file visually checking the contracted image, and hence, there is provided the advantage that an image processing apparatus with which an operator can easily and efficiently edit and process an image can be obtained.

With the present invention, a rotated image as a whole is displayed as a contracted image. Thus, a degree of rotation of the original image can simultaneously be checked by referring to the contracted image, and hence, there is provided the advantage that an image processing apparatus with which an operator can easily and efficiently edit and process an image can be obtained.

With the present invention, an image separated from a contracted image is displayed with the maximum size. Thus, contents of the contracted image can clearly be identified and also how the image is separated can visually be checked, and hence, there is provided the advantage that an image processing apparatus with which an operator can easily and efficiently edit and process an image can be obtained.

With the present innovation, blank sections are colored and the colored section is made transparent. Thus, a section to be made transparent can easily be identified through a simple operation of coloring. This in turn makes it easier to synthesize images, hence, there is provided the advantage that an image processing apparatus with which an operator can easily and efficiently edit and process an image can be obtained.

With the present invention, a color used for coloring the blank sections and which is to be made transparent is arbitrary specified. Thus, it is possible to prevent a section not to be made transparent from being made transparent, which makes it easier to synthesize the images, and hence, there is provided the advantage that an image processing apparatus with which an operator can easily and efficiently edit and process an image can be obtained.

With the present invention, when a color to be made transparent is set, the color is set by referring to and according to colors used in the image. Thus, it is possible to prevent a section not to be made transparent from being made transparent without specifying any specific color, which makes it easier to synthesize the images, and hence, there is provided the advantage that an image processing apparatus with which an operator can easily and efficiently edit and process an image can be obtained.

With the present invention, a color which is used least in an image is set as a color to be made transparent, so that the possibility of clearing a section not to be made transparent is suppressed to the minimum level and images can easily be synthesized, and hence, there is provided the advantage that an image processing apparatus with which an operator can easily and efficiently edit and process an image can be obtained.

With the present invention, a history of editing and processing of an edited and processed image is displayed. Thus, an operator can easily understand how the image has been edited and processed, and hence, there is provided the advantage that an image processing apparatus with which an operator can easily and efficiently edit and process an image can be obtained.

With the present invention, information concerning an original image of an edited and processed image is displayed. Thus, the original image can easily be identified, and hence, there is provided the advantage that an image processing apparatus with which an operator can easily and efficiently edit and process an image can be obtained.

With the present invention, first to third dedicated displaying areas are provided as fixed areas, and positions and sizes of the areas can not be changed, so that always a screen having the same configuration is displayed. Thus, an operator can perceive the areas as one screen so that he is not required to remember a complicated operational sequence, and can intuitively use the image processing apparatus, and hence, there is provided the advantage that an image processing apparatus with which an operator can easily and efficiently edit and process an image can be obtained.

With the present invention, even if the operator does not accurately remembers a file name, the operator can quickly and easily select a desired image data file according to a thumbnail image as a key, and hence, there is provided the advantage that an image processing apparatus with which an operator can easily and efficiently edit and process an image can be obtained.

With the present invention, a reference image is displayed at a specified position on a screen and a peripheral image is displayed around this reference image with n layers by correlating parameters of the peripheral image to scales of the vertical axis and horizontal axis. Thus, parameters of the reference image can be changed by visually checking the peripheral images. More specifically, a peripheral image is located adjacent to the reference image in correlation to scales of the vertical axis and horizontal axis. Therefore, synthesis of the amount of change of two parameters and change of an image according to the synthesized parameters can intuitively be recognized by an operator wherein he can quickly and effectively change a plurality of parameters for the reference image, and hence, there is provided the advantage that an image processing method with which an operator can easily and efficiently edit and process an image can be obtained.

With the present invention, it is inhibited that the same parameter is selected as a parameter for both the vertical axis and horizontal axis simultaneously. Thus, it is possible to prevent an operator from setting the same parameter for both the vertical axis and horizontal axis simultaneously by mistake, and hence, there is provided the advantage that an image processing method with which an operator can easily and efficiently edit and process an image can be obtained.

With the present invention, one out of a plurality of peripheral images is specified and the specified peripheral image is extracted as a reference image, so that an operator can change the values of two different parameters through a simple operation of only specifying an image having the most desired parameter from a plurality of peripheral images being displayed on a screen. Thus, the operator can easily and efficiently select an image closest to finally selected two parameters only by successively specifying images close to a desired image, and furthermore can visually and intuitively change a plurality of parameter values, and hence, there is provided the advantage that an image processing method with which an operator can easily and efficiently edit and process an image can be obtained.

With the present invention, information concerning parameter values of parameters for the vertical axis and horizontal axis is displayed at a specified position within or adjacent to a reference image and/or a peripheral image. Thus, the information can be referred to when changing parameter values, and more specifically the amount of change can easily be recognized when changing parameter values by extracting a peripheral image as a reference image, and hence, there is provided the advantage that an image processing method with which an operator can easily and efficiently edit and process an image can be obtained.

With the present invention, a contracted image with an appropriate size is displayed, so that a desired image data file can easily and efficiently be retrieved by referring the contracted image, and hence, there is provided the advantage that an image processing method with which an operator can easily and efficiently edit and process an image can be obtained.

With the present invention, a rotated image as a whole is displayed as a contracted image, so that rotation status of the image can be identified in the contracted image, and hence, there is provided the advantage that an image processing method with which an operator can easily and efficiently edit and process an image can be obtained.

With the preset invention, an image separated from a contracted image is displayed with the biggest size, so that contents of an image can clearly be confirmed in the contracted image and how the image was separated can also be identified, and hence, there is provided the advantage that an image processing method with which an operator can easily and efficiently edit and process an image can be obtained.

With the present invention, blank sections are colored and the colored sections are made transparent, so that a section to be made transparent can be identified through a simple operation of coloring and also images can easily be synthesized, and hence, there is provided the advantage that an image processing method with which an operator can easily and efficiently edit and process an image can be obtained.

With the present invention, a color used for coloring the blank sections and which is to be later made transparent is can arbitrarily specified. Thus, it is possible to present a section not to be made transparent from being made transparent, which in turn makes it easier to synthesize the images, and hence, there is provided the advantage that an image processing method with which an operator can easily and efficiently edit and process an image can be obtained.

With the present invention, when setting a color to be made transparent, the color is set by referring to colors used in an image. Thus, it is possible to prevent a section not to be made transparent from being made transparent without specifying any specific color, which in turn makes it easier to synthesize the images, and hence, there is provided the advantage that an image processing method with which an operator can easily and efficiently edit and process an image can be obtained.

With the present invention, a color which is used least in an image is set as a color to be made transparent, so that images can be synthesized with a minimum possibility of making a section transparent which is not to be made transparent, and hence, there is provided the advantage that an image processing method with which an operator can easily and efficiently edit and process an image can be obtained.

With the present invention, a history of editing and processing of an edited and processed image is displayed, so that in operator can easily understand how the image was edited and processed, and hence, there is provided the advantage that an image processing method with which an operator can easily and efficiently edit and process an image can be obtained.

With the present invention, information concerning an original image of an edited and processed image is displayed, so that the original image can easily be identified, and hence, there is provided the advantage that an image processing method with which an operator can easily and efficiently edit and process an image can be obtained.

With the present invention, first to third dedicated displaying areas are provided as fixed areas, and a position and i size of each of the areas can not be changed, so that always a screen having the same configuration is displayed. The operator can grasp these areas as one screen and he is not required to remember a complicated operational sequence and can intuitively use the image processing apparatus without being embarrassed luring operations, and hence, there is provided the advantage that in image processing method with which an operator can easily and efficiently edit and process an image can be obtained.

With the present invention, eve if the operator does not accurately remembers a file name, the operator can quickly and easily select a desired image data file according to a thumbnail image (contracted image) as a key, and hence, there is provided the advantage that an image processing method with which an operator can easily and efficiently edit and process an image can be obtained.

With the present invention, a program for making a computer execute the program as described above is recorded in a storage medium, and the program can be read by a machine, and hence, there is provided the advantage that a storage medium, which can realize any of operations described above with a computer, can be obtained.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus comprising:
a memory unit configured to store at least one file including an image;
a first display controller configured to control a display of information concerning the at least one file in a first dedicated display area on a display;
a second display controller configured to display the at least one file as a contracted image in a second dedicated display area on the display;
a third display controller configured to display a selected file as an image of a predetermined size in a third dedicated area on the display;
a reference image extracting unit for extracting a reference image as an object for editing and processing;
a parameter managing unit for managing at least one parameter including brightness, chroma, hue, and contrast for the reference image extracted by said reference image extracting unit;
a parameter setting unit for setting the at least one parameter managed by said parameter managing unit as scales for a vertical axis and a horizontal axis respectively; and
a peripheral image preparing unit for preparing an image obtained by changing values of the parameters selected by said parameter setting unit by a specified amount as a peripheral image for the reference image,
wherein the third display controller displays the image, currently being displayed, on an entire screen in response to a command from a preset menu or selection of the image such that the first and second dedicated display areas are hidden, and
wherein the third display controller controls the display so as to display the reference image at a specified position on the screen and places peripheral images prepared by said peripheral image preparing unit around the reference image, and correlates the values of the parameters of the peripheral images to the scales of the vertical axis and horizontal axis set by said parameter setting unit so that the peripheral images surround the reference image in n layers, where n is a positive integer.

2. The image processing apparatus according to claim 1, wherein the information concerning the at least one file is the location of the at least one file.

3. The image processing apparatus according to claim 2, wherein the location of the at least one file is a folder stored in memory.

4. The image processing apparatus according to claim 3, wherein
the first display controller further includes a first selecting unit configured to hierarchically display the folder and select the folder, and
the second display controller is configured to display the at least one file included in the folder selected by the first selecting unit as a contracted image.

5. The image processing apparatus according to claim 3, wherein
the second display controller further includes a second selecting unit configured to select a displayed contracted image corresponding to at least one file, and
the third display controller is configured to display the selected contracted image in a predetermined size in the third dedicated area on the display.

6. The image processing apparatus according to claim 5, wherein the third display controller includes a third selecting unit configured to select a size of the displayed image.

7. The image processing apparatus according to claim 1, wherein the second display controller displays a name of the contracted image on a lower part of the contracted image.

8. The image processing apparatus according to claim 1, wherein the information concerning the at least one file is keyword information associated with the at least one file.

9. The image processing apparatus according to claim 8, wherein
the second display controller further includes a second selecting unit configured to select a displayed contracted image corresponding to at least one file, and
the third display controller is configured to display the selected contracted image in a predetermined size in the third dedicated area on the display.

10. The image processing apparatus according to claim 9, wherein the third display controller includes a third selecting unit configured to select a size of the displayed image.

11. The image processing apparatus according to claim 10, wherein the size of the selected file displayed by the third display controller is larger than the size of the contracted image displayed by the second display controller.

12. The image processing apparatus according to claim 9, wherein
the first display controller further includes a keyword selecting unit configured to select a keyword from displayed keyword information, and a changing unit configured to change a display order of the contracted image displayed in the second dedicated display area on the display based on the selected keyword.

13. The image processing apparatus according to claim 1, further comprising:
a setting unit configured to set a number of contracted images displayed in the second dedicated display area on the display, wherein
the second display controller displays a set number of the contracted images in the second dedicated display area on the display.

14. An image processing method, comprising:
first displaying information concerning at least one file in a first dedicated display area on a display;
first selecting the information concerning at least one file;
second displaying, based on the first selecting step, the at least one file as a contracted image in a second dedicated display area on the display;
second selecting the contracted image;
third displaying the selected contracted image as an image of a predetermined size in a third dedicated area on the display;
displaying the image, currently being displayed by the third displaying, on an entire screen in response to a command from a preset menu or selection of the image such that the first and second dedicated display areas are hidden;
extracting a reference image as an object for editing and processing;
managing at least one parameter including brightness, chroma, hue, and contrast for the reference image extracted by said extracting;
setting the at least one parameter managed by said managing as scales for a vertical axis and a horizontal axis respectively;
preparing an image obtained by changing values of the parameters selected by said setting by a specified amount as a peripheral image for the reference image;
displaying the reference image at a specified position on the screen;
placing peripheral images prepared by said preparing around the reference image; and
correlating the values of the parameters of the peripheral images to the scales of the vertical axis and horizontal axis set by said setting so that the peripheral images surround the reference image in n layers, where n is a positive integer.

15. The image processing method according to claim 14, wherein the information concerning the at least one file is the location of the at least one file.

16. The image processing method according to claim 15, wherein the location of the at least one file is a folder stored in memory.

17. The image processing method according to claim 16, wherein
the first displaying further comprises displaying a folder hierarchically in a first dedicated display area on a display, and
the second displaying further comprises displaying at least one image file included in the selected folder as a contracted image.

18. The image processing method according to claim 14, wherein the third displaying further comprises selecting a size of the image displayed by the displaying the image step.

19. The image processing method according to claim 14, wherein the second displaying further comprises displaying a name of the contracted image on a lower part of the contracted image.

20. The image processing method according to claim 14, wherein the information concerning the at least one file is keyword information associated with the at least one file.

21. The image processing method according to claim 14, wherein
the first displaying further comprises selecting a keyword from displayed keyword information, and changing a display order of the contracted image displayed in the second dedicated display area on the display based on the selected keyword.

22. The image processing method according to claim 14, further comprising:
setting a number of contracted images displayed in the second dedicated display area on the display, wherein
the first displaying further comprises displaying a set number of the contracted images in the second dedicated display area on the display.

23. The image processing method according to claim 14, wherein the size of the selected file displayed by the third displaying is larger than the size of the contracted image displayed by the second displaying.

24. A non-transitory computer readable recording medium for recording a program to be executed by a computer, said program comprising:
a computer program code for first displaying information concerning at least one file in a first dedicated display area on a display;
a computer program code for first selecting the information concerning at least one file;
a computer program code for second displaying, based on the first selecting step, the at least one file as a contracted image in a second dedicated display area on the display;
a computer program code for second selecting the contracted image;
a computer program code for third displaying the selected contracted image as an image of a predetermined size in a third dedicated area on the display;
a computer program code for displaying the image, currently being displayed by the third displaying, on an entire screen in response to a command from a preset menu or selection of the image such that the first and second dedicated display areas are hidden;
a computer program code for extracting a reference image as an object for editing and processing;
a computer program code for managing at least one parameter including brightness, chroma, hue, and contrast for the reference image extracted by said extracting;
a computer program code for setting the at least one parameter managed by said managing as scales for a vertical axis and a horizontal axis respectively;
a computer program code for preparing an image obtained by changing values of the parameters selected by said setting by a specified amount as a peripheral image for the reference image;
a computer program code for displaying the reference image at a specified position on the screen;
a computer program code for placing peripheral images prepared by said preparing around the reference image; and
a computer program code for correlating the values of the parameters of the peripheral images to the scales of the vertical axis and horizontal axis set by said setting so that the peripheral images surround the reference image in n layers, where n is a positive integer.

* * * * *